US008540207B2

(12) United States Patent
Hunnicutt et al.

(10) Patent No.: US 8,540,207 B2
(45) Date of Patent: Sep. 24, 2013

(54) FLUID FLOW CONTROL ASSEMBLY

(75) Inventors: Harry A. Hunnicutt, Austin, TX (US); Christiaan S. Best, Austin, TX (US)

(73) Assignee: Dunan Microstaq, Inc., Dallas, TX (US)

( * ) Notice: Subject to any disclaimer, the term of this patent is extended or adjusted under 35 U.S.C. 154(b) by 186 days.

(21) Appl. No.: 13/132,908

(22) PCT Filed: Dec. 4, 2009

(86) PCT No.: PCT/US2009/066675

§ 371 (c)(1), (2), (4) Date: Jul. 14, 2011

(87) PCT Pub. No.: WO2010/065804

PCT Pub. Date: Jun. 10, 2010

(65) Prior Publication Data

US 2012/0000550 A1 Jan. 5, 2012

Related U.S. Application Data

(60) Provisional application No. 61/120,412, filed on Dec. 6, 2008.

(51) Int. Cl.
*F16K 31/12* (2006.01)

(52) U.S. Cl.
USPC .......... 251/30.02; 251/30.01; 251/28; 251/50

(58) Field of Classification Search
USPC .... 251/28, 30.01, 30.02, 48, 50; 137/625.35, 137/270
See application file for complete search history.

(56) References Cited

U.S. PATENT DOCUMENTS

| | | | | |
|---|---|---|---|---|
| 668,202 | A * | 2/1901 | Nethery | 251/25 |
| 886,045 | A | 4/1908 | Ehrlich et al. | |

(Continued)

FOREIGN PATENT DOCUMENTS

| | | | |
|---|---|---|---|
| CN | 101617155 | B | 3/2012 |
| DE | 2215526 | | 10/1973 |

(Continued)

OTHER PUBLICATIONS

Biography, Ohio State University Website [online], [retrieved Dec. 31, 2000]. Retrieved from the Internet <URL: http://www.chemistry.ohio-state.edu/resource/pubs/brochure/madou.htm>.

(Continued)

*Primary Examiner* — John K Fristoe, Jr.
*Assistant Examiner* — Umashankar Venkatesan
(74) *Attorney, Agent, or Firm* — MacMillan, Sobanski & Todd, LLC

(57) ABSTRACT

A device has been disclosed that may include a spool valve including a body having a first connector and a second connector and a spool movable relative to the body for controlling flow between the first connector and the second connector. The reversible flow control assembly further may include a pilot valve device developing a single pressure command in the form of a fluid at a command pressure. The spool valve may be responsive to the single pressure command developed in said pilot valve device to control flow between the first connector and the second connector without regard to the direction of flow. The majority of axial forces acting on the spool to position the spool relative to the body when fluid is flowing through the valve may be fluid forces.

28 Claims, 22 Drawing Sheets

(56) References Cited

U.S. PATENT DOCUMENTS 1,886,205 A 11/1932 Lyford
1,926,031 A 9/1933 Boynton
2,412,205 A 12/1946 Cook
2,504,055 A 4/1950 Thomas
2,651,325 A 9/1953 Lusignan
2,840,107 A 6/1958 Campbell
2,875,779 A 3/1959 Campbell
3,031,747 A 5/1962 Green
3,729,807 A 5/1973 Fujiwara
3,747,628 A 7/1973 Holster et al.
3,860,949 A 1/1975 Stoeckert et al.
4,005,454 A 1/1977 Froloff et al.
4,019,388 A 4/1977 Hall, II et al.
4,023,725 A 5/1977 Ivett et al.
4,100,236 A 7/1978 Gordon et al.
4,152,540 A 5/1979 Duncan et al.
4,181,249 A 1/1980 Peterson et al.
4,298,023 A 11/1981 McGinnis
4,341,816 A 7/1982 Lauterbach et al.
4,354,527 A 10/1982 McMillan
4,372,486 A 2/1983 Tomioka et al.
4,434,813 A 3/1984 Mon
4,476,893 A 10/1984 Schwelm
4,543,875 A 10/1985 Imhof
4,548,047 A 10/1985 Hayashi et al.
4,581,624 A 4/1986 O'Connor
4,593,719 A 6/1986 Leonard et al.
4,628,576 A 12/1986 Giachino et al.
4,647,013 A 3/1987 Giachino et al.
4,661,835 A 4/1987 Gademann et al.
4,687,419 A 8/1987 Suzuki et al.
4,772,935 A 9/1988 Lawler et al.
4,821,997 A 4/1989 Zdeblick
4,824,073 A 4/1989 Zdeblick
4,826,131 A 5/1989 Mikkor
4,828,184 A 5/1989 Gardner et al.
4,852,364 A 8/1989 Seener et al.
4,869,282 A 9/1989 Sittler et al.
4,938,742 A 7/1990 Smits
4,943,032 A 7/1990 Zdeblick
4,946,350 A 8/1990 Suzuki et al.
4,959,581 A 9/1990 Dantlgraber
4,964,567 A 10/1990 Heffner et al.
4,966,646 A 10/1990 Zdeblick
4,978,062 A 12/1990 Lange, Sr.
5,029,805 A 7/1991 Albarda et al.
5,037,778 A 8/1991 Stark et al.
5,050,838 A 9/1991 Beatty et al.
5,052,192 A 10/1991 Drucker
5,054,522 A 10/1991 Kowanz et al.
5,058,856 A 10/1991 Gordon et al.
5,061,914 A 10/1991 Busch et al.
5,064,165 A 11/1991 Jerman
5,065,978 A 11/1991 Albarda et al.
5,066,533 A 11/1991 America et al.
5,069,419 A 12/1991 Jerman
5,074,629 A 12/1991 Zdeblick
5,082,242 A 1/1992 Bonne et al.
5,096,643 A 3/1992 Kowanz et al.
5,116,457 A 5/1992 Jerman
5,131,729 A 7/1992 Wetzel
5,133,379 A 7/1992 Jacobsen et al.
5,142,781 A 9/1992 Mettner et al.
5,161,774 A 11/1992 Engelsdorf et al.
5,169,472 A 12/1992 Goebel
5,176,358 A 1/1993 Bonne et al.
5,177,579 A 1/1993 Jerman
5,178,190 A 1/1993 Mettner
5,179,499 A 1/1993 MacDonald et al.
5,180,623 A 1/1993 Ohnstein
5,197,517 A 3/1993 Perera
5,209,118 A 5/1993 Jerman
5,215,244 A 6/1993 Buchholz et al.
5,216,273 A 6/1993 Doering et al.
5,217,283 A 6/1993 Watanabe
5,222,521 A * 6/1993 Kihlberg .................. 137/625.69
5,238,223 A 8/1993 Mettner et al.
5,244,537 A 9/1993 Ohnstein
5,267,589 A 12/1993 Watanabe
5,271,431 A 12/1993 Mettner et al.
5,271,597 A 12/1993 Jerman
5,309,943 A 5/1994 Stevenson et al.
5,323,999 A 6/1994 Bonne et al.
5,325,880 A 7/1994 Johnson et al.
5,333,831 A 8/1994 Barth et al.
5,336,062 A 8/1994 Richter
5,355,712 A 10/1994 Petersen et al.
5,368,704 A 11/1994 Madou et al.
5,375,919 A 12/1994 Furuhashi
5,400,824 A 3/1995 Gschwendtner et al.
5,417,235 A 5/1995 Wise et al.
5,445,185 A 8/1995 Watanabe et al.
5,458,405 A 10/1995 Watanabe
5,524,819 A 6/1996 Heffner et al.
5,543,349 A 8/1996 Kurtz et al.
5,553,790 A 9/1996 Findler et al.
5,566,703 A 10/1996 Watanabe et al.
5,577,533 A 11/1996 Cook, Jr.
5,589,422 A 12/1996 Bhat
5,611,214 A 3/1997 Wegeng et al.
5,785,295 A 7/1998 Tsai
5,810,325 A 9/1998 Carr
5,838,351 A 11/1998 Weber
5,848,605 A 12/1998 Bailey et al.
5,856,705 A 1/1999 Ting
5,873,385 A 2/1999 Bloom et al.
5,909,078 A 6/1999 Wood et al.
5,926,955 A 7/1999 Kober
5,941,608 A 8/1999 Campau et al.
5,954,079 A 9/1999 Barth et al.
5,955,817 A 9/1999 Dhuler et al.
5,964,244 A * 10/1999 Hiramatsu et al. ............ 137/270
5,970,998 A 10/1999 Talbot et al.
5,994,816 A 11/1999 Dhuler et al.
5,996,609 A * 12/1999 Akimoto et al. .............. 137/270
6,019,437 A 2/2000 Barron et al.
6,023,121 A 2/2000 Dhuler et al.
6,038,928 A 3/2000 Maluf et al.
6,041,650 A 3/2000 Swindler et al.
6,076,366 A 6/2000 Takano et al.
6,096,149 A 8/2000 Hetrick et al.
6,105,737 A 8/2000 Weigert et al.
6,114,794 A 9/2000 Dhuler et al.
6,116,863 A 9/2000 Ahn et al.
6,123,316 A 9/2000 Biegelsen et al.
6,124,663 A 9/2000 Haake et al.
6,171,972 B1 1/2001 Mehregany et al.
6,182,742 B1 2/2001 Takahashi et al.
6,224,445 B1 5/2001 Neukermans et al.
6,255,757 B1 7/2001 Dhuler et al.
6,279,606 B1 8/2001 Hunnicutt et al.
6,283,441 B1 9/2001 Tian
6,386,507 B2 5/2002 Dhuler et al.
6,390,782 B1 5/2002 Booth et al.
6,408,876 B1 6/2002 Nishimura et al.
6,418,741 B1 7/2002 Nungesser et al.
6,494,804 B1 12/2002 Hunnicutt et al.
6,505,811 B1 1/2003 Barron et al.
6,520,197 B2 2/2003 Deshmukh et al.
6,523,560 B1 2/2003 Williams et al.
6,533,366 B1 3/2003 Barron et al.
6,540,203 B1 4/2003 Hunnicutt
6,581,640 B1 6/2003 Barron
6,637,722 B2 10/2003 Hunnicutt
6,662,581 B2 12/2003 Hirota et al.
6,694,998 B1 2/2004 Hunnicutt
6,724,718 B1 4/2004 Shinohara et al.
6,755,761 B2 6/2004 Hunnicutt et al.
6,761,420 B2 7/2004 Maluf et al.
6,845,962 B1 1/2005 Barron et al.
6,872,902 B2 3/2005 Cohn et al.
6,902,988 B2 6/2005 Barge et al.
6,948,514 B1 * 9/2005 Kramer et al. ............. 137/15.21
6,958,255 B2 10/2005 Khuri-Yakub et al.

| | | | | |
|---|---|---|---|---|
| 6,966,329 | B2 | 11/2005 | Liberfarb | |
| 7,011,378 | B2 | 3/2006 | Maluf et al. | |
| 7,063,100 | B2 | 6/2006 | Liberfarb | |
| 7,104,283 | B2 * | 9/2006 | Ino et al. | 137/625.65 |
| 7,210,502 | B2 | 5/2007 | Fuller et al. | |
| 7,372,074 | B2 | 5/2008 | Milne et al. | |
| 7,449,413 | B1 | 11/2008 | Achuthan et al. | |
| 8,113,448 | B2 | 2/2012 | Keating | |
| 8,113,482 | B2 | 2/2012 | Hunnicutt | |
| 8,151,583 | B2 | 4/2012 | Douglas | |
| 8,156,962 | B2 | 4/2012 | Luckevich | |
| 8,157,184 | B2 | 4/2012 | Hayashi et al. | |
| 8,393,344 | B2 * | 3/2013 | Hunnicutt | 137/1 |
| 2002/0014106 | A1 | 2/2002 | Srinivasan et al. | |
| 2002/0029814 | A1 | 3/2002 | Unger et al. | |
| 2002/0096421 | A1 | 7/2002 | Cohn et al. | |
| 2002/0174891 | A1 | 11/2002 | Maluf et al. | |
| 2003/0061889 | A1 | 4/2003 | Tadigadapa et al. | |
| 2003/0098612 | A1 | 5/2003 | Maluf et al. | |
| 2003/0159811 | A1 | 8/2003 | Nurmi | |
| 2003/0206832 | A1 | 11/2003 | Thiebaud et al. | |
| 2004/0115905 | A1 | 6/2004 | Barge et al. | |
| 2005/0121090 | A1 | 6/2005 | Hunnicutt | |
| 2005/0200001 | A1 | 9/2005 | Joshi et al. | |
| 2005/0205136 | A1 | 9/2005 | Freeman | |
| 2006/0017125 | A1 | 1/2006 | Lee et al. | |
| 2006/0067649 | A1 | 3/2006 | Tung et al. | |
| 2006/0218953 | A1 | 10/2006 | Hirota | |
| 2007/0251586 | A1 | 11/2007 | Fuller et al. | |
| 2007/0289941 | A1 | 12/2007 | Davies | |
| 2008/0047283 | A1 | 2/2008 | Pham et al. | |
| 2008/0072977 | A1 * | 3/2008 | George et al. | 137/625.6 |
| 2008/0196773 | A1 * | 8/2008 | Franconi | 137/492.5 |
| 2008/0271788 | A1 | 11/2008 | Matsuzaki et al. | |
| 2009/0020716 | A1 | 1/2009 | Hokazono et al. | |
| 2009/0123300 | A1 | 5/2009 | Uibel | |
| 2009/0186466 | A1 | 7/2009 | Brewer | |
| 2010/0019177 | A1 | 1/2010 | Luckevich | |
| 2010/0038576 | A1 | 2/2010 | Hunnicutt | |
| 2010/0225708 | A1 | 9/2010 | Peng et al. | |
| 2012/0000550 | A1 | 1/2012 | Hunnicutt et al. | |

FOREIGN PATENT DOCUMENTS

| | | | |
|---|---|---|---|
| DE | 2930779 | | 2/1980 |
| DE | 3401404 | | 7/1985 |
| DE | 4101575 | | 7/1992 |
| DE | 4417251 | | 11/1995 |
| DE | 4422942 | | 1/1996 |
| EP | 250948 | | 1/1988 |
| EP | 261972 | | 3/1988 |
| EP | 1024285 | | 8/2000 |
| GB | 2238267 | | 5/1991 |
| JP | Sho 39-990 | | 2/1964 |
| JP | 04-000003 | | 1/1992 |
| JP | 06-117414 | | 4/1994 |
| JP | 2001184125 | | 7/2001 |
| JP | 2003-049933 | | 2/2003 |
| JP | Sho 63-148062 | | 7/2003 |
| JP | 2006-080194 | | 3/2006 |
| WO | 99/16096 | A1 | 4/1999 |
| WO | 99/24783 | A1 | 5/1999 |
| WO | 00/14415 | A2 | 3/2000 |
| WO | 00/14415 | A3 | 7/2000 |
| WO | 2005/084211 | A2 | 9/2005 |
| WO | 2005/084211 | A3 | 1/2006 |
| WO | 2006/076386 | A1 | 7/2006 |
| WO | 2008/076388 | A1 | 6/2008 |
| WO | 2008/076388 | B1 | 8/2008 |
| WO | 2008/121365 | A1 | 10/2008 |
| WO | 2008/121369 | A1 | 10/2008 |
| WO | 2010/019329 | A2 | 2/2010 |
| WO | 2010/019329 | A3 | 2/2010 |
| WO | 2010/019665 | A2 | 2/2010 |
| WO | 2010/019665 | A3 | 2/2010 |
| WO | 2010/065804 | A3 | 6/2010 |
| WO | 2011/022267 | A2 | 2/2011 |
| WO | 2011/022267 | A3 | 2/2011 |
| WO | 2011/094300 | A2 | 8/2011 |
| WO | 2011/094300 | A3 | 8/2011 |
| WO | 2011/094302 | A2 | 8/2011 |
| WO | 2011/094302 | A3 | 8/2011 |

OTHER PUBLICATIONS

Madou, Marc, “Fundamentals of Microfabrication”, Boca Raton: CRC Press, 1997, 405-406.

Ayon et al., “Etching Characteristics and Profile Control in a Time Multiplexed ICP Etcher,” Proc. of Solid State Sensor and Actuator Workshop Technical Digest, Hilton Head SC, (Jun. 1998) 41-44.

Bartha et al., “Low Temperature Etching of Si in High Density Plasma Using SF6/02,” Microelectronic Engineering, and Actuator Workshop Technical Digest, Hilton Head SC, (Jun. 1998) 41-44.

Booth, Steve and Kaina, Rachid, Fluid Handling—Big Gains from Tiny Valve, Appliance Design (Apr. 2008), pp. 46-48.

Controls Overview for Microstaq Silicon Expansion Valve (SEV), Rev. 1, Dec. 2008 [online], [retrieved May 17, 2010]. Retrieved from the Internet <URL: http://www.microstaq.com/pdf/SEV_controls.pdf>.

Copeland, Michael V., Electronic valves promise big energy savings, FORTUNE, Sep. 9, 2008 [online], [retrieved Sep. 9, 2008]. Retrieved from the internet <URL: http://techland.blogs.fortune.cnn.com/2008/09/09/electronic-valves-promise-big-energy-savings>.

Fung et al., “Deep Etching of Silicon Using Plasma” Proc. of the Workshop on Micromachining and Micropackaging of Transducers, (Nov. 7-8, 1984) pp. 159-164.

Gui, C. et al, “Selective Wafer Bonding by Surface Roughness Control”, Journal of the Electrochemical Society, 148 (4) G225-G228 (2001).

Gui, C. et al., “Fusion bonding of rough surfaces with polishing technique for silicon micromachining”, Microsystem Technologies (1997) 122-128.

Günther, Götz, “Entwicklung eines pneumatischen 3/2-Wege-Mikroventils”, O + P Olhydraulik Und Pneumatik, Vereinigte Fachverlage, Mainz, DE, vol. 42, No. 6, Jun. 1, 1998, pp. 396-398, XP000831050, ISSN: 0341-2660.

Higginbotham, Stacey, Microstaq’s Tiny Valves Mean Big Energy Savings [online], [retrieved Dec. 8, 2008]. Retrieved from the Internet <URL: http//earth2tech.com/2008/09/09/microstaqs-tiny-valves-mean-big-energy savings (posted Sep. 9, 2008)>.

J. Mark Noworolski, et al.,“Process for in-plane and out-of-plane single-crystal-silicon thermal microactuators”, Sensors and Actuators A 55 (1996); pp. 65-69.

Jonsmann et al., “Compliant Electra-thermal Microactuators”, IEEE Technical Digest , Twelfth IEEE International Conference on Micro Electro Mechanical Systems Jan. 17-21, 1999, Orlando, Florida, pp. 588-593, IEEE Catalog No. 99CH36291C.

K.R. Williams et al., “A Silicon Microvalve for the Proportional Control of Fluids”, Transducers ’99, Proc. 10th International Conference on Solid State Sensors and Actuators, held Jun. 7-10, 1999, Sendai, Japan, pp. 18-21.

Keefe, Bob, Texas firm says value-replacing chip can drastically cut energy use, Atlanta Metro News, Sep. 10, 2008 [online], [retrieved Sep. 10, 2008]. Retrieved from the Internet <URL: http://www.ajc.com/search/content/shared/money/stories/2008/09/microstaq10_cox-F9782.html>.

Klaassen et al., “Silicon Fusion Bonding and Deep Reactive Ion Etching; A New Technology for Microstructures,” Proc., Transducers 95 Stockholm Sweden, (1995) 556-559.

Linder et al., “Deep Dry Etching Techniques as a New IC Compatible Tool for Silicon Micromachining,” Proc, Transducers, vol. 91, (Jun. 1991) pp. 524-527.

Luckevich, Mark, MEMS microvlaves: the new valve world, Valve World (May 2007), pp. 79-83.

MEMS, Microfluidics and Microsystems Executive Review [online], Posted Apr. 16, 2009. [retrieved May 17, 2010]. Retrieved from the Internet <URL: http:www.memsinvestorjournal.com/2009/04/mems-applications-for-flow-control-.html>.

Microstaq Announces High Volume Production of MEMS-Based Silicon Expansion Valve [onlne], [retrieved Jan. 27, 2010]. Retrieved from the Internet <URL: http://www.earthtimes.org/articles/printpressstory.php?news+1138955 (posted Jan. 27, 2010)>.

Microstaq Product Descriptions, SEV, CPS-4, and PDA-3 [online], Published 2009, [retrieved May 17, 2010]. Retrieved from the Internet <URL: http://www.microstaq.com/products/index.html>.
Microstaq Product Description, Proportional Direct Acting Silicon Control Valve (PDA-3) [online], Published 2008, [retrieved May 17, 2010]. Retrieved from the Internet <URL: http://www.microstaq.com/products/pda3.html>.
Microstaq Product Description, Proportional Piloted Silicon Control Valve (CPS-4) [online], Published 2008, [retrieved May 17, 2010]. Retrieved from the Internet <URL: http://www.microstaq.com/products/cps4.html>.
Microstaq Technology Page [online], Published 2008, [retrieved May 17, 2010]. Retrieved from the Internet <URL: http://www.microstaq.com/technology/index.html>.
Petersen et al. "Surfaced Micromachined Structures Fabricated with Silicon Fusion Bonding" Proc., Transducers 91, (Jun. 1992) pp. 397-399.
Press Release, Freescale and Microstaq Join Forces on Smart Superheat Control System for HVAC and Refrigeration Efficiency (posted Jan. 22, 2008) [online], [retrieved May 17, 2010]. Retrieved from the Internet <URL: http://www.microstaq.com/pressReleases/prDetail_04.html>.
Press Release, Microstaq Unveils Revolutionary Silicon Expansion Valve at Demo 2008 [online], [retrieved May 17, 2010]. Retrieved from the Internet <URL: http://www.microstaq.com/pressReleases/prDetail_05.html (posted Sep. 8, 2008)>.
Press Release, Microstaq Mastering Electronic Controls for Fluid-Control Industry (posted May 5, 2005) [online], [retrieved May 17, 2010]. Retrieved from the Internet <URL: http://www.microstaq.com/pressReleases/prDetail_02.html>.
Press Release, Nanotechnology Partnerships, Connections Spur Innovation for Fluid Control Industries (posted Jun. 9, 2005) [online], [retrieved May 17, 2010]. Retrieved from the Internet <URL: http://www.microstaq.com/pressReleases/prDetail_03.html>.
Product Review, greentechZONE Products for the week of May 18, 2009 [online], [retrieved May 17, 2010]. Retrieved from the Internet <URL: http://www.en-genius.net/site/zones/greentechZONE/product_reviews/grnp_051809>.
SEV Installation Instructions [online], [retrieved May 17, 2010]. Retrieved from the Internet <URL: http://www.microstaq.com/pdf/SEV_Instruction_sheet.pdf>.
Silicon Expansion Valve Information Sheet [online], [retrieved May 17, 2010]. Retrieved from the Internet <URL: http://www.microstaq.com/pdf/SEV_Infosheet_2_0.pdf>.
Silicon Expansion Valve (SEV)—for Heating, Cooling, and Refrigeration Applications [online], [retrieved May 17, 2010]. Retrieved from the Internet <URL: http://www.microstaq.com/pdf/SEV_Quicksheet.pdf>.
Silicon Expansion Valve Data Sheet [online], [retrieved May 17, 2010]. Retrieved from the Internet <URL: http://www.microstaq.com/pdf/SEV_Datasheet_1_8.pdf>.
SMIC Announces Successful Qualification of a MEMS Chip for Microstaq (posted Oct. 26, 2009) [online], [retrieved May 17, 2010]. Retrieved from the Internet <URL: http://www.prnewswire.com/news-releases/smic-announces-successful-qualification-of-a-mems-chip-for-microstaq-65968252.html (posted Oct. 26, 2009)>.
SMIC quals Microstaq MEMS chip for fluid control (posted Oct. 26, 2009) [online], [retrieved May 17, 2010]. Retrieved from the Internet <URL: http://www.electroiq.com/ElectroiQ/en-us/index/display/Nanotech_Article_Tools_Template.articles.small-times.nanotechmems.mems.microfluidics.2009.10.smic-quals_microstaq.html>.
Tiny Silicon Chip Developed by Microstaq Will Revolutionize Car Technology (posted May 19, 2005) [online], [retrieved May 19, 2005]. Retrieved from the Internet <URL: http://www.nsti.org/press/PRshow.html?id=160>.
Turpin, Joanna R., Soft Economy, Energy Prices Spur Interest in Technologies [online], Published Dec. 8, 2008. [retrieved May 18, 2010]. Retrieved from the Internet <URL: http://www.achrnews.com/copyright/BNP_GUID_9-5-2006_A_10000000000000483182>.
Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.
Yunkin et al., "Highly Anisotropic Selective Reactive Ion Etching of Deep Trenches in Silicon," Microelectronic Engineering, Elsevier Science B.V., vol. 23, (1994) pp. 373-376.
Zhixiong Liu et al., "Micromechanism fabrication using silicon fusion bonding", Robotics and Computer Integrated Manufacturing 17 (2001) 131-137.
English Translation of Chinese Office Action, Application No. 200980156187 dated Jun. 28, 2013.

* cited by examiner

FLUID FLOW CONTROL ASSEMBLY

CROSS REFERENCE TO RELATED APPLICATIONS

This application claims the benefit of U.S. Provisional Application No. 61/120,412 filed Dec. 6, 2008.

BACKGROUND OF THE INVENTION

This invention relates in general to valves for controlling fluid flow and more particularly, to a fluid flow control assembly for controlling fluid flow in two directions of flow.

Valves are widely used for controlling the flow of a fluid from a source of pressurized fluid to a load device or from a load device to a low pressure reservoir. Frequently, a pump, or other device, is provided as the source of pressured fluid. The flow of the fluid is selectively controlled by a valve to control the operation of the load device.

One type of valve is a microvalve. A microvalve system is a MicroElectroMechanical System (MEMS) relating in general to semiconductor electromechanical devices.

MEMS is a class of systems that are physically small, having features with sizes in the micrometer range or smaller. A MEMS device is a device that at least in part forms part of such a system. These systems have both electrical and mechanical components. The term "micromachining" is commonly understood to mean the production of three-dimensional structures and moving parts of MEMS devices.

MEMS originally used modified integrated circuit (computer chip) fabrication techniques (such as chemical etching) and materials (such as silicon semiconductor material) to micromachine these very small mechanical devices. Today there are many more micromachining techniques and materials available.

The term "microvalve," as used in this application, means a valve having features with sizes in the micrometer range or smaller, and thus by definition is at least partially formed by micromachining. The term "microvalve device," as used in this application, means a device that includes a microvalve, and that may include other components. It should be noted that if components other than a microvalve are included in the microvalve device, these other components may be micromachined components or standard sized (larger) components, also known as macro sized components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

One type of microvalve is the micro spool valve. The micro spool valve typically consists of a micromachined spool disposed in a chamber formed in an intermediate layer of multilayer valve housing. A variety of ports through the layers of the housing provide fluid communication with the chamber. The micromachined spool is moveable in the chamber to selectively allow fluid communication though the chamber by blocking particular ports depending on the desired result. In operation, a differential pressure is exerted across the micromachined spool to move the micromachined spool into a desired position. Typically, the differential pressure is controlled by a pilot valve.

Another type of microvalve, often used as a pilot valve, consists of a beam resiliently supported by the body at one end. In operation, an actuator forces the beam to bend about the supported end of the beam. In order to bend the beam, the actuator must generate a force sufficient to overcome the spring force associated with the beam. As a general rule, the output force required by the actuator to bend or displace the beam increases as the displacement requirement of the beam increases.

In addition to generating a force sufficient to overcome the spring force associated with the beam, the actuator must generate a force capable of overcoming the fluid flow forces acting on the beam that oppose the intended displacement of the beam. These fluid flow forces generally increase as the flow rate through the fluid ports increases.

As such, the output force requirement of the actuator and in turn the size of the actuator and the power required to drive the actuator generally must increase as the displacement requirement of the beam increases and/or as the flow rate requirement through the fluid ports increases.

One specific type of microvalve system is the pilot operated microvalve. Typically, such a microvalve device includes a micro spool valve that is pilot operated by a microvalve of the type as described above. For example, U.S. Pat. Nos. 6,494,804; 6,540,203; 6,637,722; 6,694,998; 6,755,761; 6,845,962; and 6,994,115, the disclosures of which are herein incorporated by reference, disclose pilot operated microvalves and microvalves acting as pilot valves.

Microvalve devices have application in many fields for controlling the flow of fluids in systems such as hydraulic, pneumatic, and refrigerant systems, including the Heating, Ventilation, and Air Conditioning (HVAC) field. HVAC systems may include, without limitation, such systems as refrigeration systems, air conditioning systems, air handling systems, chilled water systems, etc. Many HVAC systems, including air conditioning and refrigeration systems operate by circulating a refrigerant fluid between a first heat exchanger (an evaporator), where the refrigerant fluid gains heat energy, and a second heat exchanger (a condenser), where heat energy in the refrigerant fluid is rejected from the HVAC system. One type of HVAC system is the heat pump system, which provides the ability to reverse flow of refrigerant through portions of the HVAC system. This allows the heat pump system to act as an air conditioning system in the summer, cooling air that flows through a first heat exchanger by absorbing the heat from the air into a refrigerant pumped through the first heat exchanger. The refrigerant then flows to a second heat exchanger, where the heat gained by the refrigerant in the first heat exchanger is rejected. However, during the winter, the flow of refrigerant between the first and second heat exchangers is reversed. Heat is absorbed into the refrigerant in the second heat exchanger, and the refrigerant flows to the first heat exchanger, where the heat is rejected from the refrigerant into the air flowing through the first heat exchanger, warming the air passing through the first heat exchanger.

SUMMARY OF THE INVENTION

This invention relates to an improved device for controlling fluid flow in a system, such as, but not limited to, a hydraulic, pneumatic, or HVAC system, and in particular to a reversible fluid flow control assembly.

The assembly may include a pilot valve responsive to a command signal for supplying a fluid at a command pressure to a pilot valve control port; and a pilot operated spool valve. The pilot operated spool valve may have a body having a first connector and a second connector, each of the first connector and the second connector being adapted for fluid communication with an external circuit. A spool may be disposed for sliding movement in the body. The spool may have a first end portion and a second end portion opposite the first end portion. The first end portion of the spool may be in fluid communication with the pilot valve control port such that the spool is urged to move in a first direction by the fluid at the command pressure. The spool may be movable to control a fluid flow between the first connector and the second connector through the body proportionally to the command pressure when the fluid flow is a forward flow from the first connector to the second connector and when the fluid flow is a reverse flow from the second connector to the first connector. The spool valve may use negative feedback in the form of fluid at a feedback pressure acting on the spool in a second direction, opposite the first direction, to position the spool in conjunction with the fluid at the command pressure. The spool valve may utilize unstable equilibrium of fluid forces to switch between controlling the forward flow and the reverse flow.

According to another aspect, the reversible fluid flow control assembly may include a spool valve with a body having a first connector and a second connector and a spool movable relative to the body for controlling flow between the first connector and the second connector. The reversible flow control assembly further may include a pilot valve device developing a single pressure command. The spool valve may be responsive to the single pressure command developed in said pilot valve device to control flow between the first connector and the second connector without regard to the direction of flow. The majority of forces acting on the spool to position the spool relative to the body when fluid is flowing through the valve may be fluid forces.

Various aspects of this invention will become apparent to those skilled in the art from the following detailed description of the preferred embodiment, when read in light of the accompanying drawings.

DETAILED DESCRIPTION OF THE PREFERRED EMBODIMENT

Preliminarily, it should be understood that in this description and in the claims, the use of the singular word "port", "aperture", "fluid conduit", "passageway", or words of similar import, should be considered to include the possibility of multiple ports (apertures, fluid conduits, passageways, etc.) with the same functionality attributed to the single port (apertures, fluid conduits, passageways, etc.) unless explicitly and definitely limited to the singular. Furthermore, the use of directional terms such as "left" and "right", and words of similar import, should be interpreted in the context of the figure(s) under discussion, and should not be interpreted as limitations on orientation during use or the scope of the claims.

Figure 1:
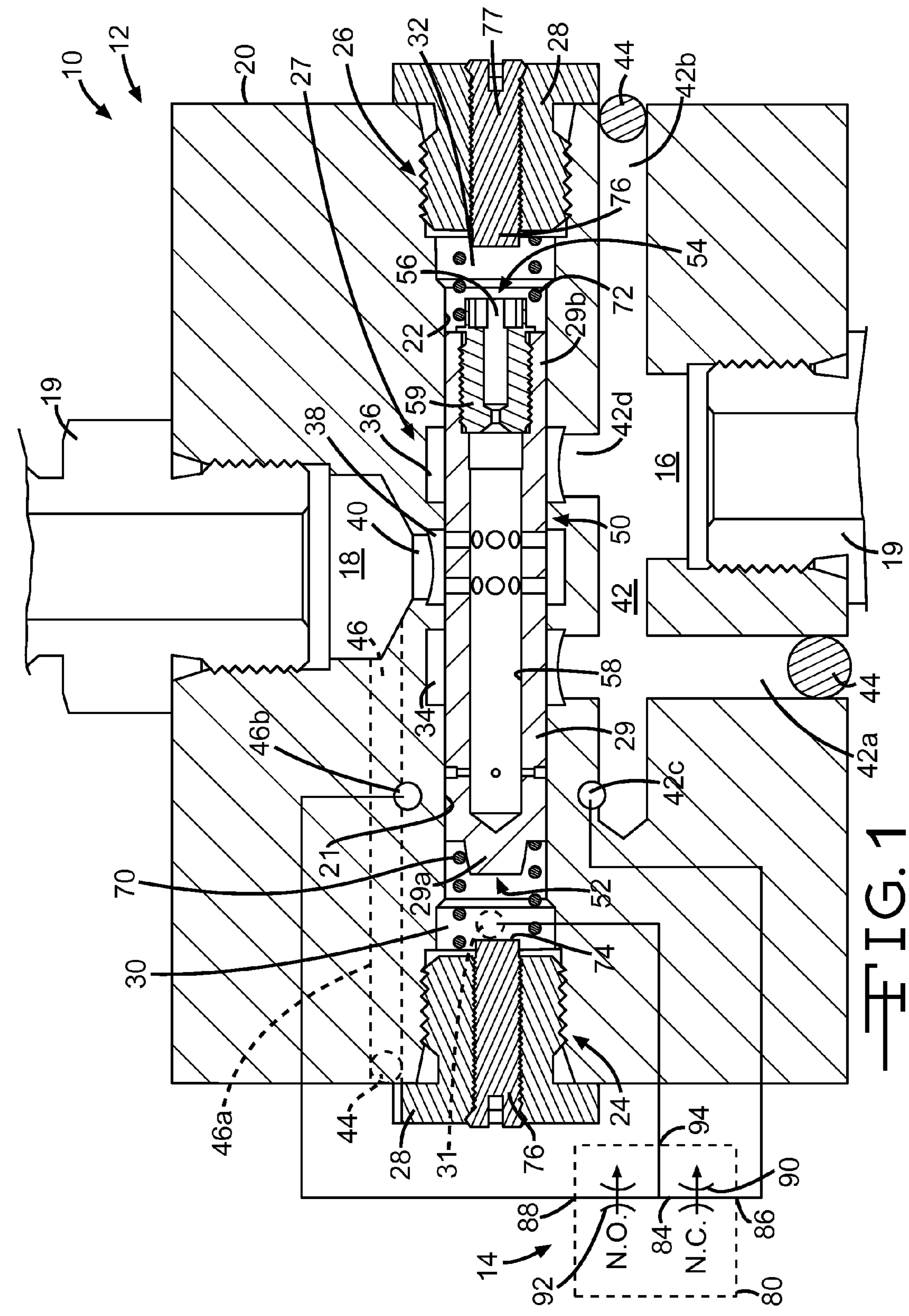
FIG. 1 is a partial cross-section and partial schematic representation of a reversible fluid flow control device.
Figure 2:
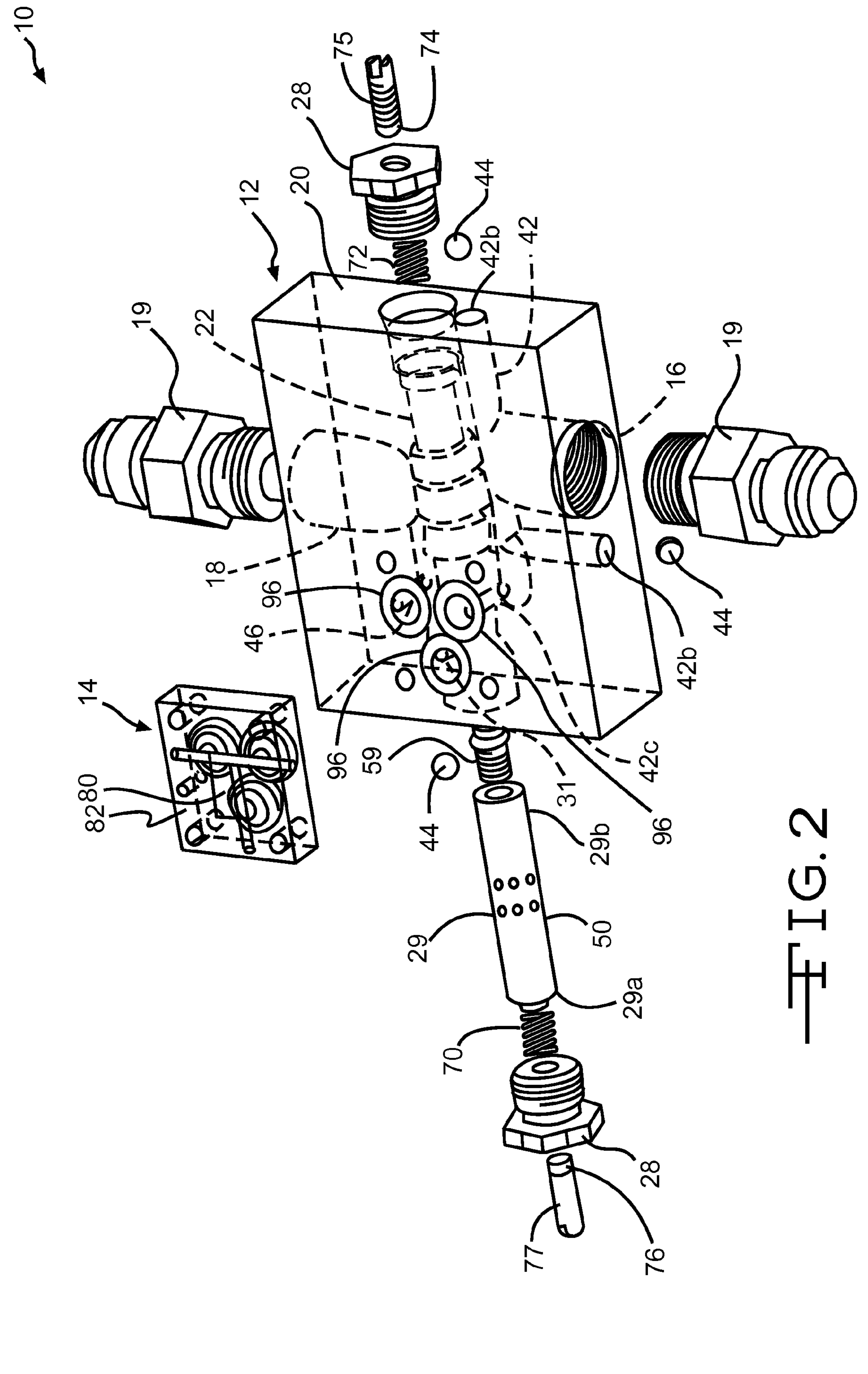
FIG. 2 is an exploded perspective view of the reversible fluid flow control device.

Referring now to the drawings, wherein like reference numbers and characters may represent like elements through out all of the figures, there is illustrated in FIGS. 1 and 2 a reversible fluid flow control assembly, generally indicated at 10. The flow control assembly 10 may include a spool valve, indicated generally at 12, and a pilot valve device, indicated generally at 14. The spool valve 12 and the pilot valve device 14 each may be in fluid communication with a first connector 16, by means of which the flow control assembly 10 may be connected in fluid communication with a first portion of a system (not shown) in which the flow control assembly 10 may be installed, as will be described in detail below. As will also be described in detail below, the spool valve 12 and the pilot valve device 14 each may be in fluid communication with a second connector 18, by means of which the flow control assembly 10 may be connected in fluid communication with a second portion of the system which the flow control assembly 10 may be installed. The first connector 16 and the second connector 18 each may be any suitable structure by means of which the flow control assembly 10 may be connected for installation in the system, including without limitation, threaded connections, welded connections, brazed connections, press-fit connections, rolled connections, permanently deformable connections, adhesive connections, compression fitting connections, etc.

The spool valve 12 may include a body 20. Preferably the first connector 16 and the second connector 18 are at least partially formed in the body 20, as is the case in the embodiment illustrated in FIGS. 1 and 2, where each of the first connector 16 and the second connector 18 is shown as a threaded connection port which can threadably accept standard hydraulic tube fittings 19. The body 20 may be made of any material suitable for the application, such as aluminum or other metal.

The body 20 may have an interior wall surface 21 defining a bore 22 therethrough. The bore 22 may have a first end portion, indicated generally at 24, a second end portion, indicated generally at 26, and a central portion, indicated generally at 27. The first end portion 24 of the bore 22 may be enlarged and threaded as shown to accept a plug 28. Similarly, the second end portion 26 of the bore 22 may be enlarged and threaded as shown to accept another plug 28.

The spool valve 12 may further include a spool 29 disposed for sliding movement in the bore 22. The spool 29 may have a first end portion **29*a* and a second end portion 29*b*. As illustrated in FIGS. 1 and 2, the spool 29 may be oriented in the bore 22 with the first end portion 29*a* of the spool 29 near the first end portion 24 of the bore 22, and the second end portion 29*b* of the spool 29 near the second end portion 26 of the bore 22. The structure of the spool 29** will be discussed in further detail below.

The spool 29 and the plug 28 in the first end portion 24 of the bore 22 cooperate with the body 20 to define a command chamber 30 in the first end portion 24 of the bore 22. The purpose of the command chamber 30 will be discussed below. A fluid conduit 31 is formed in the body 20 which may be in fluid communication with the command chamber 30 and, as will be discussed further below, in fluid communication with the pilot valve device 14. The spool 29 and the plug 28 in the second end portion 26 of the bore 22 cooperate with the body 20 to define a feedback chamber 32 in the second end portion 26 of the bore 22. The purpose of the feedback chamber 32 will be discussed below.

As illustrated in FIG. 1, a plurality of cavities may be formed in the body 20 in fluid communication with the central portion 27 of the bore 22, at axially spaced locations along the bore 22. A first one of this plurality of cavities may take the form of a circumferentially-extending first groove 34 formed in the surface 21 of the body 20 defining the bore 22 at a first axial location along the bore 22, which, compared to the locations of the rest of the plurality of cavities, may be seen to be relatively close to the first end portion 24 of the bore 22, and thus closest to the command chamber 30. A second one of this plurality of cavities may take the form of a circumferentially-extending second groove 36 formed in the surface 21 of the body 20 defining the bore 22 at a second axial location along the bore 22 which may be closer to the second end portion 26 of the bore 22 (and thus closer to the feedback chamber 32) than the first axial location where the first groove 32 may be located. A third one of this plurality of cavities may take the form of a circumferentially-extending third groove 38 formed in the surface 21 defining the bore 22 at a third axial location along the bore 22 which is intermediate, preferably midway between the first axial location at which the first groove 34 may be located and the second axial location at which the second groove 36 may be located.

The body 20 may define a fluid conduit 40 providing fluid communication between the second connector 18 and the third groove 38. The body 20 may also define a fluid conduit 42 providing fluid communication between the first connector 16 and both of the first groove 34 and the second groove 36. In the example illustrated in FIGS. 1 and 2, the fluid conduit 42 is comprised in part by intersecting bores **42*a* and 42*b*, which may be formed, for example, by drilling through the body 20 from the surface of the body 20, and then closing the outer ends of the bores 42*a* and 42*b*, in some manner, such as by pressing in balls 44, which may be followed by deformation of the body 20 by rolling, staking, etc., to capture the balls 44 in their respective bores. The bore 42*a* intersects with the first groove 34, while the bore 42*b* intersects with the first connector 16. The body 20 also defines a third bore 42*c*, which also comprises a portion of the fluid conduit 42, and may also, for example, be drilled from the surface of the body 20 to intersect and communicate with the bore 42*b*. However, the outer end of the bore 42*c* is not closed, but rather may be open to provide fluid communication with the pilot valve 14 in a manner which will be discussed below. The body 20 also defines a fourth bore 42*d* which provides fluid communication between the bore 42*b* and the second groove 36. The bore 42*d* may be formed, for example, by drilling axially from an inner end of the first connector 16 to the second groove 36**.

The body 20 may also define a fluid conduit 46 providing fluid communication between the second connector 18 and the pilot valve 14 in a manner which will be discussed below. In the example illustrated in FIG. 1, the fluid conduit 46 is comprised of intersecting bores **46*a* and 46*b*, which may be formed, for example, by drilling through the body 20 from the surface of the body 20. The outer end of the bore 46*a* is closed in some manner, such as by pressing in a ball 44, which may be followed by deformation of the body 20 by rolling, staking, etc., to capture the ball 44 in the bore 46*a*. The bore 46*b* remains open to provide communication with the pilot valve 14 in a manner which will be discussed below. The bore 46*a* intersects with the second connector 18**.

Figure 3:
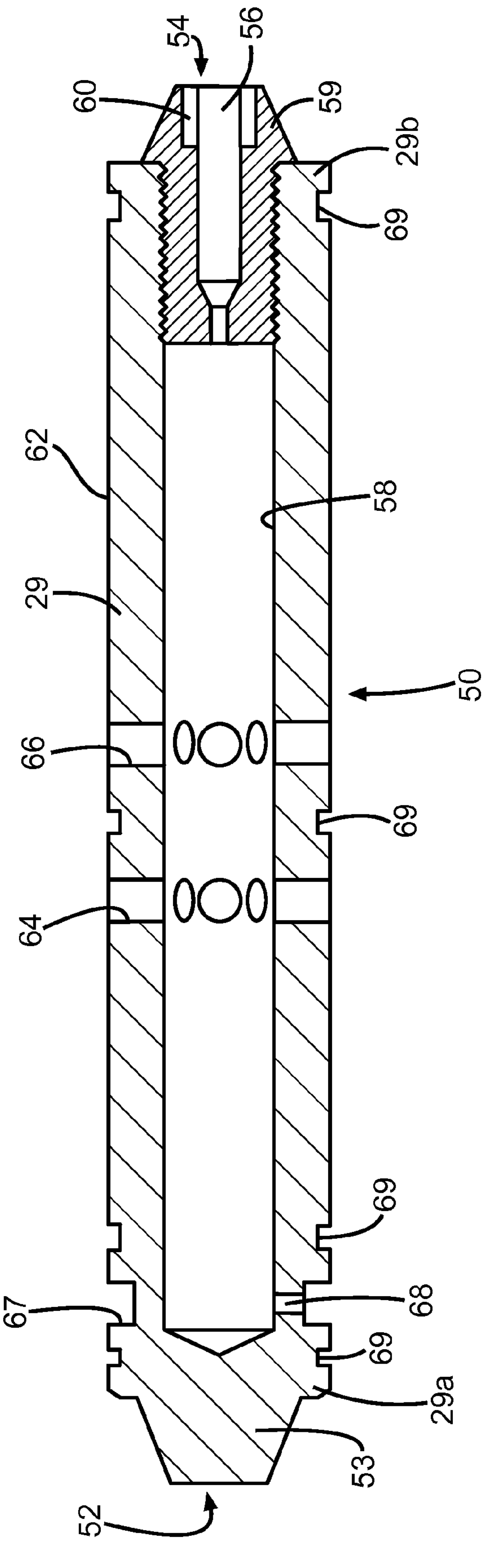
FIG. 3 is a sectional view of a spool of the reversible fluid flow control device.

Now referring additionally to FIG. 3, the spool 29 may have a central portion, indicated generally at 50, between the first end portion **29*a* and the second end portion 29*b*. The spool 29 may have a first axial end face, indicated generally at 52 on the first end portion 29*a* which is in fluid communication with the command chamber 30. The first axial end face 52** may have a central boss 53 formed thereon, the purpose of which will be discussed below. The spool 29 may have a second axial end face, indicated generally at 54, on the second end portion 29*b* which is in fluid communication with the feedback chamber 32. The second axial end face 54 may have an opening 56 defined therein.

The spool 29 may have an internal axial passageway 58 defined therein. The axial passageway 58 may communicate with the opening 56 in the second axial end face 54. The axial passageway 58 may extend from the opening 56 into the central portion of the spool 29. The second end portion 29*a* may include a damping orifice 59 that restricts communication between the portion of the axial passageway in the central portion 50 of the spool 29 and the feedback chamber 32, in order to dampen movement of the spool 29 during operation. In the illustrated embodiment, the orifice 59 is formed as a threaded insert which is threadably fixed in the second end 29*b* of the spool 29. A slot 60 may be formed in the threaded orifice 59 to allow the use of a screwdriver or other tool to turn the threaded orifice 59 during installation. Of course, the orifice 59 may be affixed to the spool 29 in any suitable manner, or may be integrally formed with the spool 29, if a reduced diameter (compared to the diameter of the rest of the axial passageway 58) orifice is provided for damping at all.

The spool 29 may have an exterior surface 62. The spool 29 may have a first port 64 at a first axial location in the central portion 50 of the spool 29 providing fluid communication between the exterior surface 62 and the axial passageway 58. The spool 29 may have a second port 66 in the central portion 50 of the spool 29 at a second axial location between the first axial location and the second end portion 29*b* of the spool 29 providing fluid communication between the axial passageway and the exterior surface 62 of the spool 29. In the illustrated embodiment, the first port 64 may be one of a plurality of ports spaced apart circumferentially about the spool 29 at the first axial location, and the second port 66 may be one of a plurality of ports spaced apart circumferentially about the spool 29 at the second axial location.

The spool 29 may have a circumferential groove 67 formed in the exterior surface 62 at an axial location between the first axial location and the first end portion 29*a* of the spool 29. The spool 29 may further have an aperture 68 providing fluid communication between the circumferential groove 67 and the axial passageway 58 formed in the spool 29. The aperture 68 allows fluid at feedback pressure existing in the axial passageway 58 during equilibrium conditions to be distributed about the spool 29 in the groove 67, which, as will become clearer during the discussion of operation below, minimizes the differential pressure between the command chamber 30 and the groove 67, and thus minimizes leakage out of the command chamber 30 between the surface 21 defining the bore 22 and the surface 62 of the spool 29.

The spool 29 may further be provided with a plurality of circumferentially extending grooves 69, which may be relatively shallow compared to the groove 67. The grooves 69 may be formed in the surface 62, for example, on either side of the groove 67, between the first axial location and the second axial location (i.e., between the first port 64 and the second port 66, and in the second end portion 29*b*). The grooves 69 are believed to help distribute any leakage that may occur between the outer surface 62 of the spool 29 and the surface 21 defining the bore 22 about the circumference of the spool 29, equalizing pressures and minimizing unequal radial loading on the spool 29 which might occur from circumferentially unequal leakage along the spool 29, thereby minimizing friction between the surface 21 and the surface 62.

Referring again to FIGS. 1 and 2, a coil spring 70 may be disposed in the command chamber 30, acting between the plug 28 in the first end portion 24 of the bore 22 and the spool 29 to urge the spool 29 toward the second end portion 26 of the bore 22. The boss 53 on the spool 29 may help to radially center the spring 70. Similarly, a coil spring 72 may be disposed in the feedback chamber 32, acting between the plug 28 in the second end portion 26 of the bore 22 and the spool 29 to urge the spool 29 toward the first end portion 24 of the bore 22. As illustrated, the orifice 59 may extend out of the second end portion 29*b* of the spool 29 to help to radially center the spring 72.

A stop structure 74 may be provided that will limit motion of the spool 29 in a first direction toward the second end portion 26 of the bore 22. In particular, the stop structure 74 may be provided to prevent the spool 29 from traveling past a desired maximum travel position, shown in FIGS. 4 and 5. The stop structure 74 may, for example, be provided on the plug 28 disposed in the second end portion 24. The stop structure 74 may be adjustable to allow adjustment of the maximum travel position. For example, the stop structure 74 in the illustrated embodiment may be a threaded member 75 threadably engaging a threaded bore formed in the associated plug 28. As most clearly seen in FIG. 5, a suitable maximum travel position may be a first position of the spool 29, which is defined as the first position of the spool 29 which is reached during movement in the first direction in which the port 66 is fully uncovered in communication with the second groove 36 and the port 64 is fully uncovered in communication with the third groove 38. If the spool 29 is moved in a second direction toward the first end portion 24 of the bore 22 from the first position illustrated in FIG. 5, the portion of the body 20 forming a land between the second groove 36 and the third groove 38 will progressively cover the port 66, decreasing the cross-sectional area through which fluid can flow between the second groove 36 and the axial passageway 58 in the spool 29. As will be further described below, the spool 29 can be positioned in any of a first range of positions, including the first position, each position in the first range of positions having a different cross-sectional area for fluid communication between the second groove 36 and the axial passageway 58 via the port 66.

Figure 5:
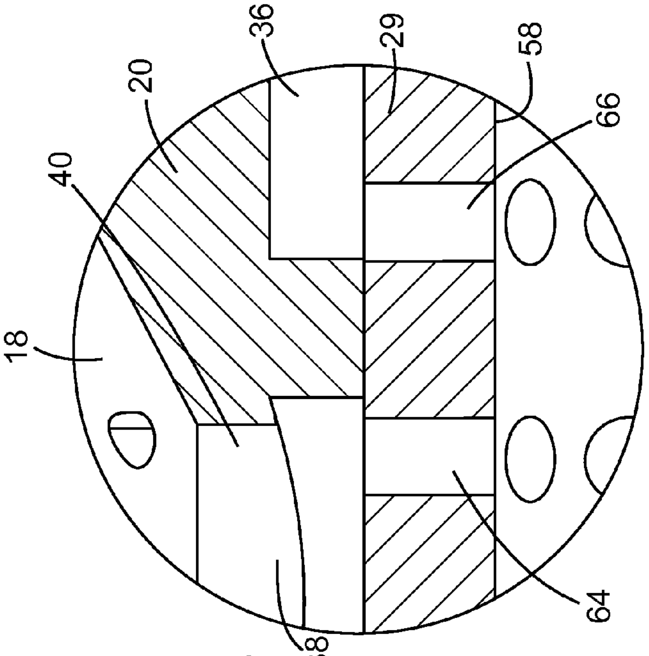
FIG. 5 is an enlarged view of a portion, indicated by the circle 5, of FIG. 4.
Figure 7:
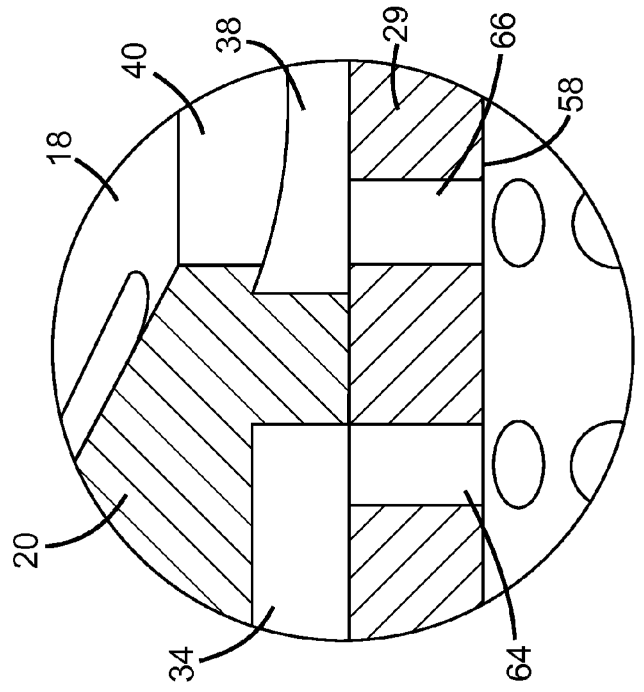
FIG. 7 is an enlarged view of a portion, indicated by the circle 7, of FIG. 6.
Figure 6:
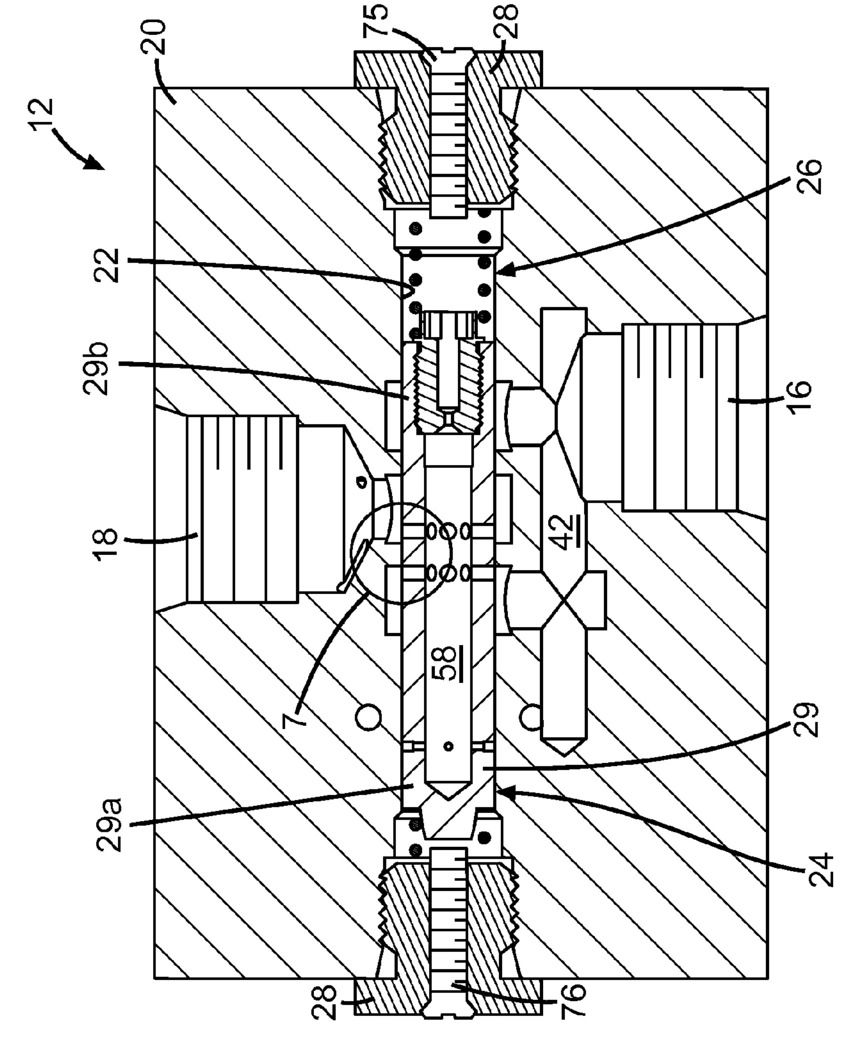
FIG. 6 is a view similar to FIG. 4, except showing the spool in a second position.

Similarly, a stop structure 76 may be provided that will engage the spool 29, limiting motion of the spool 29 in a second direction toward the first end portion 24 of the bore 22, preventing the spool 29 from traveling past a desired maximum travel position, shown in FIGS. 6 and 7. The stop structure 76 may, for example, be provided on the plug 28 disposed in the first end portion 24. The stop structure 76 may be adjustable to allow adjustment of the maximum travel position. For example, the stop structure 76 in the illustrated embodiment may be a threaded member 77 threadably engaging a threaded bore formed in the associated plug 28. As most clearly seen in FIG. 7, a suitable maximum travel position may be a second position of the spool 29, which is defined as the first position of the spool 29 which is reached during travel in the second position in which the port 64 is fully uncovered in communication with the first groove 34 and the port 66 is fully uncovered in communication with the third groove 38. If the spool 29 is moved in the second direction toward the first end portion 24 of the bore 22 from the first position illustrated in FIGS. 4 and 5, the portion of the body 20 forming a land between the first groove 34 and the third groove 38 will progressively cover the port 64, decreasing the cross-sectional area through which fluid can flow between the second groove 36 and the axial passageway 58 in the spool 29. As will be further described below, the spool 29 can be positioned in any of a second range of positions, including the second position, each position in the second range of positions having a different cross-sectional area for fluid communication between the first groove 34 and the axial passageway 58 via the port 64.

Figure 9:
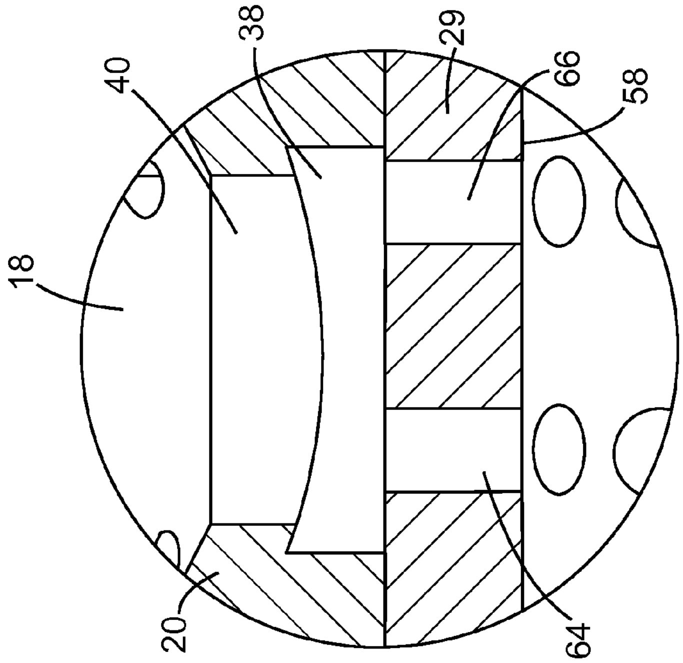
FIG. 9 is an enlarged view of a portion, indicated by the circle 9, of FIG. 8.
Figure 8:
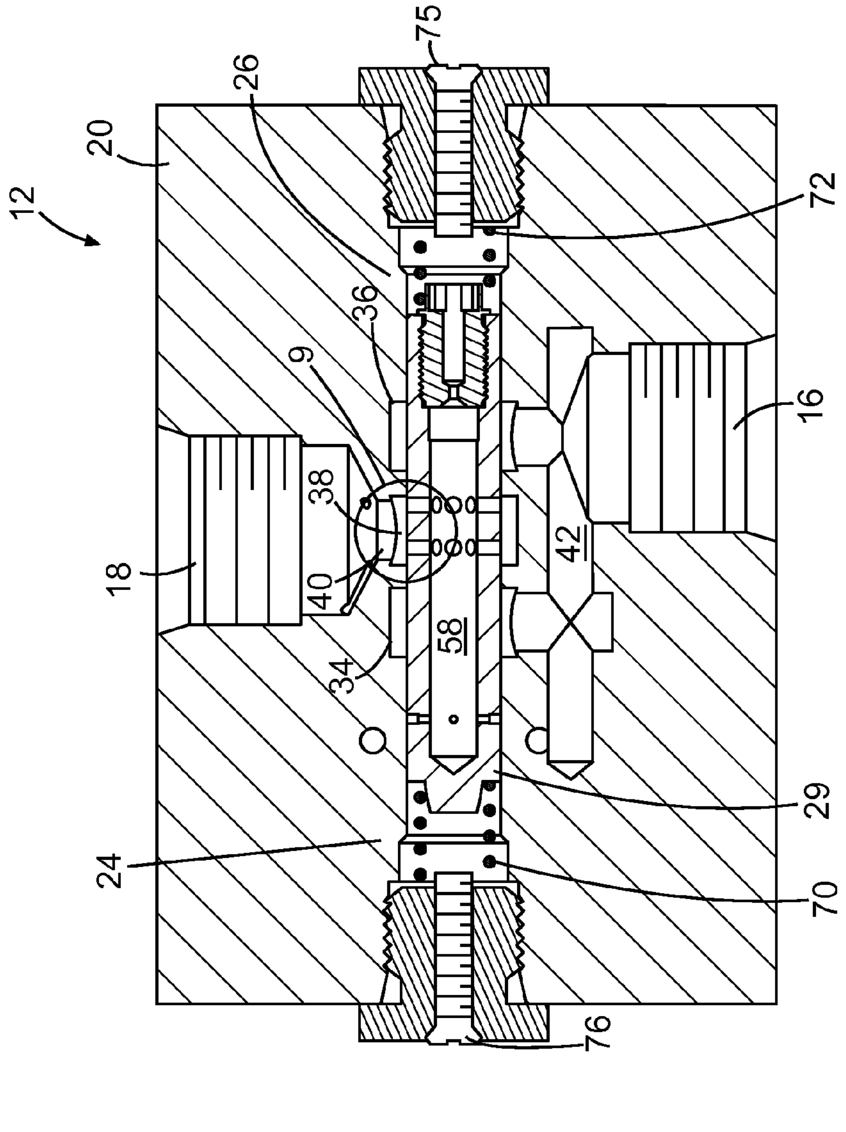
FIG. 8 is a view similar to FIG. 4, except showing the spool in a shutoff position.

The springs 70 and 72 may urge the spool 29 to a shutoff position, between the first range of positions and the second range of positions of the spool 29, which is illustrated in FIGS. 8 and 9. More specifically, the spring 70 may urge the spool 29 to move from the second range of positions toward the shutoff position, and the spring 72 may urge the spool 29 to move from the first range of positions toward the shutoff position.

In the shutoff position, both the port 64 and the port 66 may be completely uncovered to communicate with the third groove 38; however, neither the port 64 nor the port 66 is in substantial direct fluid communication with either the first groove 34 or the second groove 36, and thus substantially no fluid communication exists between the axial passageway 58 in the spool 29 and either the first groove 34 or the second groove 36.

Referring to FIGS. 1 and 2, the pilot valve device 14 may include a valve or valves 80 and a manifold 82 provided with fluid passageways interconnecting the valve 80 and the spool valve 12, as will be described below.

The valve 80 may include a fluid conduit 84 extending between a first pilot connection port 86 and a second pilot connection port 88. The flow through the fluid conduit 84 may be regulated by two variable orifices in series arrangement in the fluid conduit 84. A variable first orifice 90 may be a normally closed orifice; that is the orifice may be closed in the absence of a command signal to the valve 80. A variable second orifice 92 may be a normally open orifice. A pilot valve control port 94 may be connected in fluid communication with the fluid conduit 84 between the first orifice 90 and the second orifice 92. The valve 80 may be a single valve or microvalve containing moving components acting as the first orifice 90 and the second orifice 92. Alternatively, the valve 80 may be embodied as a plurality of valves or microvalves acting as the first orifice 90 and the second orifice 92.

One and only one pressure command used for control of the spool valve 12 is developed in the pilot valve device 14. In the illustrated embodiment, for example, the pressure command is developed in the fluid conduit 84 between the first orifice 90 and the second orifice 92 when pressurized fluid is supplied to the valve 80. The pressure developed there is the command pressure, and fluid at the command pressure is conveyed from the pilot valve device 14 to the command chamber 30 of the spool valve 12. As illustrated herein, the pressure command may be conveyed to the command chamber 30 via a single fluid conduit via a single pilot valve control port 94 and a single fluid conduit 31. However, it is contemplated that multiple fluid paths may be used, perhaps even simultaneously, to convey the single pressure command between the point at which the pressure command is developed to the point at which the pressure command is utilized to control the operation of operation of the spool valve 12, and such should be considered within the scope of the claims.

If the valve 80 is a microvalve, the manifold 82 may be advantageously used to adapt the small package size of a microvalve to the large package size of the body 20. The valve 80 may be mounted by any suitable method (such as brazing, soldering, adhesively bonding, mechanically connection, etc.) on the manifold 82, or on the body 20 if the manifold 82 is omitted. The first pilot connection port 86 is connected in fluid communication with the fluid conduit 42, via the bore 42*c*, providing uninterrupted fluid communication between the normally closed orifice 90 and the first connection 16. The second pilot connection port 88 is connected in fluid communication with the fluid conduit 46, via the bore 46*b*, thus providing uninterrupted fluid communication between the normally open orifice 92 and the second connection 18. The pilot valve control port 94 is connected in fluid communication with the fluid conduit 31, and the pilot valve control port 94 is thus in uninterrupted fluid communication with the command chamber 30.

As seen in FIG. 2, O-rings 96 may be utilized between the manifold 82 and the body 20 to prevent leakage at the interface between the manifold and the body 20 from the fluid conduit 42, the fluid conduit 46, or the fluid conduit 31.

Operation of the illustrated embodiment will now be discussed.

Figure 4:
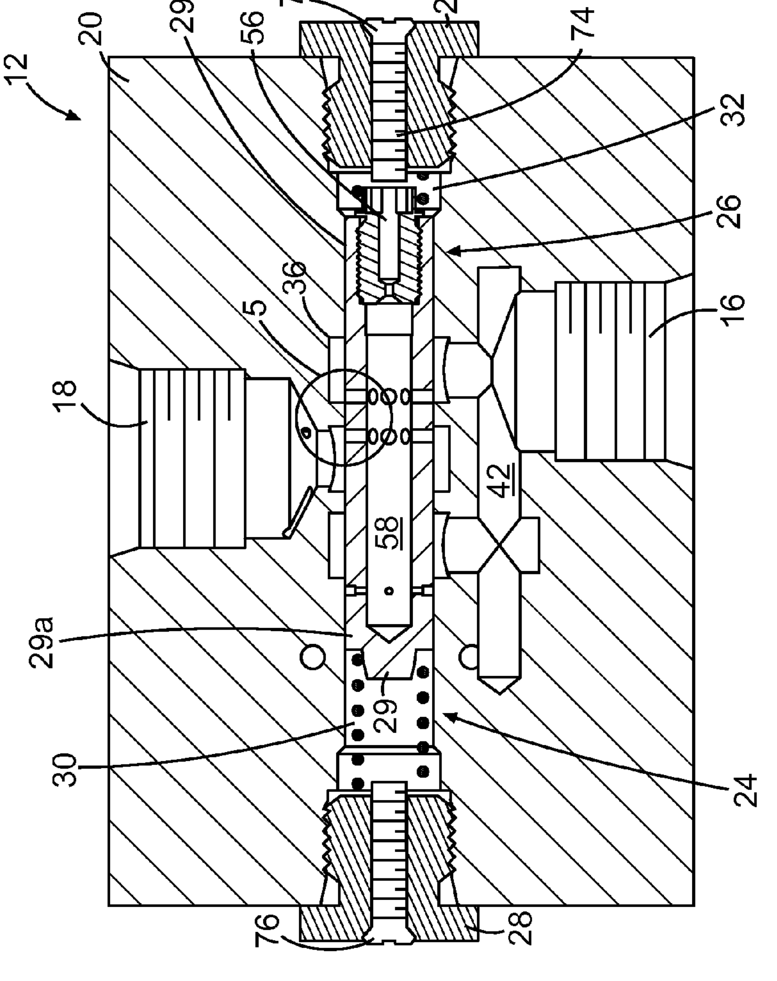
FIG. 4 is a sectional view of a spool valve of the reversible fluid flow control device, showing the spool thereof in a first position.

During operation, the reversible fluid flow control assembly 10 is installed in a system (not shown) via the first connection 16 and the second connection 18. During operation of the system, normally one of the first connection 16 and the second connection 18 will be supplied with a higher pressure (hereinafter "supply pressure") and the other of the first connection 16 and the second connection 18 will be supplied with a lower pressure (hereinafter "return pressure"). During operation, when there are differences between supply pressure and return pressure, the components of the reversible fluid control assembly 10 operate to develop two separate fluid pressures acting in opposition across the spool 29. On one side, the left as drawn in FIGS. 1 and 4, a command pressure developed in the pilot valve device 14 and supplied to the command chamber 30 pushes on the first axial end face 52 of the spool 29 to urge the spool 29 in the first direction (rightward as seen in FIGS. 1, 4 and 5), moving the spool 29 into the first range of positions of the spool 29. A pressure proportional to the position of the spool 29, referred to as feedback pressure, is developed in the axial passageway of the spool 29 as will be described below. The feedback pressure is communicated via the opening 56 from the axial passageway of the spool 29 to the feedback chamber 32 on the right side (as seen in FIGS. 1 and 4) of the spool 29. Feedback pressure in the feedback chamber 32 acting on the second axial end face 54 of the spool 29, urges the spool 29 in the second direction (leftward as seen in FIGS. 1 and 4). The spool 29 is free to move until the forces acting on either end face 52, 54 of the spool 29 balance. Note that in this discussion the forces exerted by the springs 70, 72 will not be discussed, as the springs 70, 72 would normally be chosen to have a very low spring rate, so as to not exert significant force on the spool compared to the fluid forces acting on the axial end faces 52, 54 of the spool 29; if the spring forces are significant, calculation of their effect is relatively simple and predictable balance of forces calculation for one of ordinary skill in the art. Indeed, in some applications, the springs 70, 72 may be omitted entirely. In any case, it will be appreciated that it is contemplated that in at least some embodiments, a majority of axial forces acting on the spool 29 to position the spool 29 relative to the body 20 when fluid is flowing through the spool valve 12 will be fluid forces.

Figure 10:
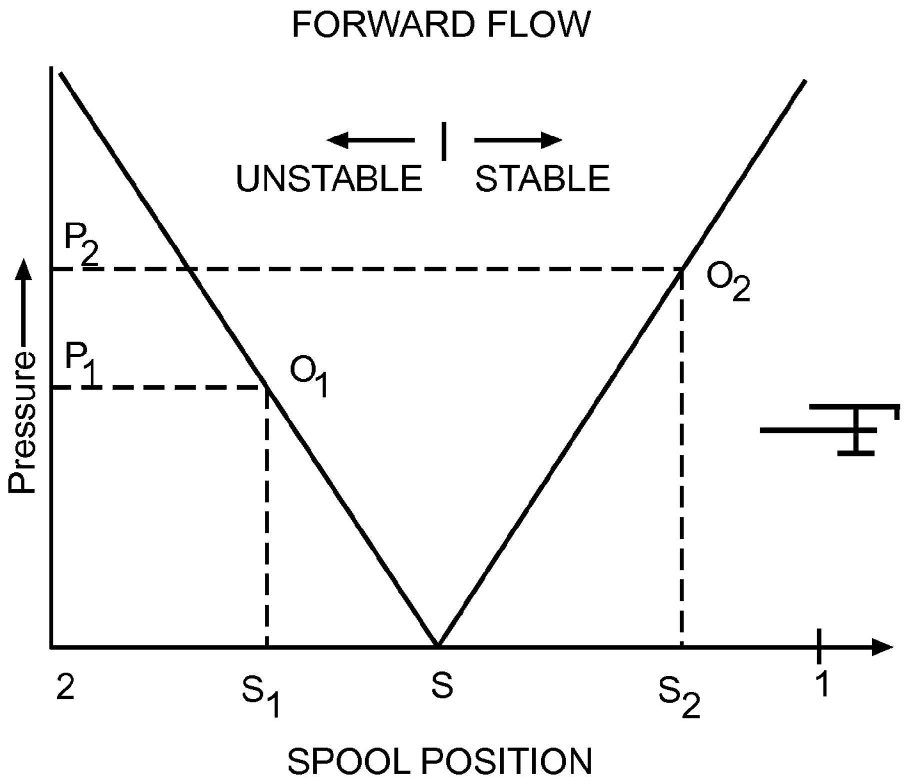
FIG. 10 is a graph of operating regions of the reversible fluid flow control device for forward flow.
Figure 11:
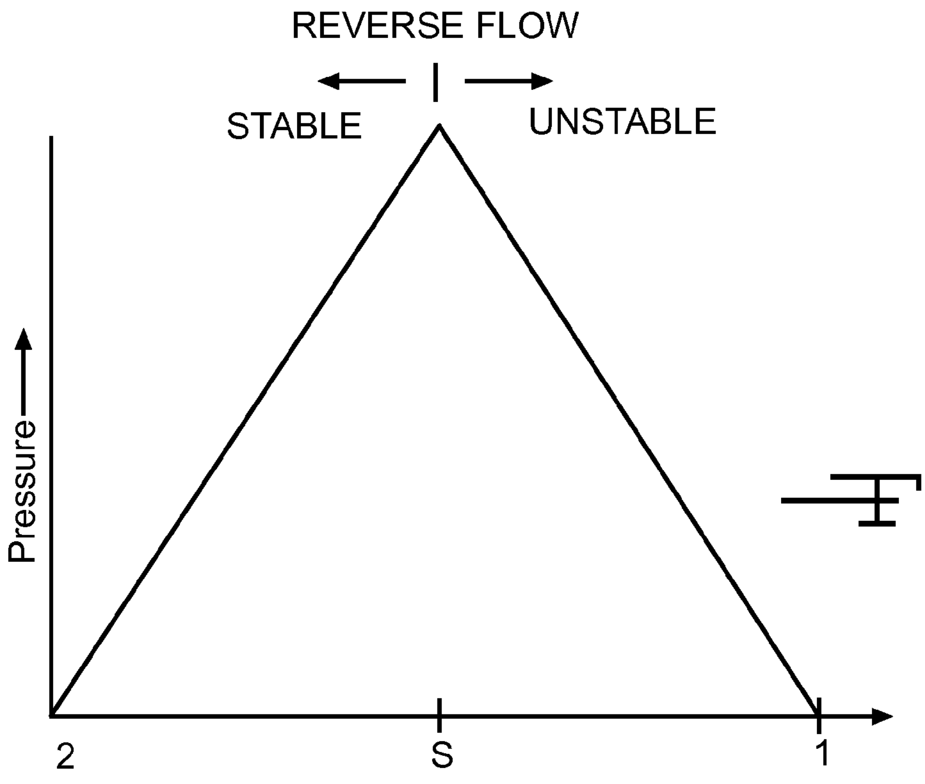
FIG. 11 is a graph similar to FIG. 10, except for reverse flow.
Figure 12:
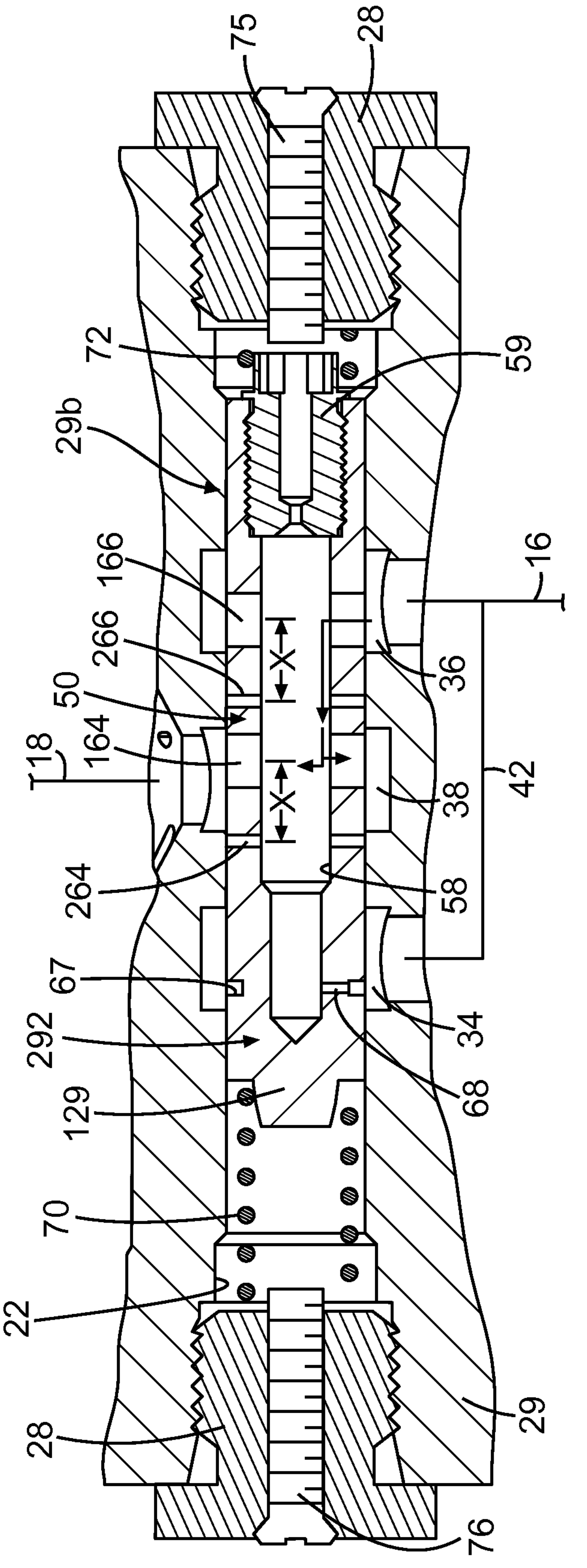
FIG. 12 is a sectional view similar to FIG. 4, but showing an alternate embodiment of a spool
Figure 13:
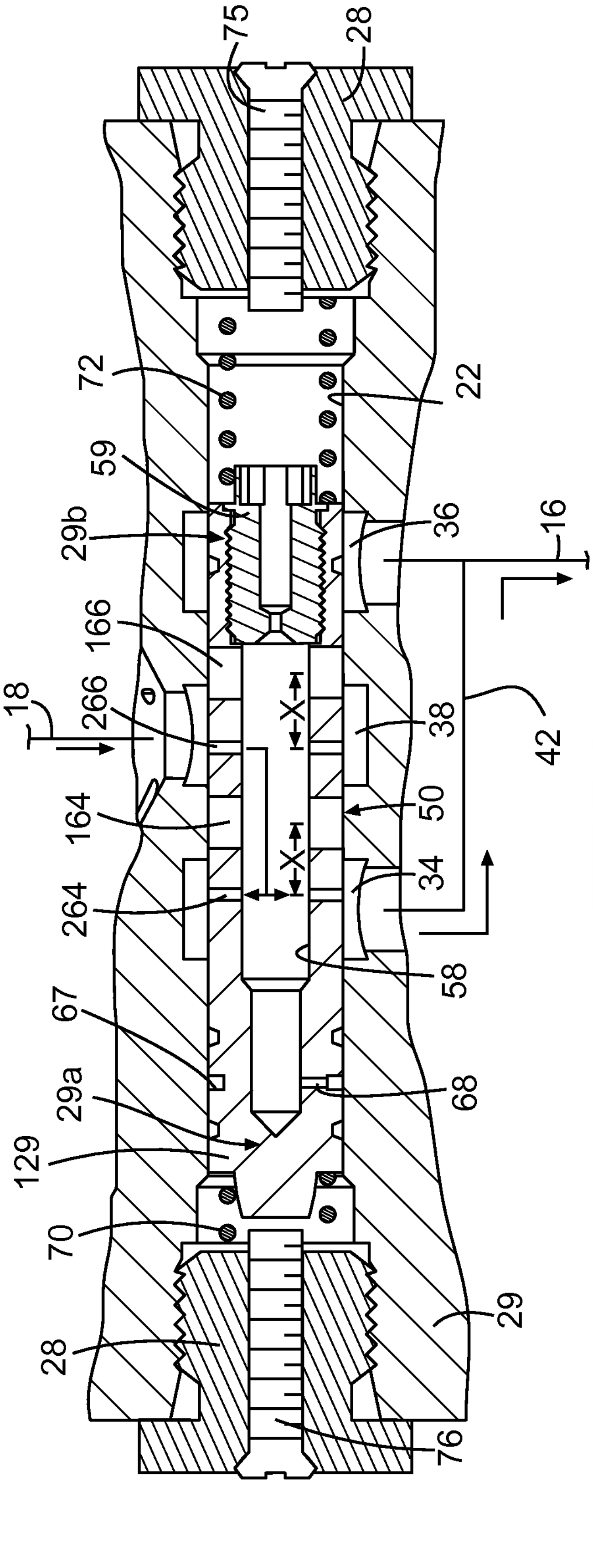
FIG. 13 is a view similar to FIG. 12, except showing the spool in a second position.

Both the command pressure and the feedback pressures will fall between supply pressure and return pressure in normal operation. FIG. 10 is a graph of feedback pressure versus position of the spool 29 during forward flow through the spool valve 12. FIG. 11 is a graph of feedback pressure versus position of the spool 29 during reverse flow of fluid through the spool valve 12.

The feedback pressure is a pressure developed between the first port 64 and the second port 66 in the axial passageway 58. During forward flow, with the spool 29 in the first range of positions, flow of fluid through the spool valve 12 travels from the first connection 16, through the second port 66, through the axial passageway 58 of the spool 29, through the first port 64 and then out through the second connection 18, as illustrated in FIGS. 4 and 5. As the spool 29 moves from the shutoff position toward the first position, the land formed by the body 20 between the second groove 36 and the third groove 38 progressively uncovers the second port 66, and the first port 64 remains uncovered and in full communication with the third groove 38. In forward flow, the third groove 38 will be at return pressure, while the second groove 36 will be at supply pressure. As the second port 66 is progressively uncovered, pressure in the axial passageway 58 will rise, as indicated on the right half of the graph in FIG. 10, where spool position "S" is the shutoff position illustrated in FIG. 1, and spool position "1" is the first position, illustrated in FIGS. 4 and 5. However, feedback pressure will not rise to the magnitude of supply pressure, since the first port 64 is continually venting fluid from the axial passageway 58 to the third groove 38, which is at return pressure. The feedback pressure in the feedback chamber 32 will equal the pressure in the axial passageway 58 once steady state operating conditions exist. During transient conditions, the pressure in the feedback chamber 32 may lag the pressure in the axial passageway due to the damping effect of the orifice 59. However, this lag may be ignored for the purpose of analyzing the steady-state to steady-state operation of the reversible fluid control assembly 10.

The current concept is best explained by describing functionality around three points, the first position of the spool 29, which is illustrated in FIGS. 4 and 5, the second position of the spool 29, which is illustrated in FIGS. 6 and 7, and the shutoff position of the spool 29, which is illustrated in FIGS. 1, 8, and 9.

In the first position with forward flow, the spool valve 12 is considered stable. Stability is defined herein as any state of operation of the spool valve 12 where a small deviation in command pressure results in movement of the spool 29 that generates a proportionate change in feedback pressure that tends to return operation of the spool valve 12 to an equilibrium condition with the spool 29 continuing to operate on the same side of the shutoff position as before the deviation in command pressure. Conversely, instability (or unstable condition) is defined as any state of operation of the spool valve where a small deviation in command pressure results in movement of the spool 29 that generates a feedback pressure that does not tend to return operation of the spool valve 12 to an equilibrium condition with the spool 29 continuing to operate on the same side of the shutoff position as before the deviation in command pressure.

Assume the spool valve 12 is operating in equilibrium with forward flow, and the spool 29 is at a position within the first range of positions, and more particularly, in a position intermediate the shutoff position and the first position (which, it will be recalled, are indicated as "S" and "1" on the graph of FIG. 10). The command signal supplied to the pilot valve device 14 is at an intermediate value. The normally closed orifice 90 of the pilot valve device 14 is partially opened, and the normally open orifice 92 of the pilot valve device 14 is also partially opened, and the pressure in the passageway 84 between the orifice 90 and the orifice 92 (the command pressure supplied via the pilot valve control port 94 to the command chamber 30 of the spool valve 12) is a steady percentage of the difference between the supply pressure supplied to the first pilot connection port 86 and the return pressure at the second pilot connection port 88. Now assume that the command signal to the pilot valve device 14 is increased. This causes the normally closed orifice 90 to open further and the normally open orifice 92 to close further. This causes the command pressure to rise. An increase in command pressure causes the spool 29 to move in the first direction, away from the command chamber 30 (rightward as seen in FIGS. 4, 5, and 10). As the spool 29 moves away from the command chamber 30, feedback pressure increases. Feedback pressure increases due to the increasing ratio of cross-sectional flow area through the second port 66 (which is the port opening to supply pressure) to the cross-sectional flow area of the first port 64 (which is the opening to return pressure), raising the pressure in the axial passageway 58. As feedback pressure increases, the spool 29 will come to rest in a new equilibrium position where feedback pressure substantially equals command pressure. The converse is true with decreasing command pressure (the spool 29 will move in the second direction, the second port 66 gets increasingly covered, lowering the ratio of the cross-sectional flow area of the through the second port 66 (which is the port opening to supply pressure) to the cross-sectional flow area of the first port 64 (which is the opening to return pressure), lowering the pressure in the axial passageway 58, and the spool 29 will come to rest in a new equilibrium position within the first range of positions when the feedback pressure falls to approximate the lowered command pressure.

Similarly, with the spool 29 positioned within the second range of positions, and the reversible fluid flow control assembly 10 operating with reverse flow (supply pressure supplied to the second connection 18, with return pressure at the first connection), the spool 29 will also be operating in a stable manner, as illustrated in FIGS. 6, 7 and the left half of the graph in FIG. 11.

Assume spool 29 is at a position within the second range of positions, and more particularly, in a position intermediate the shutoff position and the second position (which are indicated as "S" and "2" on the graph of FIG. 11). The command signal supplied to the pilot valve device 14 is at an intermediate value. The normally closed orifice 90 of the pilot valve device 14 is partially opened, and the normally open orifice 92 of the pilot valve device 14 is also partially opened, and the pressure in the passageway 84 between the orifice 90 and the orifice 92 (the command pressure supplied via the pilot valve control port 94 to the command chamber 30 of the spool valve 12) is a steady percentage of the difference between the supply pressure at the second pilot connection port 88 and the return pressure at the first pilot connection port 86.

Now assume it is desired to open the spool 29 more, that is, move the spool toward the second position to increase fluid flow through the spool valve 12. The command signal supplied to the pilot valve device 14 is increased. This causes the normally closed orifice 90 to open further, opening up the release path to return pressure at the first connection 16, and the normally open orifice 92 to close further, throttling the supply pressure supplied from the second connection 18. This causes the command pressure supplied to the command chamber to decrease. A decrease in command pressure causes the spool 29 to move in the second direction, toward the command chamber 30 (leftward as seen in FIGS. 6, 7, and 11). As the spool 29 moves toward the command chamber 30, feedback pressure will decrease. Feedback pressure decreases due to the increasing the ratio of cross-sectional flow area through the first port 66 (which is the port opening to return pressure in the first groove 34) to the cross-sectional flow area of the second port 64 (which is the opening to supply pressure). With the release path to return through the port 64 opened up, and the cross-sectional area of the flow path from supply fixed, the pressure in the axial passageway 58 will also fall. As feedback pressure decreases, the spool 29 will come to rest in a new equilibrium position where feedback pressure substantially equals command pressure, with the increased flow through the spool valve 12 that was desired. The converse is true with a decreasing command signal, which will generate an increase command pressure in the pilot valve device 14. This will cause the spool 29 to move in the first direction, so that the first port 64 will get increasingly covered, lowering the ratio of the cross-sectional flow area of the first port 64 (which is the port opening to return pressure) to the cross-sectional flow area of the second port 66 (which is the opening to supply pressure), raising the pressure in the axial passageway 58, and the spool 29 will come to rest in a new equilibrium position within the second range of positions when the feedback pressure rises to approximate the increased command pressure. The flow rate through the spool valve 12 will be lower than the original flow rate.

Now consider the possible scenarios in which the spool valve 12 is operating in an unstable operating region. As seen in FIGS. 10 and 11, there are two unstable regions: The first unstable operating region is operation in the second range of positions during forward flow, and the second unstable operating region is operation in the first range of positions during reverse flow. For each of the two unstable operating regions, the command pressure can be changed in two directions: command pressure can be increased or command pressure can be decreased. Thus, there are four scenarios to consider.

For the first scenario, consider the case in which command pressure is increased while the spool 29 is in the second range of positions during forward flow operation (for example, when forward flow is first initiated), as illustrated in FIGS. 6 and 7 and the left half of the graph of FIG. 10. The spool valve 12 will be in an unstable mode of operation, and will respond according to the principles of unstable equilibrium to changes in command pressure. While unstable, a small increase or decrease in command pressure does not result in a proportional movement in spool position, nor is there a return to equilibrium operation in a spool position on the same said of the shutoff position in which the spool 29 was before the change in command pressure.

Assuming that the spool 29 is at equilibrium at the second position (that is, with feedback and command pressures exerting equal and opposite forces on the spool 29) with forward flow existing, increased command pressure causes the spool 29 to move in the first direction, away from the command chamber 30. As the spool 29 moves away from the command chamber 30, the first port 64 will become increasingly covered, throttling the flow path from the groove 34 (which is at supply pressure during forward flow) to the axial passageway 58. The release path through the second port 66 remains wide open, and feedback pressure will decrease as the pressure in the axial passageway 58 decreases. As feedback pressure decreases, the net force pushing the spool 29 in the first direction (the right as viewed in FIGS. 6, 7 and 10) increases, accelerating movement in the first direction (away from the command chamber 30). Movement of the spool 29 will not stop in the second range of positions, but instead the spool 29 will continue past the shutoff position into the first range of positions. Once past the shutoff position, the spool valve 12 returns to stable operation for forward flow, since further movement in the first direction will result in increased communication between the groove 36 (which is at supply pressure) and the axial passageway 58, raising feedback pressure until feedback pressure counterbalances command pressure, as discussed above. At this point, the spool 29 comes to rest pending further changes to command pressure.

FIG. 10 illustrates this transition. The spool valve 12 is initially at condition $O_1$, which corresponds to spool position $S_1$ in the second range of positions, with command and feedback pressures at $P_1$. If the command pressure is raised to $P_2$, the spool 29 is urged in the first direction by the imbalance of command pressure and feedback pressure. There is no position on the operating curve between position $S_1$ and the shutoff position S in which feedback pressure will equal $P_2$, so the spool 29 moves over into the first range of positions, and moves from S to $S_2$, at which point the feedback pressure (pressure in the axial passageway 58) rises to $P_2$. Position $S_2$ is in the stable operating region of the graph of FIG. 10. Once in the stable region, the spool valve 12 will remain stable while forward flow continues.

For the second scenario, consider what would happen if all the conditions were the same as in the preceding scenario, but command pressure were reduced while the system was operating with forward flow and the spool 29 was in the second range of positions. Again, assume the spool valve 12 is initially at condition $O_1$, which corresponds to spool position $S_1$ in the second range of positions, with command and feedback pressures at $P_1$. If the command pressure is lowered, the spool 29 is urged in the second direction by the imbalance of command pressure and feedback pressure. This causes the first port 62 to become more uncovered, increasing the cross-sectional flow area between the first groove 34, which is at supply pressure, and the axial passageway 58. This causes an increase in feedback pressure, further increasing the imbalance of command pressure and feedback pressure. There is no position on the operating curve between position $S_1$ and the second position (indicated as "2" in FIG. 10) in which feedback pressure will drop to equal a command pressure less than $P_1$, so the spool 29 moves in the second direction until the stop 74 is encountered, at which point the spool 29 is in the second position. Although the spool 29 is no longer moving, the spool valve 12 is still considered to be operating in an unstable manner, since the spool 29 has not returned to equilibrium, because the command pressure and the feedback pressure are not substantially equal. To return to stable operation, a command pressure greater than maximum feedback pressure must be generated to initiate movement of the spool in the first direction. Once the command pressure exceeds the feedback pressure, the spool valve 12 will return to stable operation by moving the spool 29 to the first range of positions, in the same manner as discussed in the first scenario.

Command pressure may be raised above maximum feedback pressure in all operating modes, because, when the spool 29 is moved to the second position, the axial passageway 58 will be connected to return pressure either through the wide-open first port 64 or through the wide open second port 66 (see FIGS. 6 and 7). Thus, feedback pressure cannot reach supply pressure, and may have a magnitude only about half that of supply pressure. In contrast, by manipulating the normally open orifice 90 and the normally closed orifice 92, the pilot valve control port 94 may be substantially isolated from return pressure, and fully connected to supply pressure so that command pressure can substantially equal supply pressure.

For the third scenario, consider case where the spool 29 is in the first range of positions, and reverse flow exists, which describes the unstable region of the graph in the right half of FIG. 11. From an initial position between the shutoff position "S" and the first position "1" illustrated in FIGS. 4 and 5, any decrease in command pressure causes an imbalance with feedback pressure which urges the spool to move in the second direction (to the left in FIGS. 4, 5, and 11), past the shutoff position, and into the second range of positions (the stable region). Movement of the spool 29 in the second direction while in the second range of positions (refer to FIGS. 6 and 7) increasingly uncovers the bore 64 to open a release path through the axial passageway 58, lowering the pressure in the axial passageway 58, and thus feedback pressure. This continues until feedback pressure drops to command pressure, at which point the spool 29 comes to rest pending further changes to command pressure as the spool valve 12 returns to stable operation. Thus, the third scenario is similar to the first scenario.

For the fourth scenario, consider the case the same initial unstable conditions as the third scenario and consider the response to an increase in command pressure. Any increase in command pressure causes an imbalance with feedback pressure which urges the spool to move in the first direction (to the right in FIGS. 4, 5, and 11), past the shutoff position, and into the second range of positions (the stable region). Movement of the spool 29 in the second direction while in the second range of positions (refer to FIGS. 6 and 7) increasingly uncovers the bore 64 to open a release path through the axial passageway 58, lowering the pressure in the axial passageway 58, and thus feedback pressure. The spool 29 moves disproportionately in the first direction and will move until the spool 29 engages the stop 74, with the spool 29 in the first position. At this point, feedback pressure will be about half of the difference between supply and return pressure, since both the first port 64 and the second port 66 are both fully uncovered. The spool 29 will remain in the first position until the command pressure is dropped below feedback pressure. When this occurs, the spool 29 will begin to move disproportionately in the second direction, and will continue past the shutoff position into the second range of position, until a position is reached in which the feedback pressure decreases to the newly lowered command pressure. At this point, the spool valve 12 returns to stable operation, and the spool 29 comes to rest pending further changes to command pressure.

The shutoff position, illustrated in FIGS. 1, 8 and 9, represents the transition point for both forward and reverse flow. It will be appreciated from FIG. 9, that there may actually be a range of positions in which the spool 29 is positioned such that flow through the spool valve 12 is not possible because neither the first port 64 nor the second port 66 is aligned even partially with a groove other than the third groove 38, and thus no flow path through the spool valve 12 to or from the third groove 38 (and the second connection 18) is established. The extent of this range of positions in which flow is shut off of course depends on the spacing between the first port 64 and the second port 66 relative to the spacing between the first groove 34 and the second groove 36, and the width of the lands between the first, second, and third grooves 34, 36, and 38. For the purposes of this discussion, this entire range of positions in which flow is shut off, which are physically located between the first range of positions and the second range of positions, will be referred to the shutoff position. Relative to the shutoff position, any spool position in the second direction from the shutoff position (to the left of the shutoff position illustrated in FIGS. 1, 8, and 9) is stable with reverse flow and unstable in forward flow. Conversely, any spool position in the first direction from the shutoff position (to the right of the shutoff position illustrated in FIGS. 1, 8 and 9) is stable with forward flow and unstable with reverse flow.

The illustrated arrangement for the reversible flow control assembly 10 is particularly well suited for use of a microvalve in the pilot valve device 14, because the arrangement allows flow area through the spool valve 12 to be a function of the command pressure supplied by the pilot valve device 15, regardless of supply and return pressure, assuming stable operation of the spool valve 12. As described above, flow opening (the effective cross-sectional area of the flow path through the spool valve) is a function of feedback pressure. Since feedback pressure is developed in the spool valve 12 by throttling fluid flowing between supply and return pressure, feedback pressure is function of the relative pressure difference between supply and return pressure. A microvalve or series of microvalves that develop a "working pressure" between a series of orifices responsive to an electrical command supplied to the microvalve and arranged in a fluid conduit between a supply pressure and a return pressure also outputs a command pressure relative to the difference between supply and return pressure.

For the pilot valve 14, this may be expressed $$\left(\frac{P_C - P_T}{P_S - P_T}\right) = f(C_e) \qquad \text{Equation 1}$$

where $P_C$ is Command Pressure;

$P_T$ is Return Pressure;

$P_S$ is Supply Pressure;

$C_e$ is Electrical signal supplied to the microvalve, and $f(\,)$ means "is a function of" the term within the parenthesis.

For the spool valve 12, this may be expressed, $$A_F = f\left(\frac{P_F - P_T}{P_S - P_T}\right) \qquad \text{Equation 2}$$

where $P_F$ is Feedback Pressure; and $A_F$ is Flow Area

When the spool valve 12 is in equilibrium, then the following is true regardless of supply and return pressure, assuming the spool is in a stable position.

$$P_F = P_C \qquad \text{Equation 3}$$

and $$A_F = f(C_e) \qquad \text{Equation 4}$$

Command pressure $P_C$ is a percentage of the difference between supply pressure $P_S$ and return pressure $P_T$. At full power (i.e., when maximum flow through the reversible flow control assembly 10 is demanded), the normally closed (NC) orifice 90 is full open and the normally open (NO) orifice 92 is closed, irrespective of whether flow through the reversible flow control assembly 10 is forward or reverse.

As illustrated in FIGS. 4 and 6, travel of the spool 29 may be limited to the second position (on the left in FIG. 6) by the stop 74 and to the first position (on the right in FIG. 4) by the stop 74. This may be done for two reasons. First, peak flow through the spool valve 12 occurs when the first port 64 and the second port 66 are both completely uncovered, which occurs at the first position and the second position by definition. Limiting the stroke of the spool 29 only to those positions from the first position to the second position helps ensure a linear response, aiding in control of the reversible flow control assembly 10. Second, this is done to ensure transition between operation between the first range of positions and the second range of positions is always possible: Assuming the spool valve 12 is positioned at an unstable point for the direction of flow (i.e., one of the unstable operating regions shown in FIGS. 10 and 11), transition to stability requires a higher command pressure than feedback pressure with forward flow, and lower pressure command pressure than feedback with reverse flow. In this case, limiting travel to the ranges between the first position and the second position means that feedback pressure $P_F$ will always be less than or equal to the sum of return pressure $P_T$ and the average of return pressure $P_T$ and supply pressure $P_S$ during forward flow (Equation 5), and $P_F$ will always be greater than or equal to the sum of return pressure $P_T$ and the average of return pressure $P_T$ and supply pressure $P_S$ during reverse flow (Equation 6)

$$P_F \le \left(\frac{P_S - P_T}{2}\right) + P_T \text{ in forward flow} \quad \text{Equation 5}$$

$$P_F \ge \left(\frac{P_S - P_T}{2}\right) + P_T \text{ in reverse flow} \quad \text{Equation 6}$$

Assuming command pressure $P_C$ is capable of any pressure between supply pressure $P_S$ and return pressure $P_T$, the difference between maximum feedback pressure (Maximum $P_F$) and maximum command pressure (Maximum $P_C$) will be sufficiently large to overcome any factors negatively affecting operation of the spool valve 12 to enable transition, such as any leakage from the fluid conduit providing communication from the pilot valve control port 94 to the command chamber 30 (which would in essence reduce the command pressure), hysteresis due to friction, or other force.

The current discussion assumes equal size first port 64 and second port 66 for ease of explanation; they may be different sizes. Further, as will be further described below with respect to an alternate embodiment of a spool for the spool valve 12, it may be possible to utilize different sizes of ports with forward flow versus reverse flow.

As indicated above, the spring 70 and the spring 72 may be installed in the spool valve 12 to ensure the spool 29 stays centered in the shutoff position when the spool valve 12 is "off" (electrical command is zero), thereby minimizing leakage through the spool valve 12 between the first connection 16 and the second connection 18. As indicated above, the springs 70, 72 may provide minimal force in comparison to the axial forces due to fluid pressure acting on the axial end faces 53, 54 of the spool 29 when fluid is flowing through the spool valve 12.

With the implementation pictured in FIG. 1, if the pilot valve device 14 is powered off (i.e., the electrical command signal is zero), or with the spool 29 is positioned in a stable region (as labeled in FIGS. 10 and 11, the spool 29 will travel to the shutoff position in both forward and in reverse flow conditions. In this shutoff position, the flow path through the spool valve 12 is closed. Effectively this means the spool valve 12 (and the reversible fluid flow control assembly 10) is a normally closed flow control valve.

Regardless of the flow direction through the spool valve 12, the following may be true: 1) Flow through the spool valve 12 may increase proportionally full scale, from zero flow to full flow, as the electrical command signal to the pilot valve device 14 changes by only half scale (0 to 50%, or 100% to 50%), assuming the spool 29 is operating in a stable region. 2) 100% pilot command (maximum electrical signal causing the normally closed (NC) orifice 90 to fully open and the normally open (NO) orifice 92 to fully close) generates a 100% pressure command (i.e., substantially equal to supply pressure) that forces the spool 29 into a stable region, regardless of initial position (again, without regard to the direction of flow through the spool valve 12).

It should be realized that in an alternate embodiment (not shown) where the normally open and normally closed states of the orifices 90 and 92 are reversed (i.e., if the orifice 90 were normally open, and the orifice 92 were normally closed), and all other components of the reversible fluid flow control assembly 10 were as shown and discussed above, then the control signal to the pilot valve device 14 could be inverted to achieve control of the system. In other words, in such case, a 0% pilot command (minimum or zero electrical signal causing such a normally open (NO) orifice 90 to fully open and such normally closed (NC) orifice 92 to fully close) generates a pressure command that forces the spool 29 into a stable region, regardless of initial position (again, without regard to the direction of flow through the spool valve 12).

Because the spool 29 may start in any position, especially if the springs 70, 72 are omitted, it would normally be expected that, at startup of the system in which the reversible fluid flow control assembly 10 is installed, a 100% pilot command would be momentarily initially applied to ensure the spool 29 is correctly moved into a stable region prior to resuming normal proportional control. Of course, it is expected that in most systems in which flow is reversed, such as a heat pump system, the system would be shut down in one direction, and then restarted in the opposite direction However, if the reversible fluid flow control assembly 10 were installed in a system in which fluid flow through the spool valve 12 and pilot valve device 10 could be reversed without shutting down the system first, provision could be made such that, upon reversing the flow in the system in which the reversible fluid flow control assembly 10 is installed, a 100% pilot command would be momentarily initially applied to ensure the spool 29 is correctly moved into a stable region prior to resuming normal proportional control.

An alternate embodiment of a spool, indicated generally at 129, is illustrated in FIGS. 10 and 11. The spool 129 may be utilized in the reversible flow control assembly 10. The spool 129 may be similar to the spool 29 except that the spool 129 is provided with control ports at more axial locations than the spool 29; accordingly, the same reference numbers will be utilized for similar features in the following description of the structure and operation of the spool 129. More specifically, compared to the spool 29, the spool 129 may define ports in the central portion 50 of the spool 129 at four axial locations. The spool 129 may have a first port 164 at a first axial location in the central portion 50 of the spool 29 providing fluid communication between the exterior surface 62 and the axial passageway 58. The spool 129 may have a second port 166 in the central portion 50 of the spool 129 at a second axial location between the first axial location and the second end portion 29*b* of the spool 129 providing fluid communication between the axial passageway and the exterior surface 62 of the spool 129. The spool 129 may further have a third port 264 in the central portion 50 of the spool 129 at a third axial location spaced a first axial distance X from the first axial location toward the first end portion 29*a* of the spool 129, the third port 264 providing communication between the exterior surface and the axial passageway 50. Finally, the spool 129 may have a fourth port 266 in the central portion 50 of the spool at a fourth axial location spaced the first axial distance X from the second axial location toward the first axial location and, the fourth port 266 providing communication between the exterior surface and the axial passageway and the axial passageway 50. Suitably, the ports 164, 166, 264, and 266 may have different cross-sectional areas. More specifically, in the embodiment illustrated in FIGS. 10 and 11, the ports 164 and 166 each may have a first cross-sectional area, while the ports 264 and 266 each may have a second cross-sectional area which is different from the first cross-sectional area. Even more specifically, the first cross-sectional area is larger than the second cross sectional area.

Thus, when the spool 129 is in the first range of positions, as illustrated in FIG. 10, a flow path for forward flow of fluid through the spool valve 12 is established from the first connector 16 through the fluid conduit 42, the second groove 36 through the relatively larger first cross-sectional flow area of the second port 166, through the axial passageway 58, through the relatively larger diameter first cross-sectional flow area of the first port 164, through the third groove 38, and thence to the second connector 18. In contrast, when the spool 129 is in the second range of positions, as illustrated in FIG. 11, a flow path for reverse flow of fluid through the spool valve 12 is established from the second connector 18, to the third groove 38, through the relatively smaller first cross-sectional flow area of the fourth port 266, through the axial passageway 58, through the relatively smaller first cross-sectional flow area of the third port 264 to the first groove 34, to the fluid conduit 42, and thence to the first connector 16. Thus, all other factors being equal, the reversible flow control assembly 10 utilizing the spool 129 permits a greater volumetric flow rate for forward flow in the first position illustrated in FIG. 10 than permitted for reverse flow in the second position illustrated in FIG. 11. This feature could be useful, for example, in a heat pump HVAC system, when reversing flow and switching between cooling (higher desired volumetric flow rate) and heating (lower desired volumetric flow rate) functions. The operation of the reversible flow control assembly 10 utilizing the spool 129 is otherwise similar to the operation of the reversible flow control assembly 10 utilizing the spool 29.

Referring now to FIGS. 14 through 27B, wherein like reference numbers and characters may represent like elements through out all of the figures, there is illustrated an additional alternate embodiment of a reversible fluid flow control assembly, generally indicated at 300. The flow control assembly 300 may include a spool valve, indicated generally at 312, and a pilot valve device, indicated schematically at 314. The spool valve 312 and the pilot valve device 314 each may be in fluid communication with a first connector 316, by means of which the flow control assembly 300 may be connected in fluid communication with a first portion of a system (not shown) in which the flow control assembly 300 may be installed, as described above.

The spool valve 312 and the pilot valve device 314 each may be in fluid communication with a second connector 318, by means of which the flow control assembly 300 may be connected in fluid communication with a second portion of the system which the flow control assembly 300 may be installed. The first connector 316 and the second connector 318 each may be any suitable structure by means of which the flow control assembly 300 may be connected for installation in the system, including without limitation, threaded connections, welded connections, brazed connections, press-fit connections, rolled connections, permanently deformable connections, adhesive connections, compression fitting connections, etc.

The spool valve 312 may include a body 320. Preferably the first connector 316 and the second connector 318 are at least partially formed in the body 320, as is the case in the embodiment illustrated in FIGS. 14 through 20, where each of the first connector 316 and the second connector 318 is shown as a threaded connection port which can threadably accept standard hydraulic tube fittings, such as the tube fitting 19 shown above. The body 320 may be made of any material suitable for the application, such as a polymeric material, or a metal such as brass or aluminum, for example.

The body 320 may have an interior wall surface 321 defining a bore 322 therethrough. The bore 322 may have a first end portion, indicated generally at 324, a second end portion, indicated generally at 326, and a central portion, indicated generally at 327. The first end portion 324 of the bore 322 may be provided with a plate 325 fixed to the body 320 to close the first end portion 324 of the bore 322 in a fluid tight manner. Similarly, the second end portion 326 of the bore 322 may be closed such as by a ball 328 disposed therein. The ball 328 may be pressed in the bore 322 to close the second end portion 326 of the bore 322 in a pressure tight manner.

The spool valve 312 may further include a spool 329 disposed for sliding movement in the bore 322. The spool 329 may have a first end portion **329*a* and a second end portion 329*b*. As illustrated in FIGS. 14 through 20, the spool 329 may be oriented in the bore 322 with the first end portion 329*a* of the spool 329 near the first end portion 324 of the bore 322, and the second end portion 329*b* of the spool 329 near the second end portion 326 of the bore 322. The structure of the spool 329** will be discussed in further detail below.

The spool 329 and the plate 325 closing the first end portion 324 of the bore 322 cooperate with the body 320 to define a command chamber 330 in the first end portion 324 of the bore 322. The purpose of the command chamber 330 will be discussed below. A fluid conduit 331 is formed in the body 320 which may be in fluid communication with the command chamber 330 and, as will be discussed further below, in fluid communication with the pilot valve device 314. The spool 329 and the ball 328 in the second end portion 326 of the bore 322 cooperate with the body 320 to define a feedback chamber 332 in the second end portion 326 of the bore 322.

Figure 14:
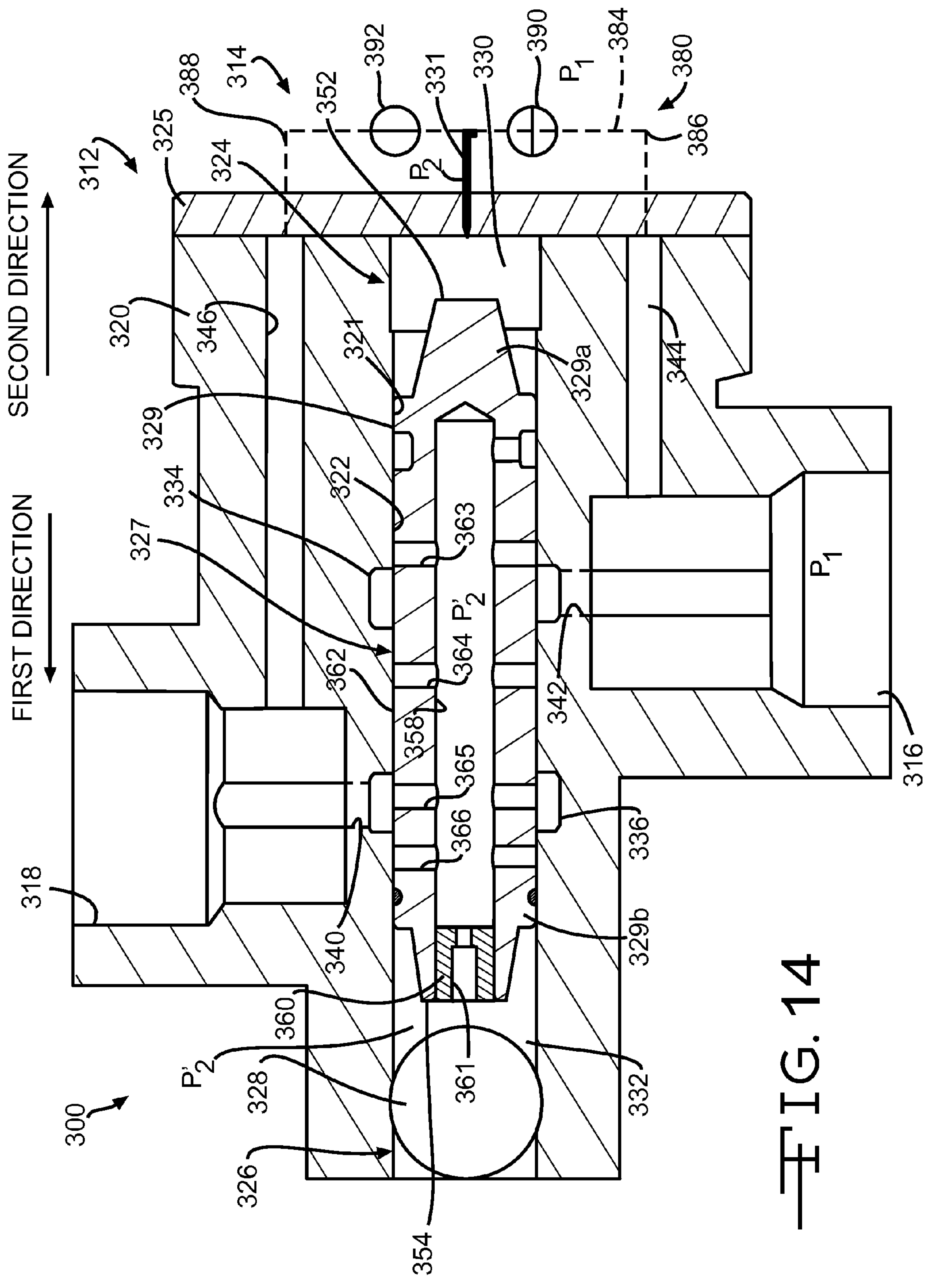
FIG. 14 is a partial cross-section and partial schematic representation of an alternate embodiment of a reversible fluid flow control device with a spool thereof in a position within a first range of positions.

As illustrated in FIG. 14, a pair of cavities may be formed in the body 320 in fluid communication with the central portion 327 of the bore 322, at axially spaced locations along the bore 322. A first one of this pair of cavities may take the form of a circumferentially-extending first groove 334 formed in the surface 321 of the body 320 defining the bore 322 at a first axial location along the bore 322, which, compared to the locations of the other of the pair of cavities, may be seen to be relatively close to the first end portion 324 of the bore 322, and thus closest to the command chamber 330. A second one of this pair of cavities may take the form of a circumferentially-extending second groove 336 formed in the surface 321 of the body 320 defining the bore 322 at a second axial location along the bore 322 which may be closer to the second end portion 326 of the bore 322 (and thus closer to the feedback chamber 332) than the first axial location where the first groove 334 may be located.

The body 320 may define a fluid conduit 340 providing fluid communication between the second connector 318 and the second groove 336. The body 320 may also define a fluid conduit 342 providing fluid communication between the first connector 316 and the first groove 334.

A bore 344 is provided in fluid communication between the first connector 316 and the pilot valve device 314. The bore 344 may be formed, for example, by drilling through the body 320 from the surface of the body 320. A bore 346 is provided in fluid communication between the first connector 318 and the pilot valve device 314. The bore 346 may be formed, for example, by drilling through the body 320 from the surface of the body 320.

Figure 15:
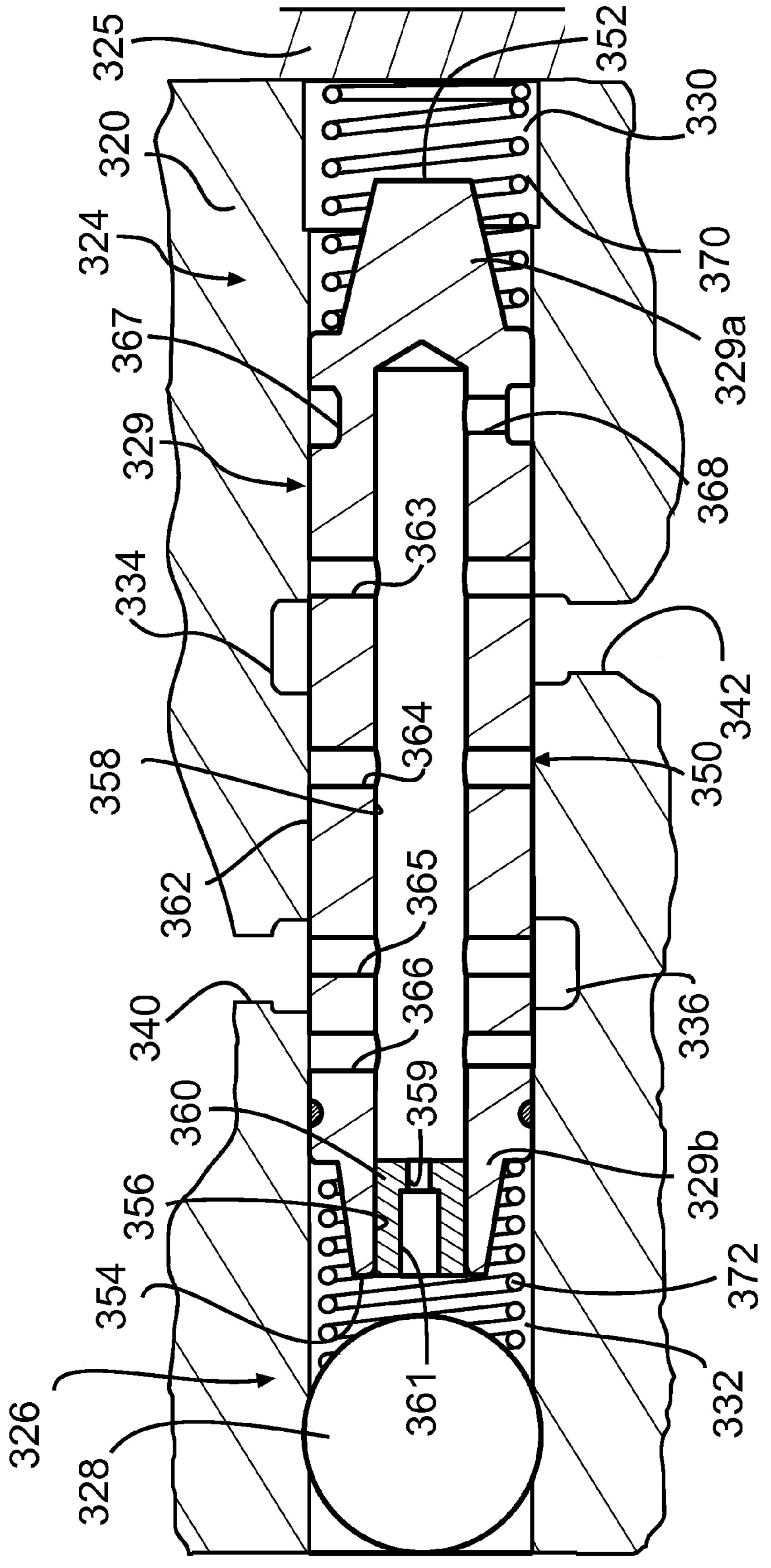
FIG. 15 is an enlarged cross-sectional view of the spool illustrated in FIG. 14.

Referring now to FIGS. 14 and 15, the spool 329 may have a central portion, indicated generally at 350, between the first end portion **329*a* and the second end portion 329*b*. The spool 329 may have a first axial end face, indicated generally at 352** on the first end portion 329*a* which is in fluid communication with the command chamber 330. In the illustrated embodiment, the first end portion 329*a* is frusto-conically shaped, for reasons will be discussed below. The spool 329 may have a second axial end face, indicated generally at 354, on the second end portion 329*b* which is in fluid communication with the feedback chamber 332. In the illustrated embodiment, the second end portion 329*b* is frusto-conically shaped, for reasons will be discussed below. The second axial end face 354 may have an opening 356 defined therein.

The spool 329 may have an internal axial passageway 358 defined therein. The axial passageway 358 may provide fluid communication from the opening 356 in the second axial end face 354 to a blind end in an interior portion of the first end portion 329*a* of the spool 329. In the illustrated embodiment, an insert 360 is fixed in the opening 356 in the second end 329*b* of the spool 329 by a suitable mechanism such as threaded engagement. The insert 360 may include a first bore 361 extending axially inwardly from the second axial face 354 and a damping orifice 359 that restricts communication between the axial passageway 358 of the spool 329 and the feedback chamber 332, in order to dampen movement of the spool 329 during operation. In the illustrated embodiment, the orifice 359 forms a reduced diameter bore between the bore 361 and the axial passageway 358.

The insert 360 may be affixed to the spool 329 in any suitable manner, or may be integrally formed with the spool 329, if a reduced diameter (relative to the diameter of the rest of the axial passageway 358) orifice is provided. It is anticipated that in some applications, no orifice providing damping will be needed at all, and the insert 360 may be omitted.

The spool 329 may have an exterior surface 362. The spool 329 may have a plurality of ports formed in the spool 329. In the illustrated embodiment, a first port 363 is formed at a first axial location in the spool 329 providing fluid communication between the exterior surface 362 and the axial passageway 358. Similarly, a second port 364 is formed at a second axial location, a third port 365 is formed at a third axial location, and a fourth port 366 is formed at a fourth axial location in the spool 329. Each of the ports 363, 364, 365, and 366 may be one of a plurality of ports spaced apart circumferentially about the spool 329 at the respective axial location of the ports 363, 364, 365, and 366.

The spool 329 may have a circumferential groove 367 formed in the exterior surface 362 at an axial location between the first port 363 and the first end portion 329*a* of the spool 329. The spool 329 may further have an aperture 368 providing fluid communication between the circumferential groove 367 and the axial passageway 358 formed in the spool 329. The aperture 368 allows fluid at feedback pressure existing in the axial passageway 358 during equilibrium conditions to be distributed about the spool 329 in the groove 367, which, as discussed above, minimizes the differential pressure between the command chamber 330 and the groove 367, and thus minimizes leakage into or out of the command chamber 330 between the surface 321 defining the bore 322 and the surface 362 of the spool 329.

Referring again to FIGS. 15 and 19, a coil spring 370 may be disposed in the command chamber 330, acting between the plate 325 at the first end portion 324 of the bore 322 and the spool 329 to urge the spool 329 toward the second end portion 326 of the bore 322. The frusto-conically shaped first end portion 329*a* of the spool 329 may help to radially center the spring 370. Similarly, a coil spring 372 may be disposed in the feedback chamber 332, acting between the ball 328 in the second end portion 326 of the bore 322 and the spool 329 to urge the spool 329 toward the first end portion 324 of the bore 322. As illustrated, the frusto-conically shaped second end portion 329*b* of the spool 329 may help to radially center the spring 372.

The ball 328 defines a stop structure that will limit motion of the spool 329 in a first direction toward the second end portion 326 of the bore 322. In particular, the stop structure may prevent the spool 329 from travelling past a desired first maximum travel position, shown in FIG. 16. Similarly, the plate 325 defines a stop structure that will engage the spool 329, limiting motion of the spool 329 in a second direction toward the first end portion 324 of the bore 322. The stop structure may prevent the spool 329 from travelling past a desired second maximum travel position, shown in FIG. 20.

Figure 16:
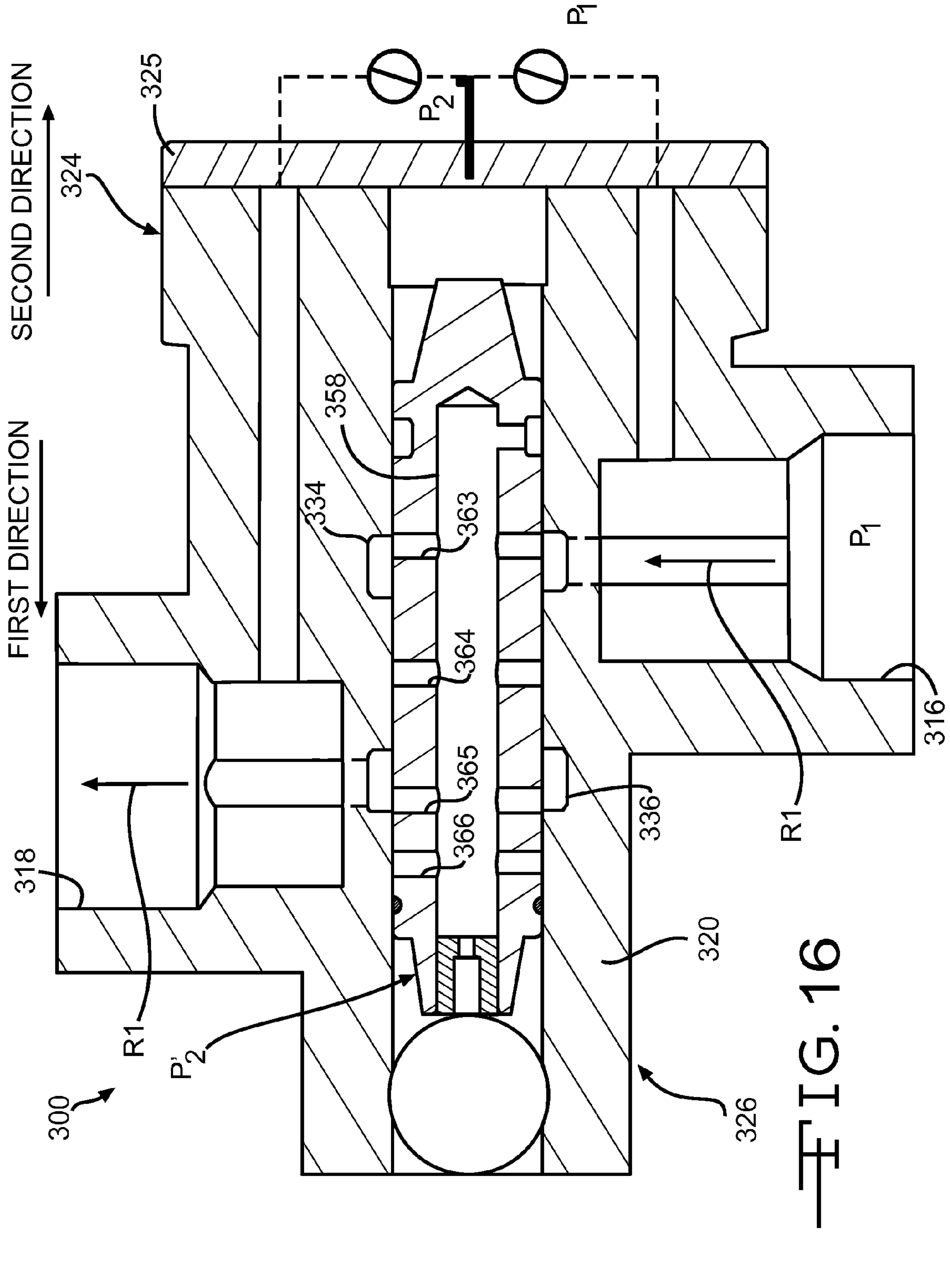
FIG. 16 is a partial cross-section and partial schematic representation of the reversible fluid flow control device illustrated in FIG. 14, with the spool shown in a forward flow position with the first range of positions.

A first position of the spool 329 is shown in FIG. 16. The first position in the illustrated embodiment may be the desired first maximum travel position, which may be the first position of the spool 329 which is reached during movement in the first direction in which the port 363 is fully uncovered in communication with the first groove 334 and the port 365 is fully uncovered in communication with the second groove 336. If the spool 329 is moved in the second direction toward the first end portion 324 of the bore 322 from the first position illustrated in FIG. 16, the portion of the body 320 between the first groove 334 and the first end portion 324 will progressively cover the port 363. Likewise, the portion of the body 320 forming a land between the first groove 334 and the second groove 336 will progressively cover the port 365. The spool 329 may be positioned in any of a first range of positions as the spool 329 moves in the second direction from the first maximum travel position to a shut off position describe below.

Figure 18:
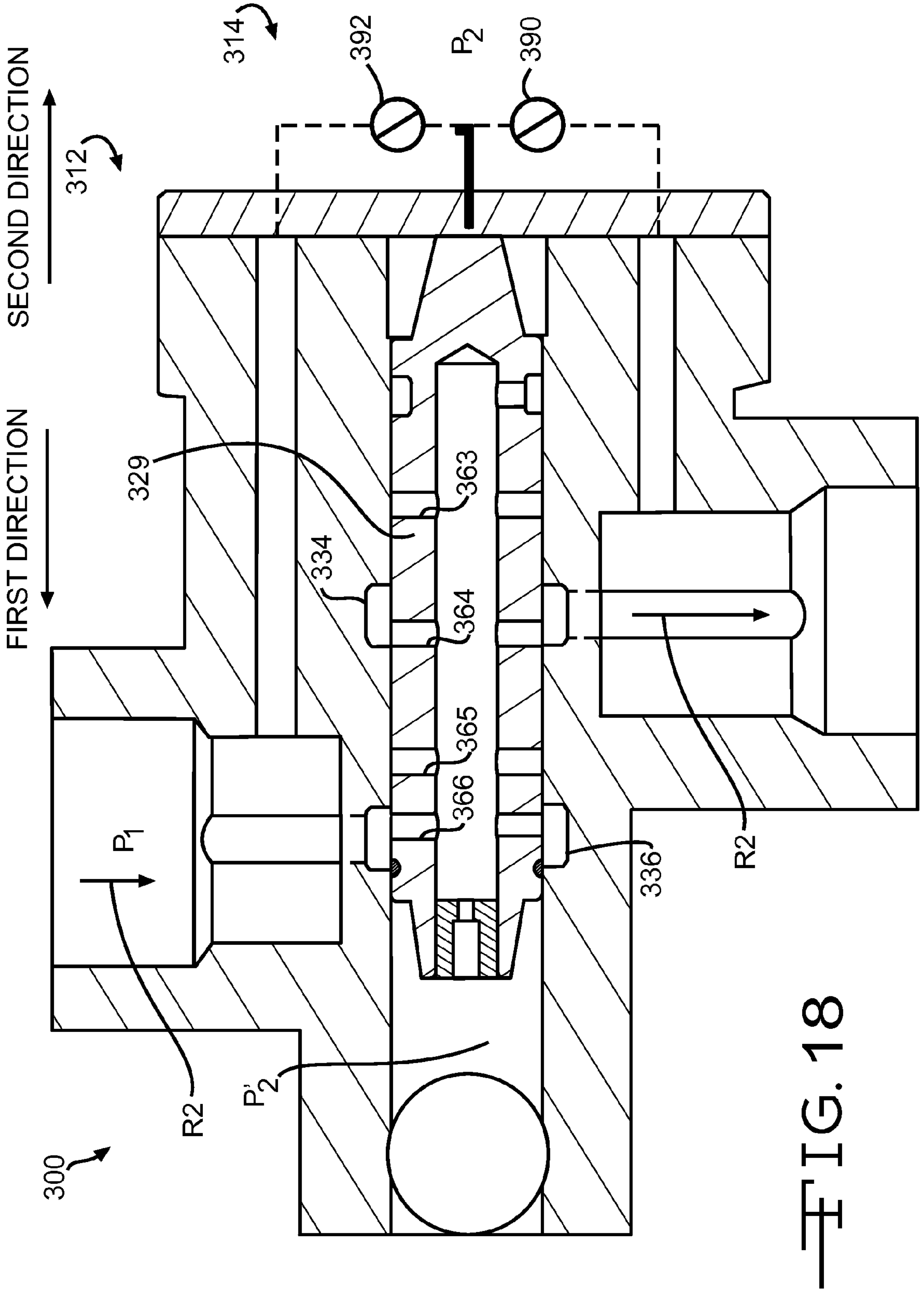
FIG. 18 is a partial cross-section and partial schematic representation of the reversible fluid flow control device illustrated in FIG. 17, with the spool shown in a reverse flow position within the second range of positions.

A second position of the spool 329 is seen in FIG. 18. The second position in this embodiment may be the desired second maximum travel position, which may be the first position of the spool 329 which is reached during travel in the second direction in which the port 364 is fully uncovered in communication with the first groove 334 and the port 366 is fully uncovered in communication with the second groove 336. The spool 329 may be positioned in any of a second range of positions as the spool 329 moves in the first direction from the second maximum travel position to a shut off position described below.

Figure 19:
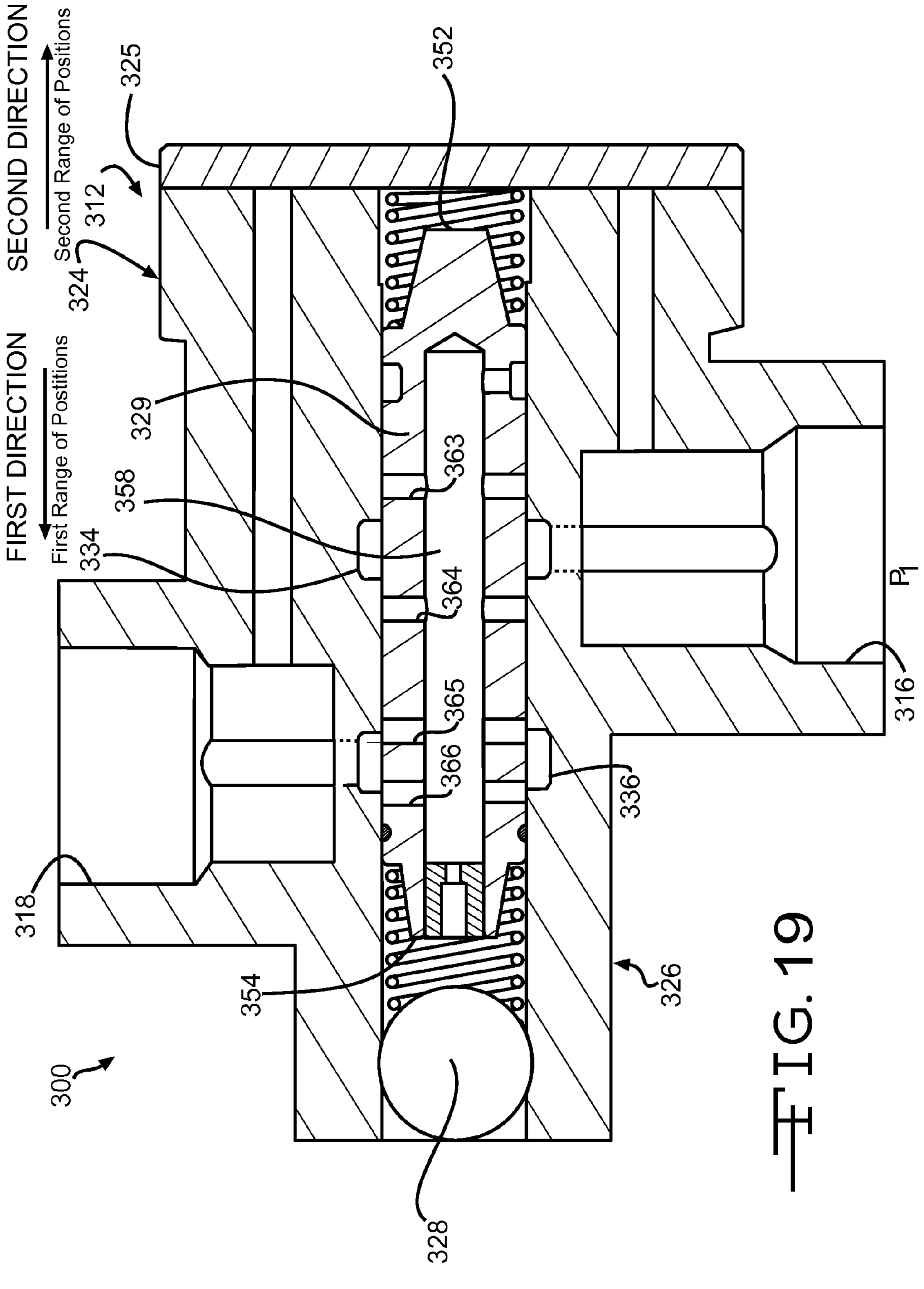
FIG. 19 is a partial cross-section and partial schematic representation of the reversible fluid flow control device illustrated in FIG. 14, with the spool thereof shown in a shut off position intermediate the first range of positions and the second range of positions.

The springs 370 and 372 may urge the spool 329 to a centered or shut off position, between the first range of positions and the second range of positions of the spool 329. This centered position is illustrated in FIG. 19. More specifically, the spring 370 may urge the spool 329 to move in the first direction (leftward as viewed in FIG. 19) from the second range of positions toward the centered position; the spring 372 may urge the spool 329 to move in the second direction from the first range of positions (rightward as viewed in FIG. 19) toward the centered position. The first range of positions is to the left of the centered position illustrated in FIG. 19, and the second range of positions is to the right of the centered position illustrated in FIG. 19.

In the centered position, both the port 365 and the port 366 may be partially uncovered to communicate with the second groove 336; however, neither the port 363 nor the port 364 is in substantial direct fluid communication with the first groove 334. There will be no fluid communication between the axial passageway 358 in the spool 329 and the first groove 334, and thus no fluid communication between the first connector 316 and the second connector 318.

Referring again to FIG. 14, the pilot valve device 314 may include a valve or valves 380 and a manifold, such as the manifold 82 described above, provided with fluid passageways interconnecting the valve 380 and the spool valve 312.

The valve 380 may include a fluid conduit 384. The flow through the fluid conduit 384 may be regulated by two variable orifices in series arrangement in the fluid conduit 384. A variable first orifice 390 may be a normally closed orifice, that is, the first orifice 390 may be closed in the absence of a command signal to the valve 380. A variable second orifice 392 may be a normally open orifice. The fluid conduit 331 may be connected in fluid communication with the fluid conduit 384 between the first orifice 390 and the second orifice 392. The valve 380 may be a single valve or microvalve containing one or more moving components acting as the first orifice 390 and the second orifice 392. Alternatively, the valve 380 may be embodied as a plurality of valves or microvalves acting as the first orifice 390 and the second orifice 392. The first orifice 390 and the second orifice 392 may move inversely proportionally—that is, when one is open, the other is closed. As one opens, the other simultaneously closes, and when one is half open, the other is also half open (and half closed).

Referring now to FIGS. 14, 15, and 16, the operation of the spool valve 312 will be described. A pressure command used for control of the spool valve 312 is developed in the pilot valve device 314, as described above. In the illustrated embodiment, for example, the pressure command is developed in the fluid conduit 384 between the first orifice 390 and the second orifice 392 when pressurized fluid is supplied to the valve 380. The pressure developed there is the command pressure, and fluid at the command pressure is conveyed from the pilot valve device 314 to the command chamber 330 of the spool valve 312. The command pressure may be conveyed to the command chamber 330 via a single fluid conduit via a pilot valve control port (not illustrated) and the single fluid conduit 331.

During operation, the reversible fluid flow control assembly 300 is installed in a system (not shown) via the first connection 316 and the second connection 318. During operation of the system, normally one of the first connection 316 and the second connection 318 will be supplied with a higher pressure (hereinafter “supply pressure”) and the other of the first connection 316 and the second connection 318 will be supplied with a lower pressure (hereinafter “return pressure”). During operation, when there are differences between supply pressure and return pressure, the components of the reversible fluid control assembly 300 operate to develop two separate fluid pressures acting in opposition across the spool 329.

On one side, to the right as drawn in FIGS. 14 though 19, the command pressure is developed in the pilot valve device 314 by positioning the first orifice 390 and the second orifice 392 to achieve a desired pressure. The command pressure may be supplied to the command chamber 330 to push on the first axial end face 352 of the spool 329 to urge the spool 329 in the first direction (leftward to the first range of positions as seen in FIGS. 14 through 19), moving the spool 329 into the first range of positions of the spool 329. A pressure proportional to the position of the spool 329, referred to as feedback pressure, is developed in the axial passageway of the spool 329 as will be described below. The feedback pressure is communicated via the bore 361 from the axial passageway 358 of the spool 329 to the feedback chamber 332 on the left side (as seen in FIGS. 14 through 19) of the spool 329.

Feedback pressure in the feedback chamber 332 acting on the second axial end face 354 of the spool 329, urges the spool 329 in the second direction (rightward as seen in FIGS. 14 through 19). The spool 329 is free to move until the forces acting on the end faces 352, 354 of the spool 329 balance. Note that in this discussion the forces exerted by the springs 370, 372 will not be discussed, as the springs 370, 372 would normally be chosen to have a very low spring rate, as discussed above. It will be appreciated that in at least some embodiments, a majority of axial forces acting on the spool 329 to position the spool 329 relative to the body 320 when fluid is flowing through the spool valve 312 will be fluid forces.

Both the command pressure and the feedback pressures may fall between supply pressure and return pressure in normal operation, as described above.

The feedback pressure is a pressure developed between the first port 363 and the third port 365 in the axial passageway 358. During forward flow (illustrated in FIG. 16 by the arrow R1), with the spool 329 in the first range of positions, flow of fluid through the spool valve 312 travels from the first connection 316, through the first port 363, through the axial passageway 358 of the spool 329, through the second port 365 and then out through the second connection 318, as illustrated in FIG. 16.

In forward flow, the second groove 336 will be at return pressure, while the first groove 334 may be at supply pressure. As the first port 363 is progressively uncovered while moving from the shut off position illustrated in FIG. 19, through the position illustrated in FIG. 14 (in which fluid flows through the spool valve 312), to the first position illustrated in FIG. 16, pressure in the axial passageway 358 may rise. However, feedback pressure may not rise to the magnitude of supply pressure, since the third port 365 is continually venting fluid from the axial passageway 358 to the second groove 336, which may be at return pressure.

Maximum flow through the valve 380, which occurs when both the orifice 390 and the orifice 392 are half open, as shown in FIG. 16, since any further opening of one of the orifices 390, 392 will also mean that the other of the orifices 390, 392 goes closed (since, as described above, in this embodiment the orifices 390, 392 operate equally and oppositely), limiting flow to a net lower valve. With forward flow, and both the orifices 390, 392 half open, the command pressure may be about half of the supply pressure $P_1$. If the spool 329 moves to the right from the position illustrated in FIG. 16, the port 363 will start to be covered by the body 320, decreasing the cross-sectional flow area between the groove 334 (supply pressure) and the axial passageway (feedback pressure). Therefore, the feedback pressure is lowered. With the command pressure unchanged, the net pressure imbalance between command and feedback pressure may urge the spool 329 back to the left until the stop (ball 328) is encountered or the pressure imbalance is eliminated by the resultant rise in feedback pressure.

This feedback mechanism causes the feedback pressure $P'_2$, in the passageway 358, to be equal to the command pressure $P_2$. The command pressure $P_2$ may be represented by the following equation:

$$P_2 = \left( \frac{P_1 \cdot A_1^2}{A_1^2 + A_2^2} \right) \quad \text{Equation 7}$$

Feedback pressure P2' may be represented by the following equation:

$$P'_2 = \left( \frac{P'_1 \cdot (A'_1)^2}{(A'_1)^2 + (A'_2)^2} \right) \quad \text{Equation 8}$$

where:

$P_1$ is Supply Pressure to the pilot valve device 314;

$P'_1$ is Supply Pressure to the spool valve 312 (from the first connection 316 during forward flow; from the second connection 318 during reverse flow) (in the illustrated embodiment $P_1=P'_1$);

$P_2$ is Command Pressure;

$P'_2$ is Feedback Pressure;

$A_1$ is the cross-sectional flow (390 during forward flow, 392 during reverse flow) area of the upstream pilot orifice where fluid flows from the fluid conduit at supply pressure into the command chamber;

$A'_1$ is the inlet cross-sectional flow area of the spool valve 312 where fluid flows into the feedback chamber from either the groove 334 (during forward flow) or the groove 336 (during reverse flow);

$A_2$ is the cross-sectional flow area of the downstream pilot orifice where fluid flows out of the command chamber into the fluid conduit at return pressure; and $A'_2$ is the outlet cross-sectional flow area of the spool valve 312 where fluid flows out of the feedback chamber into either the groove 336 (during forward flow) or the groove 334 (during reverse flow).

Equation 7 can be rearranged as:

$$\frac{A_2}{A_1} = \sqrt{\frac{P_1 - P_2}{P_2}} \qquad \text{Equation 9}$$

Similarly, Equation 8 can be rearranged as:

$$\frac{A'_2}{A'_1} = \sqrt{\frac{P'_1 - P'_2}{P'_2}} \qquad \text{Equation 10}$$

Since the pressure forces acting on the spool valve 312 balance when the spool valve 312 is at equilibrium, the following is true when the spool valve 312 is at equilibrium:

$$P_2 = P'_2 \qquad \text{Equation 11}$$

As indicated above, $P_1=P'_1$ since, in the illustrated embodiment, the pilot valve device 314 and the spool valve 314 are both fed fluid from a common source. Therefore, equation 10 can be rewritten as:

$$\frac{A'_2}{A'_1} = \sqrt{\frac{P_1 - P_2}{P_2}} \qquad \text{Equation 12}$$

From Equation 9 and 12, therefore:

$$\frac{A'_2}{A'_1} = \frac{A_2}{A_1} \qquad \text{Equation 13}$$

Equation 13 shows that the ratio of the cross-sectional flow area of the pilot downstream orifice to the cross-sectional flow area of the pilot upstream orifice is equal to the ratio of the outlet cross-sectional flow area out of the spool valve 312 to the inlet cross-sectional flow area into the spool valve 312. Equation 13 can be rewritten thusly:

$$\frac{A'_1}{A'_2} = \frac{A_1}{A_2} \qquad \text{Equation 14}$$

Equation 14 shows that the ratio of the cross-sectional flow area of the pilot upstream orifice to the cross-sectional flow area of the pilot downstream orifice is equal to the ratio of the inlet cross-sectional flow area into the spool valve 312 to the outlet cross-sectional flow area out of the spool valve 312.

Thus it is clear from Equations 13 and 14 that the ratio of inlet and outlet cross-sectional flow areas of the spool valve 312 can be set by controlling the ratio of cross-sectional flow areas of the upstream and downstream orifices of the pilot valve device 314. This relationship can be used for developing control algorithms for the reversible flow control assembly 300. Trying to control the spool valve 312 using downstream pressure or flow as a direct feedback signal can be difficult in some applications, such as when a two phase fluid (a mixture of fluid and gas) is flowing through the spool valve. A specific example could be a refrigerant such as 1,1,1,2-tetrafluoroethane (R134a), which, at an appropriate temperature, could have some portion of liquid entering the spool valve 312 change to a gas due to the pressure drop experienced flowing through the spool valve 312. Slight movements of the spool 329, changing the pressure drop slightly, could result in significant changes in flow volume and pressure downstream of the spool valve 312 by changing the percentages of gas and liquid in the fluid stream downstream of the spool valve 312. Therefore, the reversible fluid flow control assembly 300 can advantageously set a desired cross-sectional flow area through the spool valve 312 utilizing the pilot valve device 314.

Other suitable parameters, which are not as unstable as downstream pressure and flow, and which are application specific, but which would be readily apparent to those of ordinary skill in the applicable art, may be used as part of the control algorithm controlling the pilot valve device 314. As an example, in a refrigeration system, where the reversible fluid flow control assembly 300 is used to supply an evaporator coil, the temperature of the refrigerant tubing at the outlet of the evaporator coil could be used as a parameter considered in controlling the operation of the reversible fluid flow control assembly 314. Other parameters which might alternatively, or additionally be utilized, and which would be apparent to those of ordinary skill in the art of refrigeration systems, might include the temperature change of the refrigerant tubing between the inlet and the outlet of the evaporator coil, degrees of superheat or subcooling of the refrigerant at the outlet of the evaporator coil, and energy content or temperature change of the fluid being cooled by the evaporator coil after passing through the evaporator coil.

Figure 17:
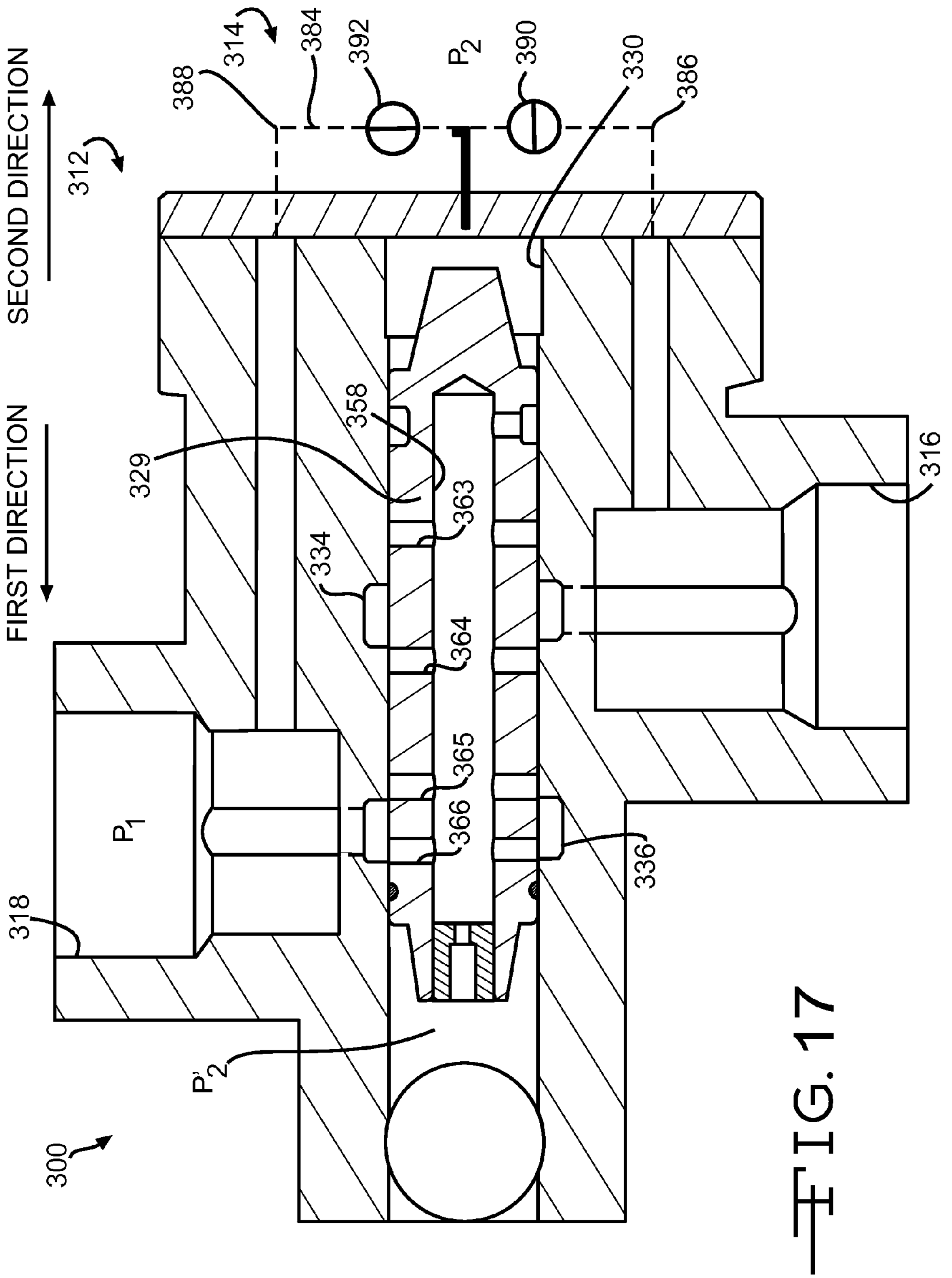
FIG. 17 is a partial cross-section and partial schematic representation of the reversible fluid flow control device illustrated in FIG. 14, with the spool shown in an unpowered or failed-power mode within a second range of positions.

In the embodiment illustrated in FIGS. 17 and 18, the second connection 318 is at the supply pressure $P_1$. Command pressure $P_2$ is high (command pressure $P_2$ may equal supply pressure $P_1$) since the orifice 392 is open and the downstream orifice 390 is shut (i.e., in their normal positions). Supply pressure is communicated from the second connection 318 through the port 366 to the axial passageway 358, however no connection between the axial passageway 358 and the first connection 316 exists, therefore the feedback pressure $P'_2$ is high (feedback pressure $P'_2$ may equal supply pressure $P'_1$). If the spool 329 moves to the right for any reason, the feedback pressure $P'_2$ will drop and the command pressure $P_2$ will urge the spool 329 back to the left. If the spool 329 moves to the left for any reason, the feedback pressure $P'_2$ remains constant and equal to the command pressure $P_2$. Therefore, the springs 370 and 372 move back to the shut off position.

If flow through the system is reversed, for example if a heat pump is switched from a cooling to a heating function, then the second connection 318 will be supplied with a higher pressure (supply pressure) and the first connection 316 will be supplied with a lower pressure (return pressure). The spool 329 will then operate in the second range of positions, i.e. the range of positions bounded by the position shown in FIG. 18 and the centered (or shut off) position shown in FIG. 19.

Figure 27A:
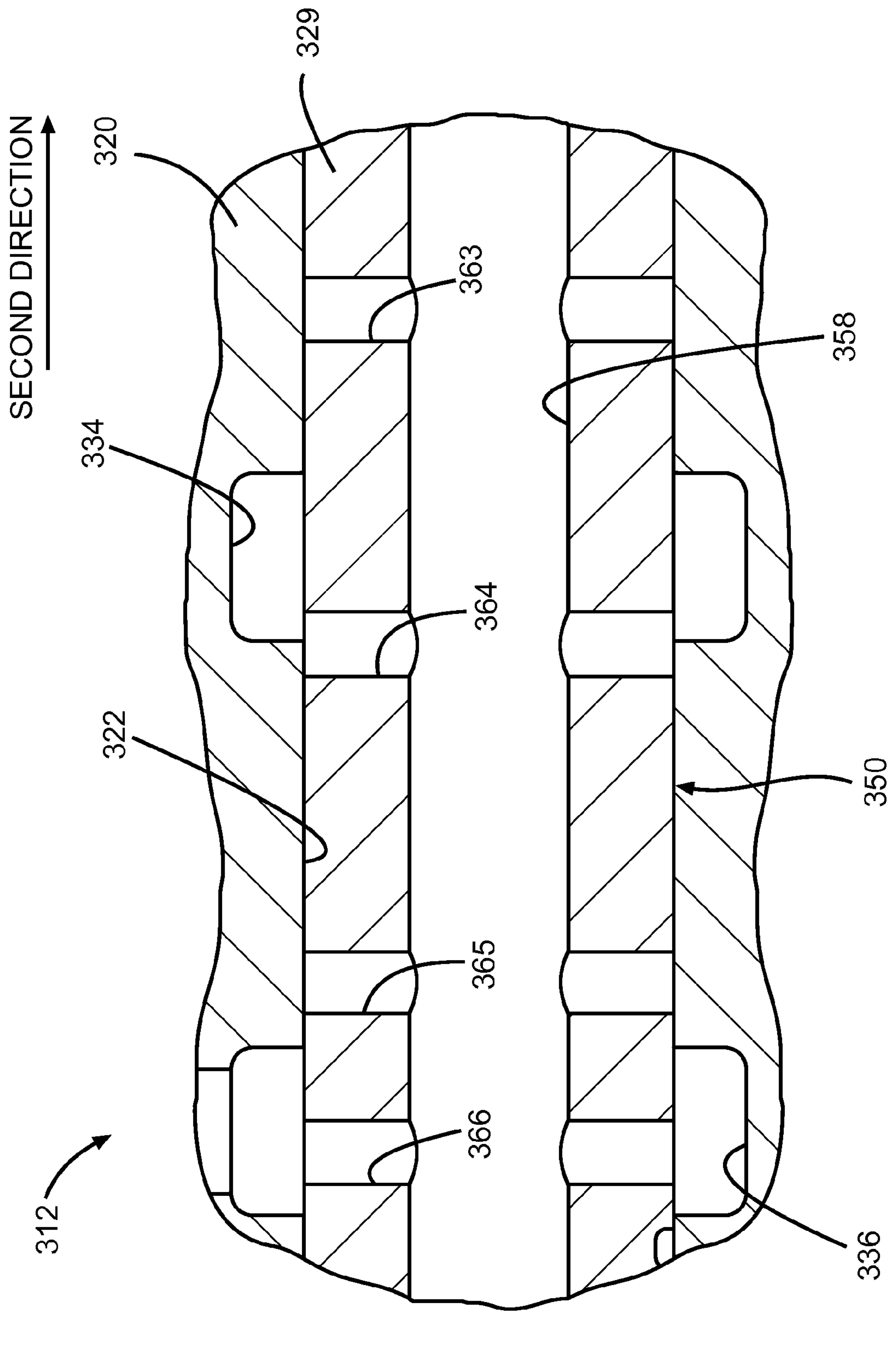
FIG. 27A is an enlarged cross-sectional view of a portion of the spool valve illustrated in FIG. 17, showing the spool in a first metered position.

The spool valve 312 may operate in one or more metering positions. Assume, for example, that the spool 329 is positioned within the second range of positions at a first metering position as shown in FIG. 27A, and the reversible fluid flow control assembly 300 is operating with reverse flow (supply pressure supplied to the second connection 318, with return pressure at the first connection 316), and that the spool 329 is in equilibrium. The command signal supplied to the pilot valve device 314 is at an intermediate value. The normally closed orifice 390 of the pilot valve device 314 (the down stream orifice in this direction of flow) is also partially opened, and the normally open orifice 392 of the pilot valve device 314 (the upstream orifice) is also partially opened, and the pressure in the passageway 384 between the orifice 390 and the orifice 392 (the command pressure supplied via the pilot valve control device 314 to the command chamber 330 of the spool valve 312) is a steady percentage of the difference between the supply pressure at the second pilot connection port 388 and the return pressure at the first pilot connection port 386.

Figure 27B:
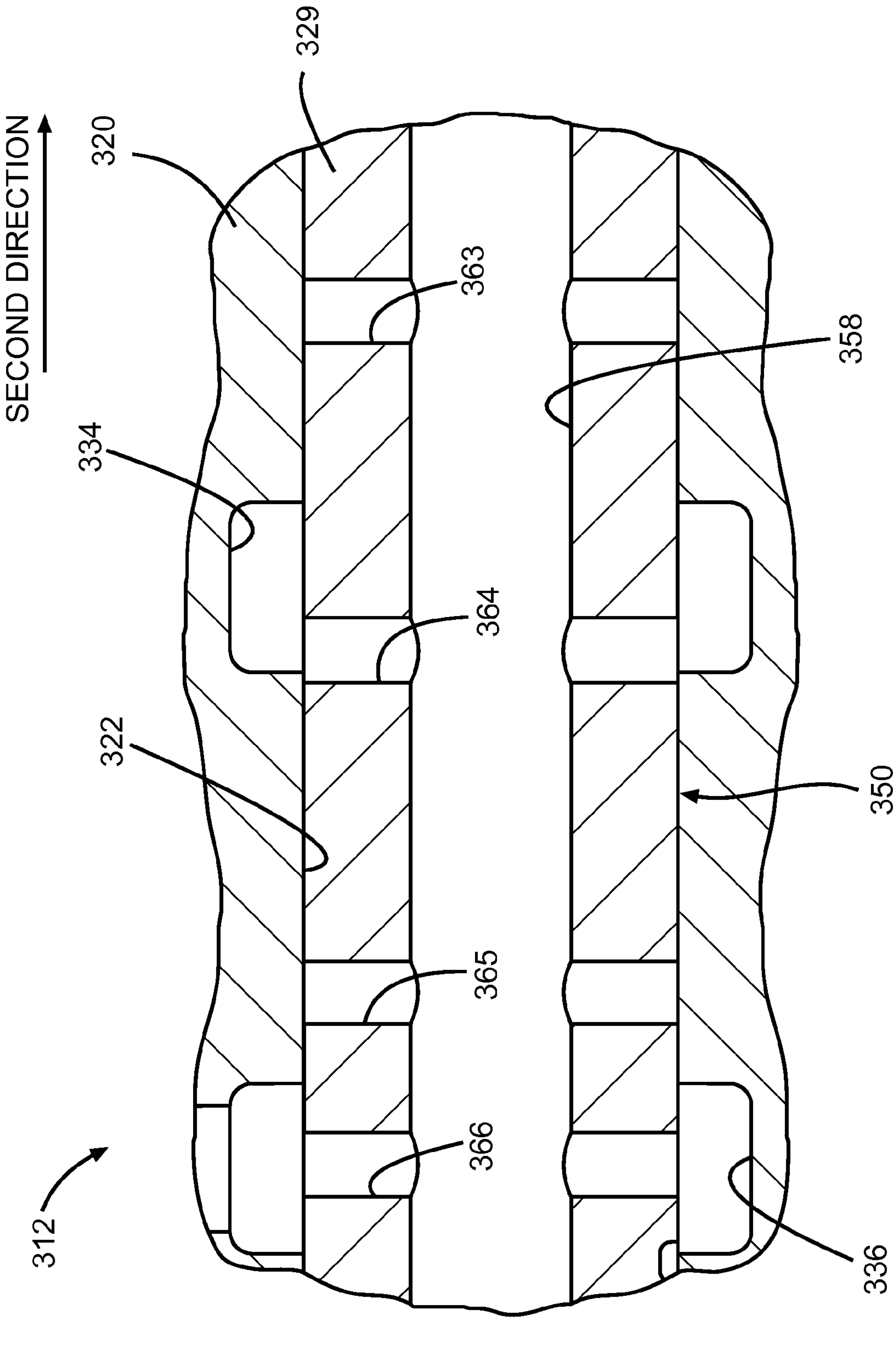
FIG. 27B is an enlarged cross-sectional view of a portion of the spool valve illustrated in FIG. 17, showing the spool in a second metered position.

Now assume it is desired to open the spool 329 more, that is, to increase the cross-section flow area through the spool valve 312 by moving the spool 329 toward a second metering position illustrated in FIG. 27B in order to increase fluid flow through the spool valve 312. The command signal supplied to the pilot valve device 314 is increased. This causes the normally closed orifice 390 to open further, opening up the release path to return pressure at the first connection 316, and the normally open orifice 392 to close further, throttling or metering the supply pressure supplied from the second connection 318. This causes the command pressure $P_2$ supplied to the command chamber 330 to decrease. A decrease in command pressure $P_2$ causes the spool 329 to move in the second direction, toward the command chamber 330 (rightward as seen in FIGS. 16, 27A, and 27B). As the spool 329 moves in the second direction toward the command chamber 330, the spool 329 moves through a plurality of metering positions, from the first metering position shown in FIG. 27A, the second metering position shown in FIG. 27B as the spool 329 moves in the second direction; the feedback pressure will decrease. Feedback pressure $P_2^1$ decreases due to increasing the ratio of the outlet cross-sectional flow area $A_2^1$ through the second port 364 (which is the port opening to return pressure in the first groove 334) to the inlet cross-sectional flow area $A_1^1$ of the fourth port 366 (which is the opening to supply pressure).

More specifically, with the release path to return pressure through the port 366 opened up, and the cross-sectional flow area of the flow path from supply unchanged when moving from the first metering position illustrated in FIG. 27A to the second metering position illustrated in FIG. 27B, the feedback pressure $P_2^1$ in the axial passageway 358 will also fall. As feedback pressure $P_2$ decreases, the spool 329 will come to rest in a new equilibrium position, such as shown in FIG. 27B, where feedback pressure $P_2^1$ substantially equals command pressure $P_2$, with the increased cross-sectional flow area and associated increased flow through the spool valve 312 that was desired.

The converse is also true with a decreasing command signal, which will generate an increased command pressure in the pilot valve device 314. This will cause the spool 329 to move in the first direction, so that the second port 364 will get increasingly covered, lowering the ratio of the cross-sectional flow area of the second port 364 (which is the port opening to return pressure) to the cross-sectional flow area of the fourth port 366 (which is the opening to supply pressure), raising the pressure in the axial passageway 358, and the spool 329 will come to rest in a new equilibrium position within the second range of positions, such as the first metering position shown in FIG. 27A, when the feedback pressure rises to equal the increased command pressure. The mass flow rate through the spool valve 312 will be lower than the original mass flow rate, since the cross-sectional flow area through the spool valve is described.

It should be emphasized that the first metering position shown in FIG. 27A and the second metering position shown in FIG. 27B represent only two of an infinite number of metering (or "throttling") positions within the second range of positions; there are similarly an infinite number of metering positions within the first range of positions.

The spool valve 312, shown in FIGS. 14 through 19, 27A, and 27B, is an example of a symmetric valve with a spool 329 for a symmetric valve. As used herein, a symmetric valve is defined as a valve in which the maximum cross-sectional flow area in forward and reverse flow configurations are substantially the same. An asymmetric valve, conversely, is defined as a valve in which the maximum cross-sectional flow area through the valve in a forward flow direction is substantially different from the maximum cross-sectional flow area in a reverse flow direction.

Figure 20:
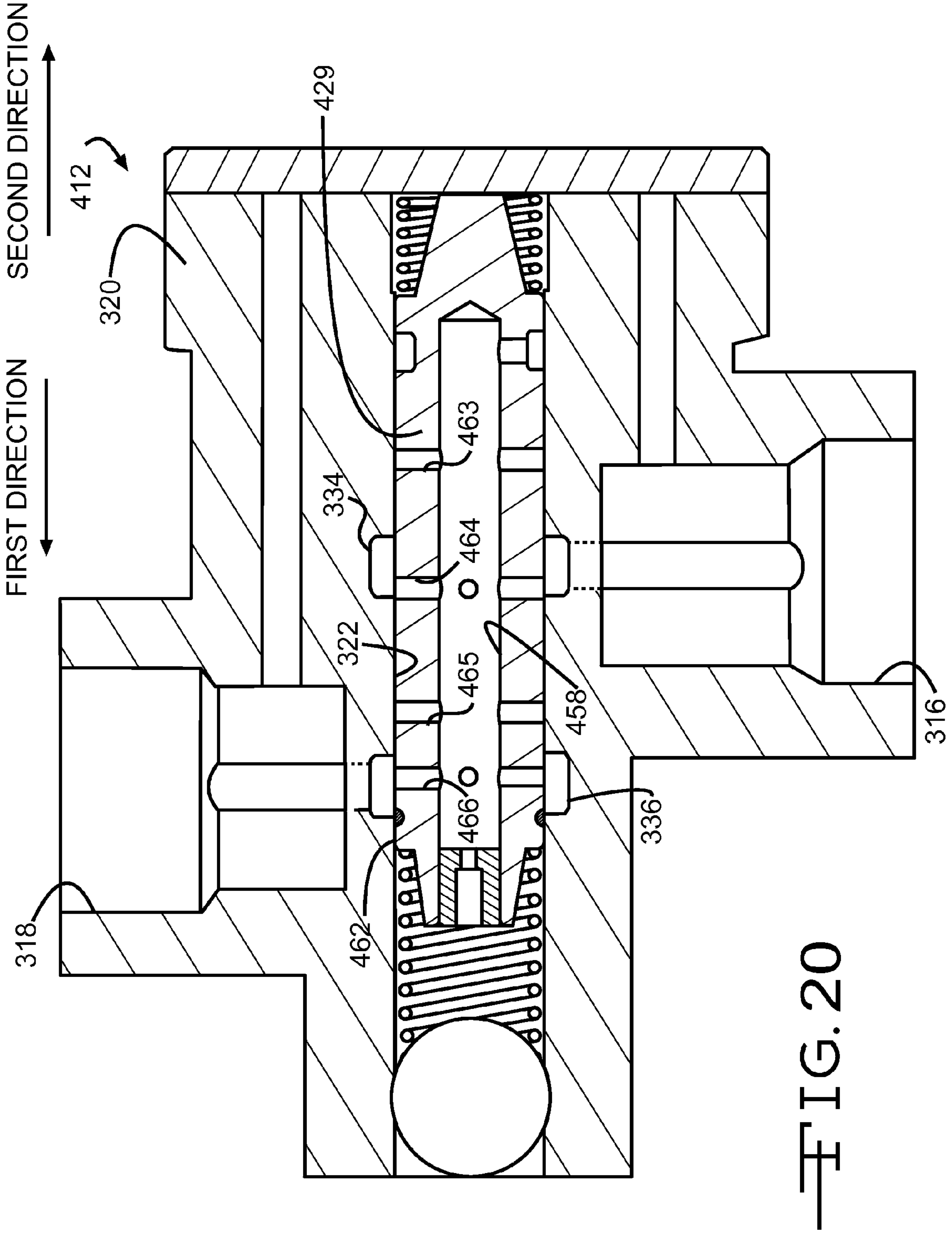
FIG. 20 is a partial cross-section and partial schematic representation of an alternate embodiment of a reversible fluid flow control device having a spool providing for unequal forward and reverse flow cross-sectional areas.

The spool valve 412, shown in FIG. 20 is an example of an asymmetric valve. In the asymmetric valve 412, a spool 429 for an asymmetric valve is disposed for sliding movement in the bore 322 of the valve body 320. It should be noted that the body 320, advantageously, may be used with either the spool 329 (described previously) to form a symmetric valve, or the spool 429 to form an asymmetric valve. The illustrated spool 429 has a plurality of ports spaced apart circumferentially about the spool 429. In the illustrated embodiment, one or more first ports 463 are formed at a first axial location in the spool 429 providing fluid communication between the exterior surface 462 and the axial passageway 458. Similarly, one or more second ports 464 are formed at a second axial location, one or more third ports 465 are formed at a third axial location, and one or more fourth port 466 is formed at a fourth axial location in the spool 429. The cross-sectional flow areas at the second and fourth axial locations, used during forward flow, are smaller than the cross-sectional flow areas in the first and third axial locations used during reverse flow. This spool structure allows a heat pump, for example, to have different refrigerant flow rates when heating a building than when cooling a building.

In the illustrated embodiment, all the ports 463, 464, 465, and 466 are of the same diameter; a greater cross-sectional flow area is achieved in the first and third axial locations by providing more ports 463 and 465 at the first and third axial locations, respectively, than the number of ports 464 and 466 at the second and fourth axial locations, respectively. However, a difference in cross-sectional flow areas may be achieved by any suitable arrangement. For example, a greater cross-sectional flow area could also be achieved in the first and third axial locations than at the second and fourth axial locations by providing the same number of ports 463, 464, 465, and 466 at the first, second, third, and fourth axial locations in the same number, but having the individual ports 463 and 465 be formed with greater diameter (greater individual cross-sectional flow area), than the ports 464 and 466. Such an arrangement is illustrated in the alternate embodiment illustrated in FIGS. 23 and 24, which will be described below.

Figure 22:
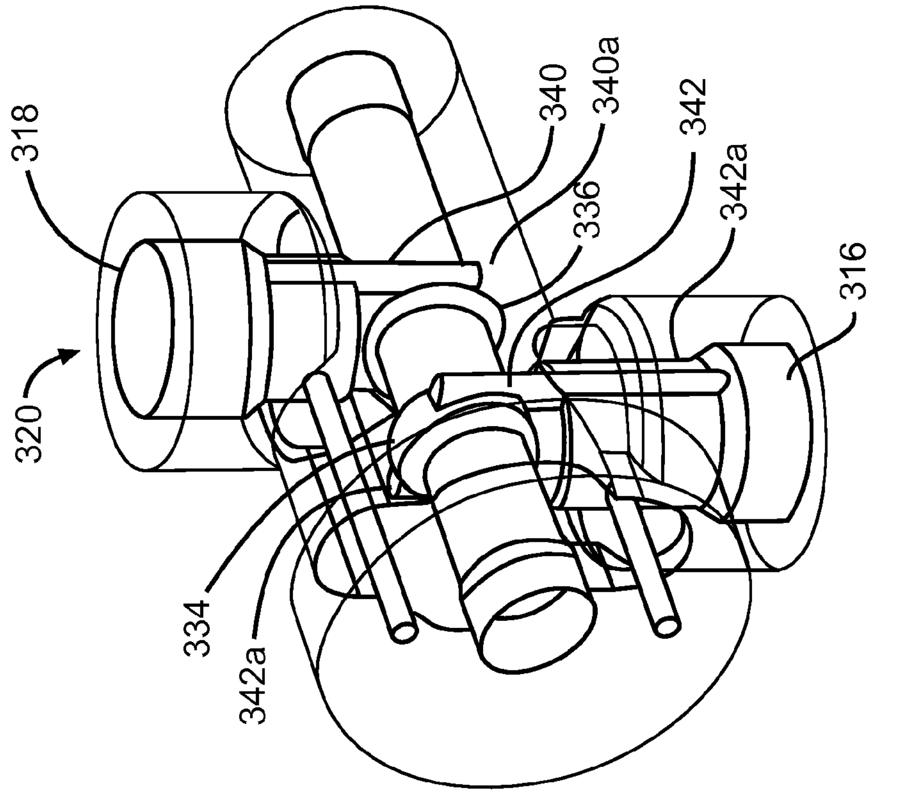
FIG. 22 is a second perspective view of the control device body illustrated in FIG. 14.
Figure 21:
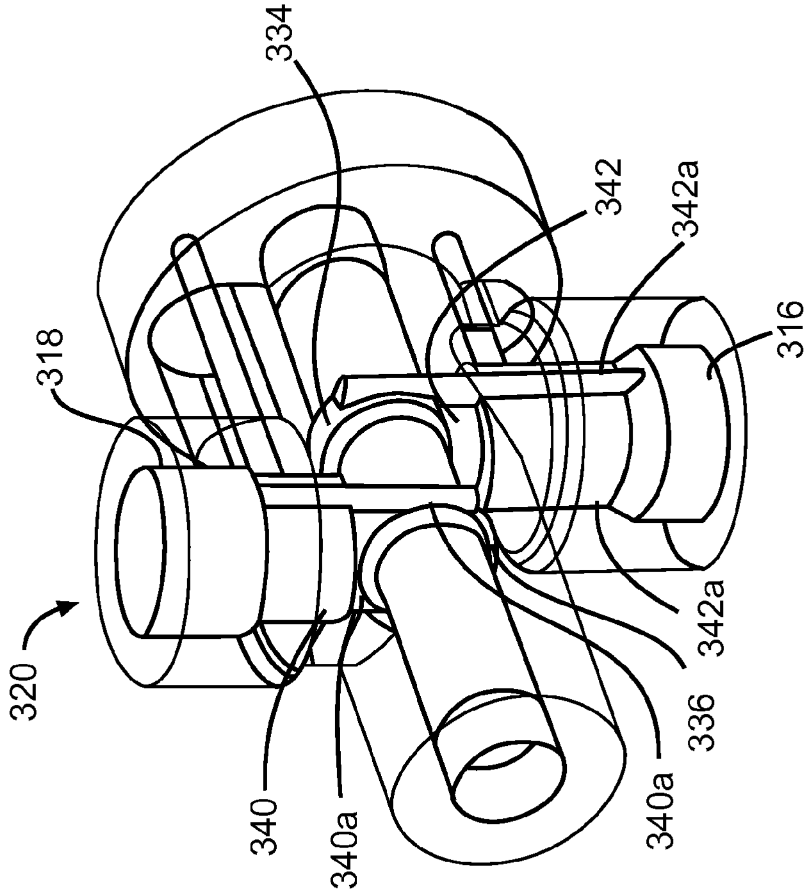
FIG. 21 is a first perspective view of the control device body illustrated in FIG. 14.

Regarding the housing or body 320, FIGS. 21 and 22 illustrate that the first connection 316 and the second connection 318 are connected to the grooves 334 and 336 by bores or conduits 342 and 340, respectively. The conduit 340 may be formed by one or more bores 340*a* drilled between the first connection 316 and the groove 336, as shown in FIG. 21, similarly, the conduit 342 may be formed by one or more bores 342*a* drilled between the second connection 318 and the grooves 334, as shown in FIG. 22.

Figure 23:
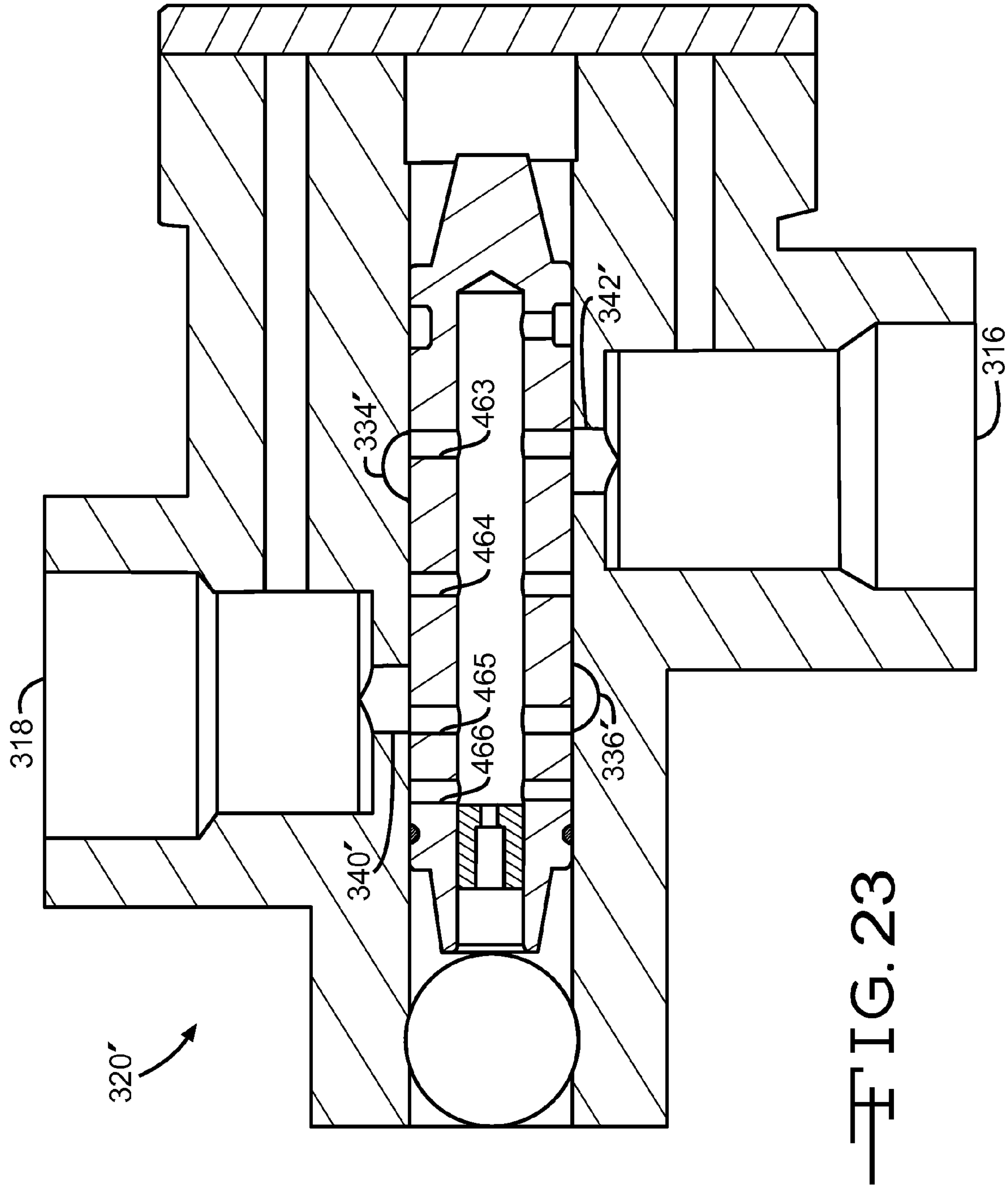
FIG. 23 is a partial cross-section and partial schematic representation of an alternate embodiment of a reversible fluid flow control device body.
Figure 24:
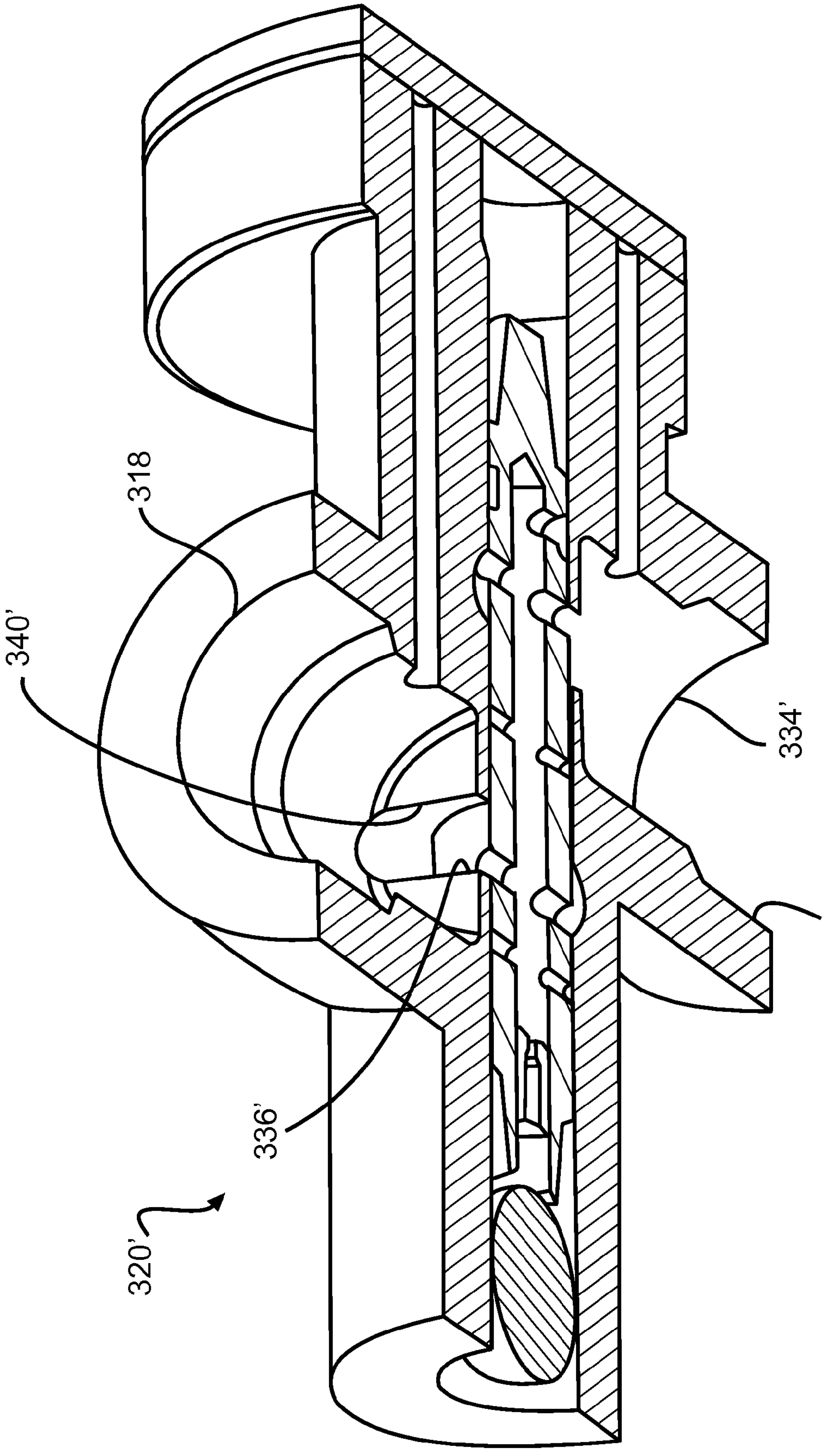
FIG. 24 is a perspective cross-sectional view of the control device body illustrated in FIG. 23.
Figure 26:
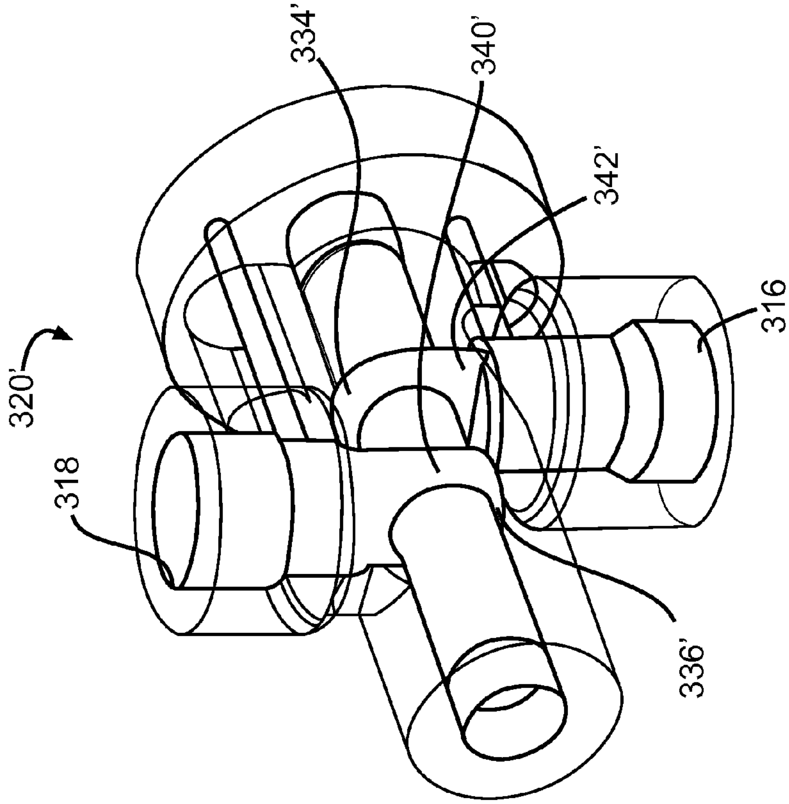
FIG. 26 is a view similar to FIG. 25, except from a generally opposite perspective.
Figure 25:
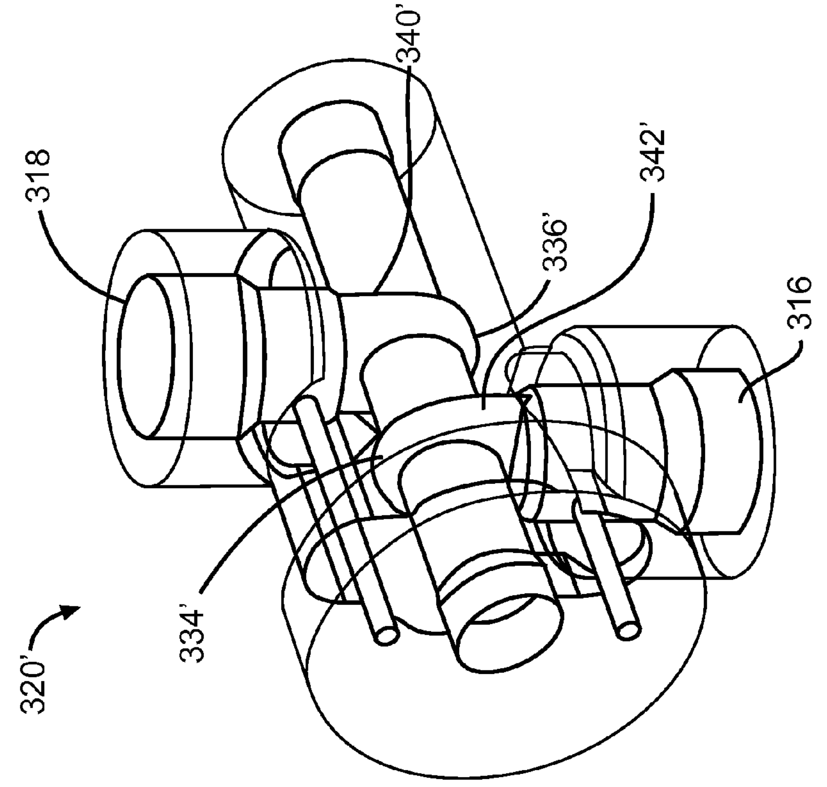
FIG. 25 is an alternate perspective view of the control device body illustrated in FIGS. 23 and 24, illustrating fluid filled spaces thereof.

An alternate body 320' may be provided, as best shown in FIGS. 23, 24, 25, and 26. The conduits 340' and 342' may be formed as slots formed between the grooves 334' and 336' and the first and second connections 316 and 318, respectively. The slots defining the conduits 340' and 342' may be formed by any desired method, such as by milling. FIGS. 25 and 26 are illustrations of the shapes of the fluid volumes about the spool 329 and elsewhere, with the body 320' in phantom. The illustrations of FIGS. 25 and 26 are included to provide a better sense of the configuration of the fluid passageway in the body 320'.

The spool shown in FIGS. 23 and 24 is another example of a spool for an asymmetric valve, and more specifically, an alternate embodiment of the spool 429, which is disposed for sliding movement in the bore of the valve body 320'. The embodiment of the spool illustrated in FIGS. 23 and 24 utilizes a different method of achieving asymmetric flow than that utilized by the spool 429 illustrated in FIG. 20. The spool illustrated in FIGS. 23 and 24 has a plurality of ports axially spaced apart along the spool in groups at each of four axial locations. Unlike the spool 429 illustrated in FIG. 20, the number of ports at an axial location is the same as the number at each of the other axial locations. In other words, in the illustrated embodiment, at least a first port 463 is formed at the first axial location in the spool providing fluid communication between the exterior surface of the spool and the axial passageway through the spool's longitudinal axis. Similarly, ports 464 in the same number of ports as at the first axial location are formed at the second axial location, ports 465 in the same number of ports as at the first axial location are formed at the third axial location, and ports 466 in the same number of ports as at the first axial location are formed at the fourth axial location in the spool 429. The second and fourth ports, 464 and 466 respectively, used during forward flow, have a smaller diameter, and therefore a smaller cross-sectional flow area, than the ports 463 and 465, used during reverse flow.

In partial summary, among the advantages of the illustrated reversible fluid flow control assembly is the ability control flow in either direction proportional to a single pressure command from a pilot valve device, without using a spring as the primary spool closing force, and utilizing unstable equilibrium forces to switch between forward and reverse flow functionality.

In further partial summary, a device has been disclosed, including a pilot valve responsive to a command signal for supplying a fluid at a command pressure to a pilot valve control port; and a pilot operated spool valve. The pilot operated spool valve may have a body having a first connector and a second connector, each of the first connector and second connector being adapted for fluid communication with an external circuit; and a spool disposed for sliding movement in the body, the spool having a first end portion and a second end portion opposite the first end portion. The first end portion of the spool may be in fluid communication with the pilot valve control port such that the spool is urged to move in a first direction by the fluid at the command pressure. The spool may be movable to control a fluid flow between the first connector and the second connector through the body proportionally to the command pressure when the fluid flow is a forward flow from the first connector to the second connector and when the fluid flow is a reverse flow from the second connector to the first connector. The spool valve may use negative feedback in the form of fluid at a feedback pressure acting on the spool in a second direction, opposite the first direction, to position the spool in conjunction with the fluid at the command pressure. The spool valve may utilize unstable equilibrium of fluid forces to switch between controlling the forward flow and the reverse flow of fluid through the spool valve.

In further partial summary, a device has been disclosed that includes a pilot valve device responsive to a command signal for supplying a fluid at a command pressure to a pilot valve control port; and a pilot operated spool valve. The pilot operated spool valve may have a body having a first connector and a second connector, each of the first connector and second connector being adapted for fluid communication with an external circuit; and a spool disposed for sliding movement in the body. The spool may have a first end portion and a second end portion opposite the first end portion, the first end portion of the spool being in fluid communication with the pilot valve control port such that the spool is urged to move in a first direction by the fluid at the command pressure. The spool may be movable through a first range of positions to control, proportionally to the command pressure, the flow of a fluid when the fluid is flowing through the body in a forward direction from the first connector to the second connector. The spool may be movable through a second range of positions, offset from the first range of positions, to control, proportionally to the command pressure, the flow of the fluid when the fluid is flowing through the body in a reverse direction from the second connector to the first connector. A portion of the fluid flowing through the body may have a feedback pressure and acting on the spool in a second direction, opposite the first direction, to position the spool in conjunction with the fluid at the command pressure, the magnitude of the feedback pressure being generated at least in part as a function of the position of the spool. A portion of the fluid flowing through the body may develop the feedback pressure when flowing from the body into a passageway within the spool and be directed out of the spool into a feedback chamber to act on the spool in the second direction.

In further partial summary, a device has been disclosed that has a command chamber in fluid communication with the pilot valve control port to receive the fluid at the command pressure, a feedback chamber receiving the fluid having the feedback pressure; and a bore communicating at a first end portion with the command chamber and at a second end portion with the feedback chamber, the spool being disposed for sliding movement in the bore.

In further partial summary, a device has been disclosed in which the spool may further define an exterior surface, a first end portion, a second end portion, and a central portion between the first end portion and the second end portion. A first axial end face may be defined on the first end portion which is in fluid communication with the command chamber. A second axial end face may be defined on the second end portion which is in fluid communication with the feedback chamber and having an opening defined therein. An axial passageway may be defined communicating with the opening in the second axial end face, the axial passageway extending into the central portion of the spool. A first port at a first axial location in the central portion of the spool may provide communication between the exterior surface and the axial passageway. Finally, a second port in the central portion of the spool at a second axial location between the first axial location and the second end portion of the spool may provide communication between the exterior surface and the axial passageway.

In further partial summary, a device has been disclosed in which the body may define a first cavity communicating with the bore in the body at a first axial location along the bore. The body may also define a second cavity communicating with the bore in the body at a second axial location along the bore which is closer to the feedback chamber than the first axial location. The body may also define a third cavity communicating with the bore in the body at a third axial location along the bore. The third location may be located between the first axial location and the second axial location. The first connector may be in fluid communication with the first cavity and with the second cavity. The second connector may be in fluid communication with the third cavity. When the spool is in the first range of positions, a flow path for forward flow of fluid through the spool valve is established from the first connector, to the second cavity, through the spool via, sequentially the second port, the axial passageway, the first port, to the third cavity, and thence to the second connector, and such that when the spool is in the second range of positions, a flow path for reverse flow of fluid through the spool valve is established from the second connector, to the third cavity, through the spool via, sequentially the second port, the axial passageway, and the first port, to the first cavity, and thence to the second connector. Each of the first, second, and third cavities may be in the form of a circumferentially extending groove formed in the surface of the wall defining the bore in the body.

In further partial summary, a device has been disclosed the spool is movable to a shutoff position between the first range of positions and the second range of positions, where substantially no fluid communication exists between the axial passageway in the spool and either the first cavity or the second cavity.

In further partial summary, a device has been disclosed wherein the spool valve may further have a first spring urging the spool to move from the second range of positions toward the shutoff position, and may have a second spring urging the spool to move from the first range of positions toward the shutoff position.

In further partial summary, a device has been disclosed wherein the a circumferential groove may be formed in the exterior surface of the spool at a third axial location between the first axial location and the first end portion of the spool; and an aperture may be formed in the spool providing fluid communication between the circumferential groove in the exterior surface of the spool and the axial passageway formed in the spool.

In further partial summary, a device has been disclosed wherein the first port may be one of a plurality of ports spaced apart circumferentially about the spool at the first axial location. Furthermore the second port may be one of a plurality of ports spaced apart circumferentially about the spool at the second axial location.

In further partial summary, a device has been disclosed wherein the spool may further define a third port in the central portion of the spool at a third axial location spaced a first axial distance from the first axial location toward the first end portion of the spool. The third port may provide communication between the exterior surface and the axial passageway. Furthermore, the spool may also define a fourth port in the central portion of the spool at a fourth axial location spaced the first axial distance from the second axial location toward the first axial location. The fourth port may also provide communication between the exterior surface and the axial passageway. The body may further define a first cavity communicating with the bore in the body at a first axial location along the bore, a second cavity communicating with the bore in the body at a second axial location along the bore which is closer to the feedback chamber than the first axial location, a third cavity communicating with the bore in the body at a third axial location along the bore, the third location being between the first axial location and the second axial location. The first connector may be in fluid communication with the first cavity and with the second cavity. The second connector may be in fluid communication with the third cavity, such that, when the spool is in the first range of positions, a flow path for forward flow of fluid through the spool valve is established from the first connector, to the second cavity, through the spool via, sequentially the second port, the axial passageway, and the first port, to the third cavity, and thence to the second connector, and such that when the spool is in the second range of positions, a flow path for reverse flow of fluid through the spool valve is established from the second connector, to the third cavity, through the spool via, sequentially the fourth port, the axial passageway, and the third port, to the first cavity, and thence to the second connector.

In further partial summary, a device has been disclosed wherein the first and the second ports each have a first cross-sectional flow area, and wherein the third and the fourth ports each have a second cross-sectional flow area different than the first cross-sectional flow area.

In further partial summary, a device has been disclosed that wherein, when the spool is in the first range of positions, and fluid communication is established between the first connector and the second connector, through the second cavity, through the spool via the second port, the axial passageway, and the first port, and through the third cavity, the presence of fluid in the second connector at a pressure higher than that existing in the first connector results in an instability in flow such that any decrease in command pressure would cause the spool to move in the second direction toward the command chamber, resulting in decreased communication between the second cavity and the second port, resulting in an increase in pressure in the axial passageway and thus pressure in the feedback chamber, further urging the spool to move in the second direction toward the command chamber, resulting in the spool moving disproportionately to the change in command pressure, the spool moving out of the first range of positions toward the second range of positions.

In further partial summary, a device has been disclosed that may include a first stop structure limiting movement of the spool in the first direction at a position providing substantially the least resistance to flow through the body of any of the first range of positions, and a second stop structure limiting movement of the spool in the second direction at a position providing substantially the least resistance to flow through the body of any of the second range of positions.

In further partial summary, a device has been disclosed that may utilize a microvalve as a pilot valve device.

In further partial summary, a device has been disclosed wherein the pilot valve device may comprise a fluid conduit extending between a first pilot connection port and a second pilot connection port, the flow through which fluid conduit is regulated by two variable orifices in series, one of which is normally open and one of which is normally closed, the pilot valve control port being connected in fluid communication with the fluid conduit between the variable orifices.

In further partial summary, a device has been disclosed wherein the normally closed orifice may be connected in fluid communication with the first connector via the first pilot connection port and the normally open orifice is in fluid communication with the second connector via the second pilot connection port.

In further partial summary, a device has been disclosed with a spool having first, second, third, and fourth ports formed in the spool at first, second, third, and fourth axial locations along the spool, respectively, each of the ports communicating with an axial passageway in the spool, each of the ports having the same cross-sectional flow area, and wherein there are more of one of the first, second, third, and fourth ports at the associated one of the first, second, third, and fourth axial locations than at another of the first, second, third, and fourth axial locations, whereby the device forms an asymmetric valve.

In further partial summary, a device has been disclosed with a spool having first, second, third, and fourth ports formed in the spool at first, second, third, and fourth axial locations along the spool, respectively, each of the ports communicating with an axial passageway in the spool, wherein at least one the first, second, third, and fourth ports has a different cross-sectional flow area from another of the first, second, third, and fourth ports at a different one of the first, second, third, and fourth axial locations, whereby the device forms an asymmetric valve.

In further partial summary, a device has been disclosed including a body having a first connector and a second connector, each of the first connector and second connector being adapted for fluid communication with an external circuit; and a spool disposed for sliding movement in the body. The spool has a first end portion and a second end portion opposite the first end portion, the first end portion of the spool being in fluid communication with a pilot valve producing a command pressure such that the spool is urged to move in a first direction by the command pressure, the spool being movable through a first range of positions to control, proportionally to the command pressure, the flow of a fluid when the fluid is flowing through the body in a forward direction from the first connector to the second connector, the spool being movable through a second range of positions, offset from the first range of positions, to control, proportionally to the command pressure, the flow of the fluid when the fluid is flowing through the body in a reverse direction from the second connector to the first connector, a portion of the fluid flowing through the body having a feedback pressure and acting on the spool in a second direction, opposite the first direction, to position the spool in conjunction with the fluid at the command pressure, the magnitude of the feedback pressure being generated at least in part as a function of the position of the spool. The body may further define a command chamber in fluid communication with the pilot valve control port to receive the fluid at the command pressure; a feedback chamber receiving the fluid having the feedback pressure; and a bore communicating at a first end portion with the command chamber and at a second end portion with the feedback chamber, the spool being disposed for sliding movement in the bore. The spool may further define an exterior surface; a central portion between the first end portion and the second end portion; a first axial end face on the first end portion which is in fluid communication with the command chamber; a second axial end face on the second end portion which is in fluid communication with the feedback chamber and having an opening defined therein; an axial passageway communicating with the opening in the second axial end face, the axial passageway extending into the central portion of the spool; a first port at a first axial location in the central portion of the spool providing communication between the exterior surface and the axial passageway; a second port in the central portion of the spool at a second axial location between the first axial location and the second end portion of the spool providing communication between the exterior surface and the axial passageway; a third port in the central portion of the spool at a third axial location spaced a first axial distance from the first axial location toward the first end portion of the spool, the third port providing communication between the exterior surface and the axial passageway; and a fourth port in the central portion of the spool at a fourth axial location spaced the first axial distance from the second axial location toward the first axial location and, the fourth port providing communication between the exterior surface and the axial passageway. The body may further define a first cavity communicating with the bore in the body at a first axial location along the bore, the first connector being in fluid communication with the first cavity; and a second cavity communicating with the bore in the body at a second axial location along the bore which is closer to the feedback chamber than the first axial location the second connector being in fluid communication with the second cavity, such that when the spool is in the first range of positions, a flow path for forward flow of fluid through the spool valve is established from the first connector, to the first cavity, through the spool via, sequentially the first port, the axial passageway, and the third port, to the second cavity, and thence to the second connector, and such that when the spool is in the second range of positions, a flow path for reverse flow of fluid through the spool valve is established from the second connector, to the second cavity, through the spool via, sequentially the fourth port, the axial passageway, and the second port, to the first cavity, and thence to the first connector. The device may have a greater maximum cross-sectional flow area when controlling one of forward flow and reverse flow, than when controlling the other one of forward flow and reverse flow. In further partial summary, this difference in maximum cross-sectional flow area might be achieved in a device in which, the first, second, third, and fourth ports each has the same cross-sectional flow area, and wherein there more of one of the first, second, third, and fourth ports at the associated one of the first, second, third, and fourth axial locations than at another of the first, second, third, and fourth axial locations, whereby the device forms an asymmetric valve. In further partial summary, another way in which this difference in maximum cross-sectional flow area might be achieved is in a device in which at least one the first, second, third, and fourth ports has a different cross-sectional flow area from another of the first, second, third, and fourth ports at a different one of the first, second, third, and fourth axial locations, whereby the device forms an asymmetric valve.

In further partial summary, a device has been disclosed that may include a spool valve including a body having a first connector and a second connector and a spool movable relative to the body for controlling flow between the first connector and the second connector. The reversible flow control assembly further may include a pilot valve device developing a single pressure command. The spool valve may be responsive to the single pressure command developed in the pilot valve device to control flow between the first connector and the second connector without regard to the direction of flow. The majority of forces acting on the spool in opposition to the pressure command to position the spool relative to the body when fluid is flowing through the valve may be fluid forces.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A device, comprising:

a pilot valve responsive to a command signal for supplying a fluid at a command pressure to a pilot valve control port; and a pilot operated spool valve having:

a body having a first connector and a second connector, each of said first connector and second connector being adapted for fluid communication with an external circuit; and a spool disposed for sliding movement in said body, said spool having a first end portion and a second end portion opposite said first end portion, said first end portion of said spool being in fluid communication with said pilot valve control port such that said spool is urged to move in a first direction by said fluid at said command pressure, said spool being movable to control a fluid flow between said first connector and said second connector through said body proportionally to said command pressure when said fluid flow is a forward flow from said first connector to said second connector and when said fluid flow is a reverse flow from said second connector to said first connector;

said spool valve using negative feedback in the form of fluid at a feedback pressure acting on said spool in a second direction, opposite said first direction, to position said spool in conjunction with said fluid at said command pressure;

said spool valve utilizing unstable equilibrium of fluid forces to switch between controlling said forward flow and said reverse flow.

2. A device, comprising:

a pilot valve device responsive to a command signal for supplying a fluid at a command pressure to a pilot valve control port; and a pilot operated spool valve having:

a body having a first connector and a second connector, each of said first connector and second connector being adapted for fluid communication with an external circuit; and a spool disposed for sliding movement in said body, said spool having a first end portion and a second end portion opposite said first end portion, said first end portion of said spool being in fluid communication with said pilot valve control port such that said spool is urged to move in a first direction by said fluid at said command pressure, said spool being movable through a first range of positions to control, proportionally to said command pressure, the flow of a fluid when the fluid is flowing through said body in a forward direction from said first connector to said second connector, said spool being movable through a second range of positions, offset from said first range of positions, to control, proportionally to said command pressure, the flow of the fluid when the fluid is flowing through said body in a reverse direction from said second connector to said first connector, a portion of said fluid flowing through said body having a feedback pressure and acting on said spool in a second direction, opposite said first direction, to position said spool in conjunction with said fluid at said command pressure, the magnitude of said feedback pressure being generated at least in part as a function of the position of said spool.

3. The device of claim 2, said body further defining:

a command chamber in fluid communication with said pilot valve control port to receive said fluid at said command pressure;

a feedback chamber receiving said fluid having said feedback pressure; and a bore communicating at a first end portion with said command chamber and at a second end portion with said feedback chamber, said spool being disposed for sliding movement in said bore.

4. The device of claim 3, said spool further defining:

an exterior surface;

a central portion between said first end portion and said second end portion;

a first axial end face on said first end portion which is in fluid communication with said command chamber;

a second axial end face on said second end portion which is in fluid communication with said feedback chamber and having an opening defined therein;

an axial passageway communicating with said opening in said second axial end face, said axial passageway extending into said central portion of said spool;

a first port at a first axial location in said central portion of said spool providing communication between said exterior surface and said axial passageway; and a second port in said central portion of said spool at a second axial location between said first axial location and said second end portion of said spool providing communication between said exterior surface and said axial passageway.

5. The device of claim 4, said body further defining:

a first cavity communicating with said bore in said body at a first axial location along said bore;

a second cavity communicating with said bore in said body at a second axial location along said bore which is closer to said feedback chamber than said first axial location;

a third cavity communicating with said bore in said body at a third axial location along said bore, said third location being between said first axial location and said second axial location;

said first connector being in fluid communication with said first cavity and with said second cavity; and said second connector being in fluid communication with said third cavity, such that when said spool is in said first range of positions, a flow path for forward flow of fluid through said spool valve is established from said first connector, to said second cavity, through said spool via, sequentially, said second port, said axial passageway, said first port, to said third cavity, and thence to said second connector, and such that when said spool is in said second range of positions, a flow path for reverse flow of fluid through said spool valve is established from said second connector, to said third cavity, through said spool via, sequentially, said second port, said axial passageway, and said first port, to said first cavity, and thence to said first connector.

6. The device of claim 5 wherein said spool is movable to a shutoff position between said first range of positions and said second range of positions, where substantially no fluid communication exists between said axial passageway in said spool and either said first cavity or said second cavity.

7. The device of claim 6, said spool valve further comprising:

a first spring urging said spool to move from said second range of positions toward said shutoff position; and a second spring urging said spool to move from said first range of positions toward said shutoff position.

8. The device of claim 4, said spool further defining:

a circumferential groove formed in said exterior surface of said spool at a third axial location between said first axial location and said first end portion of said spool; and an aperture providing fluid communication between said circumferential groove in said exterior surface of said spool and said axial passageway formed in said spool.

9. The device of claim 4, wherein said first port is one of a plurality of ports spaced apart circumferentially about said spool at said first axial location, and said second port is one of a plurality of ports spaced apart circumferentially about said spool at said second axial location.

10. The device of claim 4, wherein:

said spool further defines:

a third port in said central portion of said spool at a third axial location spaced a first axial distance from said first axial location toward said first end portion of said spool, said third port providing communication between said exterior surface and said axial passageway; and a fourth port in said central portion of said spool at a fourth axial location spaced said first axial distance from said second axial location toward said first axial location and, said fourth port providing communication between said exterior surface and said axial passageway; and said body further defines:

a first cavity communicating with said bore in said body at a first axial location along said bore;

a second cavity communicating with said bore in said body at a second axial location along said bore which is closer to said feedback chamber than said first axial location;

a third cavity communicating with said bore in said body at a third axial location along said bore, said third location being between said first axial location and said second axial location;

said first connector being in fluid communication with said first cavity and with said second cavity; and said second connector being in fluid communication with said third cavity, such that, when said spool is in said first range of positions, a flow path for forward flow of fluid through said spool valve is established from said first connector, to said second cavity, through said spool via, sequentially said second port, said axial passageway, and said first port, to said third cavity, and thence to said second connector, and such that when said spool is in said second range of positions, a flow path for reverse flow of fluid through said spool valve is established from said second connector, to said third cavity, through said spool via, sequentially said fourth port, said axial passageway, and said third port, to said first cavity, and thence to said second connector.

11. The device of claim 10, wherein said first and said second ports each have a first cross-sectional flow area, and wherein said third and said fourth ports each have a second cross-sectional flow area different than said first cross-sectional flow area.

12. The device of claim 10, wherein said spool is movable to a shutoff position, between said first range of positions and said second range of positions, where substantially no fluid communication exists between said axial passageway in said spool and either said first cavity or said second cavity.

13. The device of claim 12, said spool valve further comprising:

a first spring urging said spool to move from said second range of positions toward said shutoff position; and a second spring urging said spool to move from said first range of positions toward said shutoff position.

14. The device of claim 13, said spool further defining:

a circumferential groove formed in said exterior surface of said spool at a third axial location which is a second axial distance toward said first end portion of said spool from said first axial location, said second distance being greater than said first axial distance; and an aperture providing fluid communication between said circumferential groove in said exterior surface of said spool and said axial passageway formed in said spool.

15. The device of claim 14, wherein said first port is one of a plurality of ports spaced apart circumferentially about said spool at said first axial location, said second port is one of a plurality of ports spaced apart circumferentially about said spool at said second axial location, said third port is one of a plurality of ports spaced apart circumferentially about said spool at said third axial location, and said fourth port is one of a plurality of ports spaced apart circumferentially about said spool at said fourth axial location.

16. The device of claim 10, wherein, when said spool is in said first range of positions, and fluid communication is established between said first connector and said second connector, through said second cavity, through said spool via said second port, said axial passageway, and said first port, and through said third cavity, the presence of fluid in said second connector at a pressure higher than that existing in said first connector results in an instability in flow such that any decrease in command pressure would cause said spool to move in said second direction toward said command chamber, resulting in decreased communication between said second cavity and said second port, resulting in an increase in pressure in said axial passageway and thus pressure in said feedback chamber, further urging said spool to move in said second direction toward said command chamber, resulting in said spool moving disproportionately to said change in command pressure, said spool moving out of said first range of positions toward said second range of positions.

17. The device of claim 5, wherein, when said spool is in said first range of positions, and fluid communication is established between said first connector and said second connector, through said second cavity, through said spool via said second port, said axial passageway, and said first port, and through said third cavity, the presence of fluid in said second connector at a pressure higher than that existing in said first connector results in an instability in flow such that any decrease in command pressure would cause said spool to move in said second direction toward said command chamber, resulting in decreased communication between said second cavity and said second port, resulting in an increase in pressure in said axial passageway and thus pressure in said feedback pressure, further urging said spool toward said command chamber, resulting in said spool moving in said second direction disproportionately to said change in command pressure, said spool moving out of said first range of positions toward said second range of positions.

18. The device of claim 2, further including a first stop structure limiting movement of said spool in said first direction at a position providing substantially the least resistance to flow through said body of any of said first range of positions, and a second stop structure limiting movement of said spool in said second direction at a position providing substantially the least resistance to flow through said body of any of said second range of positions.

19. The device of claim 2, wherein said pilot valve device is a microvalve.

20. The device of claim 2, wherein said pilot valve device comprises a fluid conduit extending between a first pilot connection port and a second pilot connection port, the flow through which fluid conduit is regulated by two variable orifices in series, one of which is normally open and one of which is normally closed, said pilot valve control port being connected in fluid communication with said fluid conduit between said variable orifices.

21. The device of claim 20 wherein said normally closed orifice is connected in fluid communication with said first connector via said first pilot connection port and said normally open orifice is in fluid communication with said second connector via said second pilot connection port.

22. The device of claim 2, wherein said spool valve is responsive to a single pressure command developed in said pilot valve device.

23. The device of claim 15, wherein said first, second, third, and fourth ports each has the same cross-sectional flow area, and wherein there are more of one of said first, second, third, and fourth ports at the associated one of said first, second, third, and fourth axial locations than at another of said first, second, third, and fourth axial locations, whereby the device forms an asymmetric valve.

24. The device of claim 15, wherein at least one said first, second, third, and fourth ports has a different cross-sectional flow area from another of said first, second, third, and fourth ports at a different one of said first, second, third, and fourth axial locations, whereby the device forms an asymmetric valve.

25. The device of claim 4, said spool further defining:

a third port in said central portion of said spool at a third axial location spaced a first axial distance from said first axial location toward said first end portion of said spool, said third port providing communication between said exterior surface and said axial passageway; and a fourth port in said central portion of said spool at a fourth axial location spaced said first axial distance from said second axial location toward said first axial location and, said fourth port providing communication between said exterior surface and said axial passageway;

said body further defining:

a first cavity communicating with said bore in said body at a first axial location along said bore, said first connector being in fluid communication with said first cavity; and a second cavity communicating with said bore in said body at a second axial location along said bore which is closer to said feedback chamber than said first axial location said second connector being in fluid communication with said second cavity, such that when said spool is in said first range of positions, a flow path for forward flow of fluid through said spool valve is established from said first connector, to said first cavity, through said spool via, sequentially said first port, said axial passageway, and said third port, to said second cavity, and thence to said second connector, and such that when said spool is in said second range of positions, a flow path for reverse flow of fluid through said spool valve is established from said second connector, to said second cavity, through said spool via, sequentially said fourth port, said axial passageway, and said second port, to said first cavity, and thence to said first connector.

26. The device of claim 25, wherein said valve has a greater maximum cross-sectional flow area when controlling one of forward flow and reverse flow, than when controlling the other one of forward flow and reverse flow.

27. The device of claim 25, wherein said first, second, third, and fourth ports each has the same cross-sectional flow area, and wherein there more of one of said first, second, third, and fourth ports at the associated one of said first, second, third, and fourth axial locations than at another of said first, second, third, and fourth axial locations, whereby the device forms an asymmetric valve.

28. The device of claim 25, wherein at least one said first, second, third, and fourth ports has a different cross-sectional flow area from another of said first, second, third, and fourth ports at a different one of said first, second, third, and fourth axial locations, whereby the device forms an asymmetric valve.

* * * * *